United States Patent
Kwon et al.

(10) Patent No.: US 11,792,304 B2
(45) Date of Patent: *Oct. 17, 2023

(54) BROADCAST SIGNAL TRANSMISSION APPARATUS, BROADCAST SIGNAL TRANSMISSION METHOD, BROADCAST SIGNAL RECEPTION APPARATUS AND BROADCAST SIGNAL RECEPTION METHOD

(71) Applicant: LG Electronics Inc., Seoul (KR)

(72) Inventors: Woosuk Kwon, Seoul (KR); Joonhee Yoon, Seoul (KR); Minsung Kwak, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/941,503

(22) Filed: Sep. 9, 2022

(65) Prior Publication Data

US 2023/0007104 A1    Jan. 5, 2023

Related U.S. Application Data

(63) Continuation of application No. 17/509,417, filed on Oct. 25, 2021, now Pat. No. 11,445,049, which is a
(Continued)

(30) Foreign Application Priority Data

Nov. 2, 2018  (KR) .......................... 10-2018-0133414
Nov. 9, 2018  (KR) .......................... 10-2018-0137024

(51) Int. Cl.
H04L 69/04    (2022.01)
H04L 69/164   (2022.01)
(Continued)

(52) U.S. Cl.
CPC ............ H04L 69/04 (2013.01); H04L 69/164 (2013.01); H04L 69/168 (2013.01); H04L 69/169 (2013.01); H04L 69/22 (2013.01)

(58) Field of Classification Search
CPC ..... H04L 69/04; H04L 69/164; H04L 69/168; H04L 69/169; H04L 69/22
See application file for complete search history.

(56) References Cited

U.S. PATENT DOCUMENTS 10,582,023 B2 *  3/2020  Kwon .................... H04L 69/324
2002/0166117 A1 * 11/2002  Abrams .................. H04L 43/00
                                                          717/177
(Continued)

FOREIGN PATENT DOCUMENTS

KR      10-1835340 A        6/2016
KR    10-2016-0085868 A    7/2016
(Continued)

*Primary Examiner* — Brian Whipple
*Assistant Examiner* — James Ross Hollister
(74) *Attorney, Agent, or Firm* — Bryan Cave Leighton Paisner LLP

(57) ABSTRACT

A broadcast signal transmission method comprises outputting an RoHC channel that includes one or more RoHC streams and a signaling table that includes information related to header compression by performing header compression for Internet Protocol (IP) packets, which include broadcast data, in accordance with an adaptation mode, a header of each IP packet including an IP header and a User Datagram Protocol (UDP) header, generating at least one first link layer packet that includes the RoHC channel and generating at least one second link layer packet that includes the signaling table, and physical layer processing the at least one first link layer packet and the at least one second link layer packet and transmitting through one or more Physical Layer Pipes (PLPs), wherein the signaling table includes
(Continued)

adaptation mode information indicating the adaptation mode, and each RoHC stream in the RoHC channel includes RoHC packets.

24 Claims, 36 Drawing Sheets

Related U.S. Application Data continuation of application No. 16/672,729, filed on Nov. 4, 2019, now Pat. No. 11,159,650.

(51) Int. Cl.
*H04L 69/168* (2022.01)
*H04L 69/16* (2022.01)
*H04L 69/22* (2022.01)

(56) References Cited

U.S. PATENT DOCUMENTS

| | | | |
|---|---|---|---|
| 2010/0260098 A1* | 10/2010 | Ulupinar | H04L 69/04 370/315 |
| 2011/0282982 A1* | 11/2011 | Jain | G06F 9/5094 709/223 |
| 2015/0032894 A1* | 1/2015 | Rosensweig | G06F 9/5088 709/226 |
| 2015/0134823 A1* | 5/2015 | Cucinotta | H04L 47/2425 709/226 |
| 2015/0156082 A1* | 6/2015 | Kakadia | H04L 47/2458 709/223 |
| 2016/0234353 A1* | 8/2016 | Kwon | H04L 69/22 |
| 2016/0366368 A1* | 12/2016 | Kwon | H04L 65/00 |
| 2016/0373489 A1* | 12/2016 | Lee | H04N 21/2381 |
| 2017/0064044 A1* | 3/2017 | Yang | H04L 69/324 |
| 2019/0036816 A1* | 1/2019 | Evans | H04L 41/342 |
| 2019/0334770 A1* | 10/2019 | Xiang | H04L 41/0896 |
| 2022/0124005 A1* | 4/2022 | Doshi | G06F 21/577 |
| 2023/0028646 A1* | 1/2023 | Nainar | H04L 63/029 |

FOREIGN PATENT DOCUMENTS

| | | |
|---|---|---|
| KR | 10-2018-0016609 A | 2/2018 |
| KR | 10-2018-0037307 A | 4/2018 |

* cited by examiner

FIG. 3

| Syntax | No. of Bits | Format |
|---|---|---|
| LLS_table( ) { | | |
|     LLS_table_id | 8 | uimsbf |
|     provider_id | 8 | uimsbf |
|     LLS_group_Id | 8 | uimsbf |
|     group_count_minusl | 8 | uimsbf |
|     LLS_table_version | 8 | uimsbf |
|     switch (LLS_table_id) { | | |
|       case 0x01: | | |
|         SLT | var | Sec. 6.3 |
|         break; | | |
|       case 0x02: | | |
|         RRT | var | See Annex F |
|         break; | | |
|       case 0x03: | | |
|         System Time | var | Sec. 6.4 |
|         break; | | |
|       case 0x04: | | |
|         CAP | var | Sec. 6.5 |
|         break; | | |
|       default: | | |
|         reserved | var | |
|     } | | |
| } | | | t3010

| Element or Attribute Name | Use | Data Type |
|---|---|---|
| SLT | | |
|   @bsid | 1 | unsignedShort |
|   @sltCapabilities | 0..1 | string |
|   sltInetUrl | 0..1 | anyURL |
|     @urlType | 1 | unsignedByte |
|   Service | 1..N | |
|     @serviceID | 1 | unsignedShort |
|     @sltSvcSeqNum | 1 | unsignedByte |
|     @protected | 0..1 | boolean |
|     @majorChannelNo | 0..1 | 1...999 |
|     @minorChannelNo | 0..1 | 1...999 |
|     @serviceCategory | 1 | unsignedByte |
|     @shortServiceName | 0..1 | string |
|     @hidden | 0..1 | boolean |
|     @broadbandAccessRequired | 0..1 | boolean |
|     @svcCapabilities | 0..1 | string |
|     BroadcastSvcsignaling | 0..1 | |
|       @slsProtocol | 1 | unsignedByte |
|       @slsMajorProtocolVersion | 1 | unsignedByte |
|       @slsMinorProtocolVersion | 1 | unsignedByte |
|       @slsPlpID | 0..1 | unsignedByte |
|       @slsDestinationIpAddress | 1 | string |
|       @slsDestinationUdpPort | 1 | unsignedShort |
|       @slsSourceIpAddress | 1 | string |
|     svcInetUrl | 0..N | anyURL |
|       @urlType | 1 | unsignedByte | t3020

FIG. 4

| Element or Attribute Name | | | | Use | Data Type |
|---|---|---|---|---|---|
| bundleDescription | | | | | |
| | userServiceDescription | | | | |
| | | @globalServiceID | | 1 | anyURL |
| | | @serviceID | | 1 | unsignedShort |
| | | @serviceStatus | | 0..1 | boolean |
| | | @fullMPDUri | | 1 | anyURL |
| | | @sTSIDUri | | 1 | anyURL |
| | | name | | 0..N | string |
| | | | @lang | 1 | language |
| | | serviceLanguage | | 0..N | language |
| | | capabilityCode | | 0..1 | string |
| | | deliveryMethod | | 1..N | |
| | | | broadcastAppService | 1..N | |
| | | | | basePattern | 1..N | string |
| | | | unicastAppService | 0..N | |
| | | | | basePattern | 1..N | string |

— t4010

| Element or Attribute Name | | | Use | Data Type |
|---|---|---|---|---|
| S-TSID | | | | |
| | @serviceID | | 1 | unsignedShort |
| | RS | | 1..N | |
| | | @bsid | 0..1 | unsignedShort |
| | | @sIpAddr | 0..1 | string |
| | | @dIpAddr | 0..1 | string |
| | | @dport | 0..1 | unsignedShort |
| | | @PLPID | 0..1 | unsignedByte |
| | | LS | 1..N | |
| | | @tsi | 1 | unsignedInt |
| | | @PLPID | 0..1 | unsignedByte |
| | | @bw | 0..1 | unsignedInt |
| | | @startTime | 0..1 | dateTime |
| | | @endTime | 0..1 | dateTime |
| | | ScrFlow | 0..1 | scrFlowType |
| | | RepairFlow | 0..1 | rprFlowType | t4020

FIG. 5

| Element or Attribute Name | Use |
|---|---|
| bundleDescription | |
|   userServiceDescription | |
|     @globalServiceID | M |
|     @serviceID | M |
|     Name | 0..N |
|       @lang | CM |
|     serviceLanguage | 0..N |
|     contentAdvisoryRating | 0..1 |
|     Channel | 1 |
|       @serviceGenre | 0..1 |
|       @serviceIcon | 1 |
|       ServiceDescription | 0..N |
|         @serviceDescrText | 1 |
|         @serviceDescrLang | 0..1 |
|     mpuComponent | 0..1 |
|       @mmtPackageId | 1 |
|       @nextMmtPackageId | 0..1 |
|     routeComponent | 0..1 |
|       @sTSIDUri | 1 |
|       @sTSIDDestinationIpAddress | 0..1 |
|       @sTSIDDestinationUdpPort | 1 |
|       @sTSIDSourceIpAddress | 1 |
|       @sTSIDMajorProtocolVersion | 0..1 |
|       @sTSIDMinorProtocolVersion | 0..1 |
|     broadbandComponent | 0..1 |
|       @fullMPDUri | 1 |
|     ComponentInfo | 1..N |
|       @ComponentType | 1 |
|       @ComponentRole | 1 |
|       @ComponentProtectedFlag | 0..1 |
|       @ComponentId | 1 |
|       @ComponentName | 0..1 |

FIG. 12

| packet_type Value | Meaning |
|---|---|
| 000 | IPv4 packet |
| 001 | Reserved |
| 010 | Compressed IP packet |
| 011 | Reserved |
| 100 | Link layer signaling packet |
| 101 | Reserved |
| 110 | Packet Type Extension |
| 111 | MPEG-2 Transport Stream |

FIG. 14

| Syntax | Number of bits | Format |
|---|---|---|
| Signaling_information_hdr() { | | |
|     signaling_type | 8 | uimsbf |
|     signaling_type_extension | 16 | bslbf |
|     signaling_version | 8 | uimsbf |
|     signaling_format | 2 | uimsbf |
|     signaling_encoding | 2 | uimsbf |
|     reserved | 4 | "1111" |
| } | | |

FIG. 15

| Syntax | Number of bits | Format |
|---|---|---|
| Link_Mapping_Table() { | | |
|     PLP_ID | 6 | uimsbf |
|     Reserved | 2 | |
|     num_session | 8 | uimsbf |
|     for(i = 0 ; i < num_session ; i + +) { | | |
|         src_IP_add | 32 | uimsbf |
|         dst_IP_add | 32 | uimsbf |
|         src_UDP_port | 16 | uimsbf |
|         dst_UDP_port | 16 | uimsbf |
|         SID_flag | 1 | bslbf |
|         compressed_flag | 1 | bslbf |
|         reserved | 6 | '000000' |
|         if (SID_flag == "1") { | | |
|             SID | 8 | uimsbf |
|         } | | |
|         if (compressed_flag == '1') { | | |
|             context_id | 8 | uimsbf |
|         } | | |
|     } | | |
| } | | |

FIG. 16

| Syntax | Number of bits | Format |
|---|---|---|
| ROHC-U_description_table { | | |
|   PLP_ID | 6 | uimsbf |
|   max_CID | 8 | uimsbf |
|   adaptation_mode | 2 | uimsbf |
|   context_config | 2 | bslbf |
|   reserved | 6 | '111111' |
|   num_context | 8 | uimsbf |
|   for (i=0; i<num_context; i++) | | |
|     context_id | 8 | uimsbf |
|     context_profile | 8 | uimsbf |
|     if (context_config = = 1){ | | |
|       context_length | 8 | uimsbf |
|       static_chain_byte () | var | uimsbf |
|     } | | |
|     else if (context_config = 0X02) { | | |
|       context_length | 8 | uimsbf |
|       dynamic_chain_byte () | var | uimsbf |
|     } | | |
|     else if (context_config = 0x03) { | | |
|       context_length | 8 | uimsbf |
|       static_chain_byte () | var | uimsbf |
|       dynamic_chain_byte () | var | uimsbf |
|     } | | |
|   } | | |
| } | | |

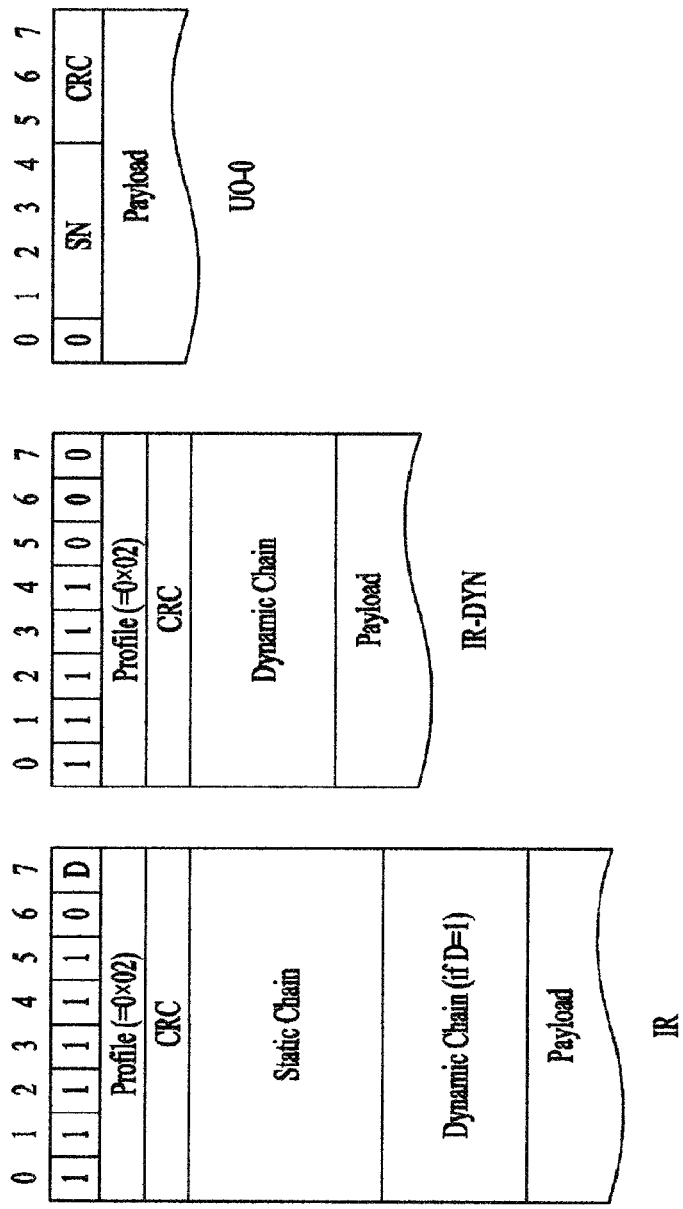

FIG. 26

| Packet Order | IP header (Hex) | UDP header (Hex) | SN (Dec) | SN (Hex) |
|---|---|---|---|---|
| 1 | 45000540000040004011298 20A7D119EEFFF0011 | 93713323052C54F0 | 760 | 02F8 |
| 2 | 45000540000040004011298 20A7D119EEFFF0011 | 93713323052C925B | 761 | 02F9 |
| 3 | 45000540000040004011298 20A7D119EEFFF0011 | 93713323052C5E8A | 762 | 02FA |
| 4 | 45000540000040004011298 20A7D119EEFFF0011 | 93713323052C3F4E | 763 | 02FB |
| 5 | 45000540000040004011298 20A7D119EEFFF0011 | 93713323052C824B | 764 | 02FC |
| 6 | 45000540000040004011298 20A7D119EEFFF0011 | 93713323052C1AE7 | 765 | 02FD |
| 7 | 45000540000040004011298 20A7D119EEFFF0011 | 93713323052C9483 | 766 | 02FE |
| 8 | 45000540000040004011298 20A7D119EEFFF0011 | 93713323052CF47A | 767 | 02FF |
| 9 | 45000540000040004011298 20A7D119EEFFF0011 | 93713323052CA533 | 768 | 0300 |
| 10 | 45000540000040004011298 20A7D119EEFFF0011 | 93713323052C74DE | 769 | 0301 |
| 11 | 45000540000040004011298 20A7D119EEFFF0011 | 93713323052C357C | 770 | 0302 |
| 12 | 45000540000040004011298 20A7D119EEFFF0011 | 93713323052C8E86 | 771 | 0303 |
| 13 | 45000540000040004011298 20A7D119EEFFF0011 | 93713323052C5738 | 772 | 0304 |
| 14 | 45000540000040004011298 20A7D119EEFFF0011 | 93713323052C66C7 | 773 | 0305 |
| 15 | 45000540000040004011298 20A7D119EEFFF0011 | 93713323052C9463 | 774 | 0306 |
| 16 | 45000540000040004011298 20A7D119EEFFF0011 | 93713323052CA22A | 775 | 0307 |
| 17 | 45000540000040004011298 20A7D119EEFFF0011 | 93713323052CC822 | 776 | 0308 |
| 18 | 45000540000040004011298 20A7D119EEFFF0011 | 93713323052C49F4 | 777 | 0309 |
| 19 | 45000540000040004011298 20A7D119EEFFF0011 | 93713323052C9692 | 778 | 030A |
| 20 | 45000540000040004011298 20A7D119EEFFF0011 | 93713323052CD18D | 779 | 030B |
| 21 | 45000540000040004011298 20A7D119EEFFF0011 | 93713323052CE082 | 780 | 030C |
| 22 | 45000540000040004011298 20A7D119EEFFF0011 | 93713323052C41B2 | 781 | 030D |
| 23 | 45000540000040004011298 20A7D119EEFFF0011 | 93713323052CEEFD | 782 | 030E |
| 24 | 45000540000040004011298 20A7D119EEFFF0011 | 93713323052C3B52 | 783 | 030F |
| 25 | 45000540000040004011298 20A7D119EEFFF0011 | 93713323052C23BB | 784 | 0310 |
| 26 | 45000540000040004011298 20A7D119EEFFF0011 | 93713323052CB631 | 785 | 0311 |
| 27 | 45000540000040004011298 20A7D119EEFFF0011 | 93713323052CDD78 | 786 | 0312 |
| 28 | 45000540000040004011298 20A7D119EEFFF0011 | 93713323052C5871 | 787 | 0313 |
| 29 | 45000540000040004011298 20A7D119EEFFF0011 | 93713323052CDEEB | 788 | 0314 |
| 30 | 45000540000040004011298 20A7D119EEFFF0011 | 93713323052CB317 | 789 | 0315 |
| 31 | 45000540000040004011298 20A7D119EEFFF0011 | 93713323052C91F0 | 790 | 0316 |
| 32 | 45000540000040004011298 20A7D119EEFFF0011 | 93713323052CDA39 | 791 | 0317 |
| 33 | 45000540000040004011298 20A7D119EEFFF0011 | 93713323052C6032 | 792 | 0318 |
| 34 | 45000540000040004011298 20A7D119EEFFF0011 | 93713323052C10E3 | 793 | 0319 |
| 35 | 45000540000040004011298 20A7D119EEFFF0011 | 93713323052C42E0 | 794 | 031A |
| 36 | 45000540000040004011298 20A7D119EEFFF0011 | 93713323052CB914 | 795 | 031B |
| 37 | 45000540000040004011298 20A7D119EEFFF0011 | 93713323052CACFA | 796 | 031C |
| 38 | 45000540000040004011298 20A7D119EEFFF0011 | 93713323052C6CEF | 797 | 031D |
| 39 | 45000540000040004011298 20A7D119EEFFF0011 | 93713323052C42AD | 798 | 031E |
| 40 | 45000540000040004011298 20A7D119EEFFF0011 | 93713323052CE8EE | 799 | 031F |
| 41 | 45000540000040004011298 20A7D119EEFFF0011 | 93713323052C32D6 | 800 | 0320 |
| 42 | 45000540000040004011298 20A7D119EEFFF0011 | 93713323052C5C34 | 801 | 0321 |
| 43 | 45000540000040004011298 20A7D119EEFFF0011 | 93713323052C670F | 802 | 0322 |
| 44 | 45000540000040004011298 20A7D119EEFFF0011 | 93713323052C48B1 | 803 | 0323 |
| 45 | 45000540000040004011298 20A7D119EEFFF0011 | 93713323052C2EBE | 804 | 0324 |
| 46 | 45000540000040004011298 20A7D119EEFFF0011 | 93713323052C49D4 | 805 | 0325 |
| 47 | 45000540000040004011298 20A7D119EEFFF0011 | 93713323052C7309 | 806 | 0326 |
| 48 | 45000540000040004011298 20A7D119EEFFF0011 | 93713323052C03B8 | 807 | 0327 |
| 49 | 45000540000040004011298 20A7D119EEFFF0011 | 93713323052C7C3D | 808 | 0328 |
| 50 | 45000540000040004011298 20A7D119EEFFF0011 | 93713323052C5ED1 | 809 | 0329 |
| ... | ... | ... | ... | ... |

FIG. 27

| Packet Order | SN (Hex) | CRC (8-bit) | IR-DYN Header (Hex) | SN_LSB (4-bit) | CRC (3-bit) | UO-0 Header (Hex) |
|---|---|---|---|---|---|---|
| 1 | 02F8 | D7 | F802D7004000008054F002F8 | | | |
| 2 | 02F9 | | | 9 | 6 | 4E |
| 3 | 02FA | | | A | 5 | 55 |
| 4 | 02FB | | | B | 2 | 5A |
| 5 | 02FC | | | C | 5 | 65 |
| 6 | 02FD | | | D | 3 | 6B |
| 7 | 02FE | | | E | 0 | 70 |
| 8 | 02FF | | | F | 1 | 79 |
| 9 | 0300 | | | 0 | 6 | 06 |
| 10 | 0301 | | | 1 | 7 | 0F |
| 11 | 0302 | | | 2 | 1 | 11 |
| 12 | 0303 | | | 3 | 3 | 1B |
| 13 | 0304 | | | 4 | 3 | 23 |
| 14 | 0305 | | | 5 | 0 | 28 |
| 15 | 0306 | | | 6 | 5 | 35 |
| 16 | 0307 | | | 7 | 3 | 3B |
| 17 | 0308 | | | 8 | 2 | 42 |
| 18 | 0309 | | | 9 | 0 | 48 |
| 19 | 030A | | | A | 0 | 50 |
| 20 | 030B | | | B | 0 | 58 |
| 21 | 030C | | | C | 3 | 63 |
| 22 | 030D | | | D | 1 | 69 |
| 23 | 030E | | | E | 4 | 74 |
| 24 | 030F | | | F | 2 | 7A |
| 25 | 0310 | | | 0 | 4 | 04 |
| 26 | 0311 | | | 1 | 6 | 0E |
| 27 | 0312 | | | 2 | 3 | 13 |
| 28 | 0313 | | | 3 | 5 | 1D |
| 29 | 0314 | | | 4 | 5 | 25 |
| 30 | 0315 | 91 | F802910040000008083170315 | | | |
| 31 | 0316 | | | 6 | 2 | 32 |
| 32 | 0317 | | | 7 | 2 | 3A |
| 33 | 0318 | | | 8 | 0 | 40 |
| 34 | 0319 | | | 9 | 3 | 4B |
| 35 | 031A | | | A | 1 | 51 |
| 36 | 031B | | | B | 2 | 5A |
| 37 | 031C | | | C | 0 | 60 |
| 38 | 031D | | | D | 3 | 6B |
| 39 | 031E | | | E | 4 | 74 |
| 40 | 031F | | | F | 5 | 7D |
| 41 | 0320 | | | 0 | 0 | 00 |
| 42 | 0321 | | | 1 | 2 | 0A |
| 43 | 0322 | | | 2 | 5 | 15 |
| 44 | 0323 | | | 3 | 4 | 1C |
| 45 | 0324 | | | 4 | 5 | 25 |
| 46 | 0325 | | | 5 | 3 | 2B |
| 47 | 0326 | | | 6 | 7 | 37 |
| 48 | 0327 | | | 7 | 1 | 39 |
| 49 | 0328 | | | 8 | 7 | 47 |
| 50 | 0329 | | | 9 | 2 | 4A |
| ... | ... | | | ... | ... | ... |

FIG. 28

| Packet Order | Static chain (Hex) |
|---|---|
| 1 | 40110A7D119EEFFF001193713323 |
| 30 | 40110A7D119EEFFF001193713323 |

FIG. 30

| Packet Order | SN (Hex) | SN_LSB (4-bit) | CRC (3-bit) | UO-0 (Hex) |
|---|---|---|---|---|
| 1 | 02F8 | 8 | 0 | 40 |
| 2 | 02F9 | 9 | 6 | 4E |
| 3 | 02FA | A | 5 | 55 |
| 4 | 02FB | B | 2 | 5A |
| 5 | 02FC | C | 5 | 65 |
| 6 | 02FD | D | 3 | 6B |
| 7 | 02FE | E | 0 | 70 |
| 8 | 02FF | F | 1 | 79 |
| 9 | 0300 | 0 | 6 | 06 |
| 10 | 0301 | 1 | 7 | 0F |
| 11 | 0302 | 2 | 1 | 11 |
| 12 | 0303 | 3 | 3 | 1B |
| 13 | 0304 | 4 | 3 | 23 |
| 14 | 0305 | 5 | 0 | 28 |
| 15 | 0306 | 6 | 5 | 35 |
| 16 | 0307 | 7 | 3 | 3B |
| 17 | 0308 | 8 | 2 | 42 |
| 18 | 0309 | 9 | 0 | 48 |
| 19 | 030A | A | 0 | 50 |
| 20 | 030B | B | 0 | 58 |
| 21 | 030C | C | 3 | 63 |
| 22 | 030D | D | 1 | 69 |
| 23 | 030E | E | 4 | 74 |
| 24 | 030F | F | 2 | 7A |
| 25 | 0310 | 0 | 4 | 04 |
| 26 | 0311 | 1 | 6 | 0E |
| 27 | 0312 | 2 | 3 | 13 |
| 28 | 0313 | 3 | 5 | 1D |
| 29 | 0314 | 4 | 5 | 25 |
| 30 | 0315 | 5 | 1 | 29 |
| 31 | 0316 | 6 | 2 | 32 |
| 32 | 0317 | 7 | 2 | 3A |
| 33 | 0318 | 8 | 0 | 40 |
| 34 | 0319 | 9 | 3 | 4B |
| 35 | 031A | A | 1 | 51 |
| 36 | 031B | B | 2 | 5A |
| 37 | 031C | C | 0 | 60 |
| 38 | 031D | D | 3 | 6B |
| 39 | 031E | E | 4 | 74 |
| 40 | 031F | F | 5 | 7D |
| 41 | 0320 | 0 | 0 | 00 |
| 42 | 0321 | 1 | 2 | 0A |
| 43 | 0322 | 2 | 5 | 15 |
| 44 | 0323 | 3 | 4 | 1C |
| 45 | 0324 | 4 | 5 | 25 |
| 46 | 0325 | 5 | 3 | 2B |
| 47 | 0326 | 6 | 7 | 37 |
| 48 | 0327 | 7 | 1 | 39 |
| 49 | 0328 | 8 | 7 | 47 |
| 50 | 0329 | 9 | 2 | 4A |
| ... | ... | ... | ... | ... |

FIG. 31

| Packet Order | Static chain (Hex) | Dynamic chain (Hex) |
|---|---|---|
| 1 | 40110A7D119EEFFF001193713323 | 004000008054F002F8 |

FIG. 32

| Packet Order | UO-0 (Hex) | SN_LSB (4-bit) | SN (Hex) | CRC (3-bit) | CRC Result |
|---|---|---|---|---|---|
| 1 | 40 | 8 | 02F8 | 0 | Pass |
| 17 | 42 | 8 | 0308 | 2 | Fail |
| 33 | 40 | 8 | 0318 | 0 | Fail |
| 49 | 47 | 8 | 0328 | 7 | Fail |
| ... | ... | ... | ... | ... | ... |

FIG. 33

| Packet Order | IP header (Hex) | UDP header (Hex) | SN (Hex) | SN_LSB (4-bit) | CRC (3-bit) | UO-0 (Hex) |
|---|---|---|---|---|---|---|
| 1 | 45000540000400040112982047D119EEFFF0011 | 93713323052C0000 | 02F8 | 8 | 0 | 40 |
| 2 | 45000540000400040112982047D119EEFFF0011 | 93713323052C0000 | 02F9 | 9 | 6 | 4E |
| 3 | 45000540000400040112982047D119EEFFF0011 | 93713323052C0000 | 02FA | A | 5 | 55 |
| 4 | 45000540000400040112982047D119EEFFF0011 | 93713323052C0000 | 02FB | B | 2 | 5A |
| 5 | 45000540000400040112982047D119EEFFF0011 | 93713323052C0000 | 02FC | C | 5 | 65 |
| 6 | 45000540000400040112982047D119EEFFF0011 | 93713323052C0000 | 02FD | D | 3 | 6B |
| 7 | 45000540000400040112982047D119EEFFF0011 | 93713323052C0000 | 02FE | E | 0 | 70 |
| 8 | 45000540000400040112982047D119EEFFF0011 | 93713323052C0000 | 02FF | F | 1 | 79 |
| 9 | 45000540000400040112982047D119EEFFF0011 | 93713323052C0000 | 0300 | 0 | 6 | 06 |
| 10 | 45000540000400040112982047D119EEFFF0011 | 93713323052C0000 | 0301 | 1 | 7 | 0F |
| 11 | 45000540000400040112982047D119EEFFF0011 | 93713323052C0000 | 0302 | 2 | 1 | 11 |
| 12 | 45000540000400040112982047D119EEFFF0011 | 93713323052C0000 | 0303 | 3 | 3 | 1B |
| 13 | 45000540000400040112982047D119EEFFF0011 | 93713323052C0000 | 0304 | 4 | 3 | 23 |
| 14 | 45000540000400040112982047D119EEFFF0011 | 93713323052C0000 | 0305 | 5 | 0 | 28 |
| 15 | 45000540000400040112982047D119EEFFF0011 | 93713323052C0000 | 0306 | 6 | 5 | 35 |
| 16 | 45000540000400040112982047D119EEFFF0011 | 93713323052C0000 | 0307 | 7 | 3 | 3B |
| 17 | 45000540000400040112982047D119EEFFF0011 | 93713323052C0000 | 0308 | 8 | 2 | 42 |
| 18 | 45000540000400040112982047D119EEFFF0011 | 93713323052C0000 | 0309 | 9 | 0 | 48 |
| 19 | 45000540000400040112982047D119EEFFF0011 | 93713323052C0000 | 030A | A | 0 | 50 |
| 20 | 45000540000400040112982047D119EEFFF0011 | 93713323052C0000 | 030B | B | 0 | 58 |
| 21 | 45000540000400040112982047D119EEFFF0011 | 93713323052C0000 | 030C | C | 3 | 63 |
| 22 | 45000540000400040112982047D119EEFFF0011 | 93713323052C0000 | 030D | D | 1 | 69 |
| 23 | 45000540000400040112982047D119EEFFF0011 | 93713323052C0000 | 030E | E | 4 | 74 |
| 24 | 45000540000400040112982047D119EEFFF0011 | 93713323052C0000 | 030F | F | 2 | 7A |
| 25 | 45000540000400040112982047D119EEFFF0011 | 93713323052C0000 | 0310 | 0 | 4 | 04 |
| 26 | 45000540000400040112982047D119EEFFF0011 | 93713323052C0000 | 0311 | 1 | 6 | 0E |
| 27 | 45000540000400040112982047D119EEFFF0011 | 93713323052C0000 | 0312 | 2 | 3 | 13 |
| 28 | 45000540000400040112982047D119EEFFF0011 | 93713323052C0000 | 0313 | 3 | 5 | 1D |
| 29 | 45000540000400040112982047D119EEFFF0011 | 93713323052C0000 | 0314 | 4 | 5 | 25 |
| 30 | 45000540000400040112982047D119EEFFF0011 | 93713323052C0000 | 0315 | 5 | 1 | 29 |
| 31 | 45000540000400040112982047D119EEFFF0011 | 93713323052C0000 | 0316 | 6 | 2 | 32 |
| 32 | 45000540000400040112982047D119EEFFF0011 | 93713323052C0000 | 0317 | 7 | 2 | 3A |
| 33 | 45000540000400040112982047D119EEFFF0011 | 93713323052C0000 | 0318 | 8 | 0 | 40 |
| 34 | 45000540000400040112982047D119EEFFF0011 | 93713323052C0000 | 0319 | 9 | 3 | 4B |
| 35 | 45000540000400040112982047D119EEFFF0011 | 93713323052C0000 | 031A | A | 1 | 51 |
| 36 | 45000540000400040112982047D119EEFFF0011 | 93713323052C0000 | 031B | B | 2 | 5A |
| 37 | 45000540000400040112982047D119EEFFF0011 | 93713323052C0000 | 031C | C | 0 | 60 |
| 38 | 45000540000400040112982047D119EEFFF0011 | 93713323052C0000 | 031D | D | 3 | 6B |
| 39 | 45000540000400040112982047D119EEFFF0011 | 93713323052C0000 | 031E | E | 4 | 74 |
| 40 | 45000540000400040112982047D119EEFFF0011 | 93713323052C0000 | 031F | F | 5 | 7D |
| 41 | 45000540000400040112982047D119EEFFF0011 | 93713323052C0000 | 0320 | 0 | 0 | 00 |
| 42 | 45000540000400040112982047D119EEFFF0011 | 93713323052C0000 | 0321 | 1 | 2 | 0A |
| 43 | 45000540000400040112982047D119EEFFF0011 | 93713323052C0000 | 0322 | 2 | 5 | 15 |
| 44 | 45000540000400040112982047D119EEFFF0011 | 93713323052C0000 | 0323 | 3 | 4 | 1C |
| 45 | 45000540000400040112982047D119EEFFF0011 | 93713323052C0000 | 0324 | 4 | 5 | 25 |
| 46 | 45000540000400040112982047D119EEFFF0011 | 93713323052C0000 | 0325 | 5 | 3 | 2B |
| 47 | 45000540000400040112982047D119EEFFF0011 | 93713323052C0000 | 0326 | 6 | 7 | 37 |
| 48 | 45000540000400040112982047D119EEFFF0011 | 93713323052C0000 | 0327 | 7 | 1 | 39 |
| 49 | 45000540000400040112982047D119EEFFF0011 | 93713323052C0000 | 0328 | 8 | 7 | 47 |
| 50 | 45000540000400040112982047D119EEFFF0011 | 93713323052C0000 | 0329 | 9 | 2 | 4A |
| ... | ... | ... | ... | ... | ... | ... |

FIG. 34

| Packet Order | Static chain (Hex) | Dynamic chain (Hex) |
|---|---|---|
| 1 | 40110A7D119EEFFF001193713323 | 0040000080000002F8 |

BROADCAST SIGNAL TRANSMISSION APPARATUS, BROADCAST SIGNAL TRANSMISSION METHOD, BROADCAST SIGNAL RECEPTION APPARATUS AND BROADCAST SIGNAL RECEPTION METHOD

CROSS-REFERENCE TO RELATED APPLICATIONS

This application is a Continuation of U.S. patent application Ser. No. 17/509,417, filed Oct. 25, 2021, which is a Continuation of U.S. patent application Ser. No. 16/672,729, filed Nov. 4, 2019, (U.S. Patent Application No. 11,159,650, issued Oct. 26, 2020), which claims priority to Korean Application No. 10-2018-0137024, filed Nov. 9, 2018, Korean Application No. 10-2018-0133414, filed Nov. 2, 2018, the contents of which are all hereby incorporated by reference herein in their entirety.

BACKGROUND OF THE INVENTION

Field of the Invention

The present disclosure relates to a broadcast signal transmission apparatus, a broadcast signal transmission method, a broadcast signal reception apparatus, and a broadcast signal reception method, and more particularly, to broadcast signal transmission/reception apparatuses and methods for processing data in a link layer.

Discussion of the Related Art

As analog broadcast signal transmission is terminated, various technologies for transmitting and receiving a digital broadcast signal have been developed. A digital broadcast signal is capable of containing a larger amount of video/audio data than an analog broadcast signal and further containing various types of additional data as well as the video/audio data.

That is, a digital broadcast system may provide a high definition (HD) image, multi-channel audio, and various additional services. However, for digital broadcasting, network flexibility needs to be enhanced in consideration of data transmission efficiency for a large amount of data transmission, robustness of a transceiving network, and a mobile receiving device.

DISCLOSURE OF THE INVENTION

Technical Problem

An object of the present disclosure is to provide a broadcast signal transmission apparatus, a broadcast signal transmission method, a broadcast signal reception apparatus, and a broadcast signal reception method, which are intended to efficiently compress and decompress a packet header for a large amount of data transmission and overhead reduction.

Another object of the present disclosure is to provide a broadcast signal transmission apparatus, a broadcast signal transmission method, a broadcast signal reception apparatus, and a broadcast signal reception method, which are intended to efficiently compress and decompress a header of Internet protocol (IP) packet.

Still another object of the present disclosure is to provide a broadcast signal transmission apparatus, a broadcast signal transmission method, a broadcast signal reception apparatus, and a broadcast signal reception method, which are intended to efficiently compress and decompress a header of IP packet in a robust header compression (ROHC) scheme.

Further still another object of the present disclosure is to provide a broadcast signal transmission apparatus, a broadcast signal transmission method, a broadcast signal reception apparatus, and a broadcast signal reception method, which are intended to efficiently process data in a link layer.

Technical Solution

A method of transmitting a broadcast signal according to an embodiment of the present disclosure may include outputting an RoHC channel that includes one or more RoHC streams and a signaling table that includes information related to header compression by performing header compression for IP packets, which include broadcast data, in accordance with an adaptation mode, a header of each IP packet including an IP header and a User Datagram Protocol (UDP) header, an encapsulation step of generating at least one first link layer packet that includes the RoHC channel and generating at least one second link layer packet that includes the signaling table, and physical layer processing the at least one first link layer packet and the at least one second link layer packet and transmitting through one or more Physical Layer Pipes (PLPs), the signaling table includes adaptation mode information indicating the adaptation mode.

According to embodiments of the present disclosure, each RoHC stream in the RoHC channel includes RoHC packets, when the RoHC packets include an Initialization and Refresh (IR) packet, an IR-Dynamic (IR-DYN) packet and compressed packets, the adaptation mode information indicates adaptation mode 1, when the RoHC packets include an IR-DYN packet and compressed packets, the adaptation mode information indicates adaptation mode 2, when the RoHC packets include compressed packets, the adaptation mode information indicates adaptation mode 3, and a value of a context identifier (CID) allocated to headers of the RoHC packets of the RoHC stream that includes the most RoHC packets among one or more RoHC streams in the RoHC channel is 0.

According to embodiments of the present disclosure, the signaling table further includes context information in the adaptation mode 2, the context information including static chain information of a first IP packet of an IP stream corresponding to the RoHC stream.

According to embodiments of the present disclosure, the signaling table further includes context information in the adaptation mode 3, the context information including static chain information and dynamic chain information of a first IP packet of an IP stream corresponding to the RoHC stream.

According to embodiments of the present disclosure, the adaptation mode 2 is selected when information included in headers of input IP packets is frequently updated, and the adaptation mode 3 is selected when information included in the headers of the input IP packets is not updated except a sequence number.

According to embodiments of the present disclosure, the CID is changed at the time when the signaling table is transmitted if a change of the CID is required.

According to embodiments of the present disclosure, performing header compression in accordance with the adaptation mode includes collecting IP packets when the IP packets are IP packets fragmented from an IP packet, recovering the collected IP packets to the IP packet prior to fragmentation and outputting the recovered IP packet for header compression.

According to embodiments of the present disclosure, performing header compression in accordance with the adaptation mode includes: classifying an IP stream by parsing a header of an input IP packet, generating a new context when there is no context of the classified IP stream, updating a context by detecting whether the context is updated when there is the context of the classified IP stream, and detecting a current state through a state machine, determining a packet type based on the detected current state, and generating an RoHC packet corresponding to one of an IR packet, an IR-DYN packet and a compressed packet based on a payload of the IP packet and the determined packet type, and generating and outputting the RoHC stream and the signaling table related to the RoHC stream to be output to the encapsulation step by repeatedly performing a procedure of extracting context information from the IR packet and/or the IR-DYN packet in accordance with the adaptation mode and a type of the generated RoHC packet and a procedure of converting the IR packet and/or the IR-DYN packet from which the context information is extracted, to the IR-DYN packet and/or the compressed packet for the IP packets of the classified IP stream.

According to embodiments of the present disclosure, performing header compression in accordance with the adaptation mode includes: classifying an IP stream by parsing a header of an input IP packet, generating a new context when there is no context of the classified IP stream, updating a context by detecting whether the context is updated when there is the context of the classified IP stream, and detecting a current state through a state machine, determining a packet type based on the detected current state, and generating an RoHC stream by repeatedly performing a procedure of generating an RoHC packet included in the RoHC stream to be output to the encapsulation step in accordance with the determined packet type, context information of the classified IP stream and the adaptation mode for IP packets of the classified IP stream, and generating signaling information related to the RoHC stream in accordance with the determined packet type, the context information of the classified IP stream and the adaptation mode.

According to embodiments of the present disclosure, a PLP for transmitting the at least one first link layer packet that includes the RoHC channel is different from a PLP for transmitting the signaling table.

According to embodiments of the present disclosure, the signaling table is an RoHC-U Description Table (RDT), and is categorized into a catalog RDT and a discrete RDT in accordance with a delivery type, when the catalog RDT includes a plurality of signaling tables, the plurality of signaling tables are continuously included in a payload of the at least one second link layer packet, and a number of signaling tables included in the payload is signaled to a header of the at least one second link layer packet.

An apparatus for transmitting a broadcast signal according to an embodiment of the present disclosure may include an IP header compressor for outputting an RoHC channel that includes one or more RoHC streams and a signaling table that includes information related to header compression by performing header compression for IP packets, which include broadcast data, in accordance with an adaptation mode, a header of each IP packet including an IP header and a UDP header, an encapsulation module for generating at least one first link layer packet that includes the RoHC channel and generating at least one second link layer packet that includes the signaling table, and a physical layer processor for physical layer processing the at least one first link layer packet and the at least one second link layer packet and transmitting through one or more Physical Layer Pipes (PLPs), the signaling table includes adaptation mode information indicating the adaptation mode.

According to embodiments of the present disclosure, each RoHC stream in the RoHC channel includes RoHC packets, when the RoHC packets include an IR packet, an IR-DYN packet and compressed packets, the adaptation mode information indicates adaptation mode 1, when the RoHC packets include an IR-DYN packet and compressed packets, the adaptation mode information indicates adaptation mode 2, when the RoHC packets include compressed packets, the adaptation mode information indicates adaptation mode 3, and a value of a CID allocated to headers of the RoHC packets of the RoHC stream that includes the most RoHC packets among one or more RoHC streams in the RoHC channel is 0.

According to embodiments of the present disclosure, the adaptation mode 2 is selected when information included in headers of input IP packets is frequently updated, and the adaptation mode 3 is selected when information included in the headers of the input IP packets is not updated except a sequence number.

According to embodiments of the present disclosure, the IP header compressor further includes a pre-processing module collects IP packets when the IP packets are IP packets fragmented from an IP packet, recovers the collected IP packets to the IP packet prior to fragmentation and outputs the recovered IP packet for header compression.

According to embodiments of the present disclosure, the IP header compressor includes: a context management module for classifying an IP stream by parsing a header of an input IP packet, generating a new context when there is no context of the classified IP stream, updating a context by detecting whether the context is updated when there is the context of the classified IP stream, and detecting a current state through a state machine, an RoHC packet generator for determining a packet type based on the detected current state, and generating an RoHC packet corresponding to one of an IR packet, an IR-DYN packet and a compressed packet based on a payload of the IP packet and the determined packet type, and an adaptation module for generating and outputting the RoHC stream and the signaling table related to the RoHC stream to be output to the encapsulation module by repeatedly performing a procedure of extracting context information from the IR packet and/or the IR-DYN packet in accordance with the adaptation mode and a type of the generated RoHC packet and a procedure of converting the IR packet and/or the IR-DYN packet from which the context information is extracted, to the IR-DYN packet and/or the compressed packet for the IP packets of the classified IP stream.

According to embodiments of the present disclosure, wherein the IP header compressor includes: a context management module for classifying an IP stream by parsing a header of an input IP packet, generating a new context when there is no context of the classified IP stream, updating a context by detecting whether the context is updated when there is the context of the classified IP stream, and detecting a current state through a state machine, an RoHC packet generator for determining a packet type based on the detected current state, and generating an RoHC stream by repeatedly performing a procedure of generating an RoHC packet included in the RoHC stream to be output to the encapsulation module in accordance with the determined packet type, context information of the classified IP stream and the adaptation mode for IP packets of the classified IP stream, and a signaling generator for generating signaling information related to the RoHC stream in accordance with the determined packet type, the context information of the classified IP stream and the adaptation mode.

According to embodiments of the present disclosure, a PLP for transmitting the at least one first link layer packet that includes the RoHC channel is different from a PLP for transmitting the signaling table.

According to embodiments of the present disclosure, the signaling table is an RDT, and is categorized into a catalog RDT and a discrete RDT in accordance with a delivery type, when the catalog RDT includes a plurality of signaling tables, the plurality of signaling tables are continuously included in a payload of the at least one second link layer packet, and a number of signaling tables included in the payload is signaled to a header of the at least one second link layer packet.

According to embodiments of the present disclosure, a method of receiving a broadcast signal may include receiving the broadcast signal including an RoHC stream that includes compressed packets and a signaling table related to the RoHC stream, wherein the RoHC stream is physical layer processed and received through a first PLP after encapsulated into at least one first link layer packet, wherein the signaling table is physical layer processed and received through a second PLP after encapsulated into at least one second link layer packet, wherein the signaling table includes header compression information related to the RoHC stream, adaptation mode information and context information, and wherein the context information includes static chain information and dynamic chain information corresponding to a first compressed packet of the RoHC stream, physical layer processing the broadcast signal, extracting the RoHC stream from the at least one first link layer packet received by the first PLP of the physical layer processed broadcast signal and extracting the signaling table from the at least one second link layer packet received by the second PLP of the physical layer processed broadcast signal, extracting a sequence number of a full length from the dynamic chain information of the signaling table, detecting compressed packets, which includes a same sequence number as lower 4 bits of the extracted sequence number from the RoHC stream, performing error validation based on CRC for the detected compressed packets based on the sequence number of the full length detected from the dynamic chain information, when there is a compressed packet that passes error validation based on CRC in the above step, starting decompression into an original IP packet based on the static chain information and dynamic chain information included in the signaling table and the passed compressed packet, and when there is no compressed packet that passes error validation based on CRC in the above step, starting decompression into an original IP packet based on the static chain information and dynamic chain information included in the signaling table and a second compressed packet of the RoHC stream.

According to embodiments of the present disclosure, the step of starting decompression based on the second compressed packet includes: checking whether UDP checksum is used, from the dynamic chain information, performing error validation based on CRC for the second compressed packet based on a sequence number of a full length corresponding to a sequence number of the second compressed packet of the RoHC stream when it is checked that UDP checksum is not used, and starting decompression into the original IP packet based on the static chain information and dynamic chain information included in the signaling table and the second compressed packet when the second compressed packet passes error validation based on CRC.

According to embodiments of the present disclosure, the signaling table is an RDT, and is categorized into a catalog RDT and a discrete RDT in accordance with a delivery type, when the catalog RDT includes a plurality of signaling tables, the plurality of signaling tables are continuously included in a payload of the at least one second link layer packet, and a number of signaling tables included in the payload is signaled to a header of the at least one second link layer packet.

Advantageous Effects

According to the present disclosure, an IP header compression procedure may be simplified to reduce complexity of a broadcast system.

According to the present disclosure, context information is extracted from IR packets and/or IR-DYN packets in accordance with an adaptation mode during header compression of IP packets, and a procedure of converting the IR packets and/or IR-DYN packets, from which the context information is extracted, to IR-DYN and/or compressed packets is omitted, and packets of compressed IP streams and RDT are generated, whereby hardware complexity is reduced.

According to the present disclosure, if UDP checksum is not used, even though a first compressed packet of the compressed IP streams is missed at a receiving side, next compressed packet is used for decompression without being discarded, whereby it is not required to wait for next RDT to start decompression and therefore a decompression time is shortened.

According to the present disclosure, IP fragmentation applied in a transmission system is avoided prior to transmission to a reception system, whereby implementation of the reception system may be simplified.

According to the present disclosure, bandwidth reduction of IP header compression may be increased effectively.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 is a diagram showing a low level signaling (LLS) table and a service list table (SLT) according to an embodiment of the present disclosure;

FIG. 4 is a diagram showing a USBD and an S-TSID delivered through ROUTE according to an embodiment of the present disclosure;

FIG. 5 is a diagram showing a USBD delivered through an MMT according to an embodiment of the present disclosure;

FIG. 12 illustrates one example of syntax of code values allocated to a packet_type field of FIG. 11;

FIG. 14 illustrates one example of a syntax structure of additional header for signaling information of FIG. 13;

FIG. 15 illustrates one example of a syntax structure of LMT according to the present disclosure;

FIG. 16 illustrates one example of a syntax structure of RDT according to the present disclosure;

FIGS. 20(*a*) to 20(*c*) illustrate examples of IR packet, IR-DYN packet and UO-0 packet formats when small CID is allocated and has a value of 0;

FIG. 26 illustrates that IP streams including IP/UDP header of uncompressed IP packets according to the present disclosure are shown in a hexadecimal type;

FIG. 27 illustrates one example of field values of IR-DYN packets and compressed packets included in RoHC streams of an adaptation mode 2 according to the present disclosure;

FIG. 28 illustrates one example of static chain information extracted from a first IR-DYN packet and a 30th IR-DYN packet of FIG. 27;

FIG. 30 illustrates one example of field values of compressed packets included in RoHC streams of an adaptation mode 3 according to the present disclosure;

FIG. 31 illustrates one example of static chain information and dynamic chain information included in RDT related with a first compressed packet of FIG. 30;

FIG. 32 illustrates one example of result of CRC verified based on a sequence number included in dynamic chain information of RDT and a sequence number of compressed packets according to the present disclosure;

FIG. 33 illustrates one example of field values of IP/UDP header of IP packets within packet streams and field values of a header of compressed packets when UDP checksum according to the present disclosure is not used;

FIG. 34 illustrates one example of static chain information and dynamic chain information included in RDT related with a first compressed packet of FIG. 33;

DETAILED DESCRIPTION OF THE INVENTION

Figure 1:
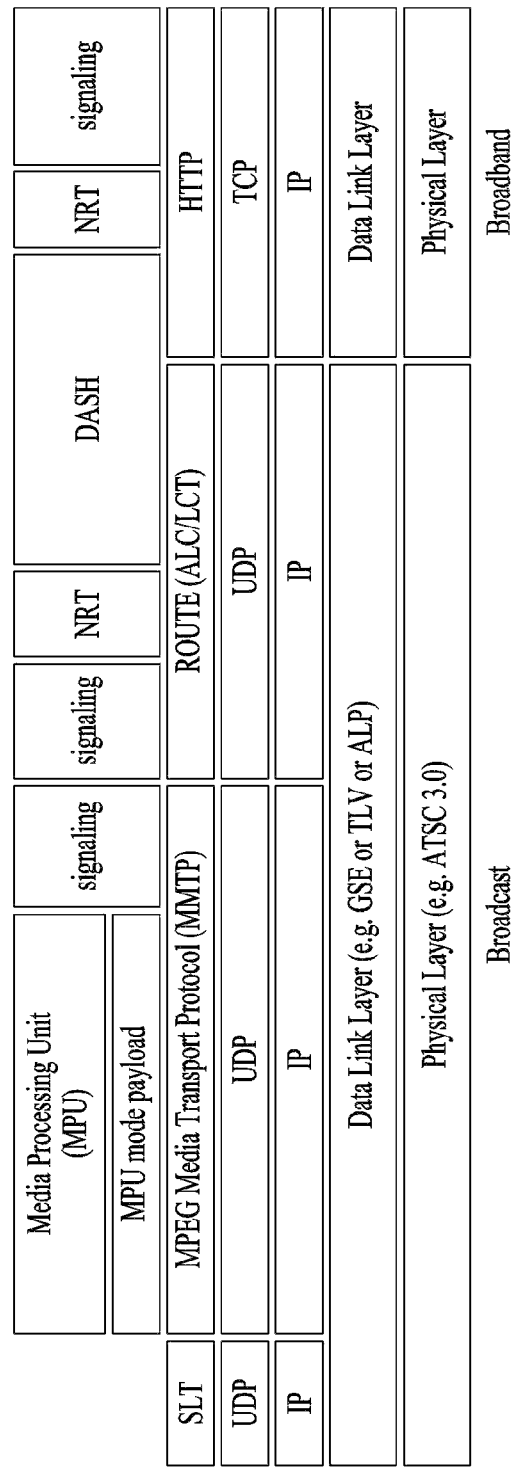
FIG. 1 is a diagram showing a protocol stack according to an embodiment of the present disclosure.

Reference will now be made in detail to the preferred embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

Although the terms used in this specification are selected from generally known and used terms considering their functions in the present specification, the terms may be modified depending on intention of a person skilled in the art, practices, or the advent of new technology. Also, in special case, the terms mentioned in the description of the present specification may be selected by the applicant at his or her discretion, the detailed meanings of which are described in relevant parts of the description herein. Accordingly, the terms used herein should be understood not simply by the actual terms used but by the meaning lying within and the description disclosed herein.

Specific structural or functional descriptions in the embodiments disclosed in this specification are intended to describe the embodiments, and the embodiments can be carried out in various forms and it should not be understood that the scope of the disclosure is limited by the embodiments described in this specification.

Since the embodiments according to the present specification may be carried out in other specific ways and various modifications may be made in the embodiments, specific embodiments will be illustrated in the drawings and will be described in detail in this specification. However, this is not intended to limit the embodiments according to the present specification to a specific disclosed type, and it is to be understood that the embodiments according to the present specification include all changes, equivalents, or replacements included in spirits and technical scope of the present specification.

Although the terms such as "first" and/or "second" in this specification may be used to describe various elements, it is to be understood that the elements are not limited by such terms. The terms may be used to identify one element from another element. For example, the first element may be referred to as the second element, and vice versa within the range that does not depart from the scope of the present specification.

In the specification, when a part "comprises" or "includes" an element, it means that the part further comprises or includes another element unless otherwise mentioned. Also, the term " . . . module (or unit)" disclosed in the specification means a unit for processing at least one function or operation, and may be implemented by hardware, software or combination of hardware and software.

In this specification, 'signaling' indicates that service information (SI) provided from a broadcast system, Internet broadcast system and/or Internet combined system is transmitted/received. The service information includes broadcast service information (for example, ATSC-SI and/or DVB-SI) provided from each broadcast system which currently exists.

In this specification, 'broadcast signal' is defined to include signal and/or data provided from bidirectional broadcasting such as Internet broadcasting, broadband broadcasting, communication broadcasting, data broadcasting and/or video on demand (VOD) in addition to terrestrial broadcasting, cable broadcasting, satellite broadcasting and/or mobile broadcasting.

In this specification, a 'Physical Layer Pipe (PLP)' means a certain unit that transmits data belonging to a physical layer. Therefore, the PLP in this specification may be referred to as a 'data unit' or a 'data pipe'.

As one of powerful applications to be used for digital broadcasting (DTV) services, there may be a hybrid broadcast service through interaction between a broadcast network and Internet network. The hybrid broadcast service may allow a user to experience various contents by transmitting enhancement data associated with broadcast audio/video (A/V) contents transmitted through a terrestrial broadcast network or some of broadcast A/V contents through Internet network (or broadband) in real time.

The present disclosure is intended to provide a broadcast transmission device, a broadcast signal reception device, a broadcast transmission method and a broadcast reception method, which are capable of transmitting and receiving a broadcast signal for an advanced broadcast service. The advanced broadcast service according to one embodiment of the present disclosure includes a terrestrial broadcast service, a mobile broadcast service, and ultra-high definition television (UHDTV) service.

In one embodiment of the present disclosure, the broadcast signal for the advanced broadcast service is processed in a non-MIMO (multi input multi output) scheme or a MIMO scheme. The non-MIMO scheme according to one embodiment of the present disclosure may include a Multi Input Single Output (MISO) scheme, Single Input Single Output (SISO) scheme, etc. Hereinafter, although multiple antennas of MISO or MIMO may be described based on two antennas, for example, the description of the present disclosure may be applied to a system that uses two or more antennas.

Also, in the present disclosure, a signal frame (or frame or A3 frame or physical layer frame) is divided into three regions, and a first region located at the front of the signal frame is referred to as a bootstrap (or bootstrap region), a second region located next to the first region is referred to as a preamble (or preamble region), and a third region located next to the second region is referred to as a data region.

The bootstrap region includes data, and the preamble region includes L1 (Layer 1) signaling data (or L1 control signaling data) applicable to the other of this frame. The data region is divided into one or more subframes. If a plurality of subframes exist in one signal frame, the plurality of subframes are concatenated together in time. One subframe includes a set of time-frequency resources in the signal frame. That is, data transmitted to one or more PLPs are mapped into one or more subframes.

The L1 signaling data provide information required to configure physical layer parameters. The L1 signaling data include L1-Basic signaling data L1-Detail signaling data. At this time, the bootstrap data may be included in the L1 signaling data.

In one embodiment, in the information included in the L1 signaling data which will be described later, information starting with L1B is information included in the L1-Basic signaling data, and information starting with L1D is information included in the L1-Detail signaling data.

FIG. 1 is a diagram showing a protocol stack according to an embodiment of present disclosure.

A service may be delivered to a receiver through a plurality of layers. First, a transmission side may generate service data. The service data may be processed for transmission at a delivery layer of the transmission side and the service data may be encoded into a broadcast signal and transmitted over a broadcast or broadband network at a physical layer.

Here, the service data may be generated in an ISO base media file format (BMFF). ISO BMFF media files may be used for broadcast/broadband network delivery, media encapsulation and/or synchronization format. Here, the service data is all data related to the service and may include service components configuring a linear service, signaling information thereof, non real time (NRT) data and other files.

The delivery layer will be described. The delivery layer may provide a function for transmitting service data. The service data may be delivered over a broadcast and/or broadband network.

Broadcast service delivery may include two methods.

As a first method, service data may be processed in media processing units (MPUs) based on MPEG media transport (MMT) and transmitted using an MMT protocol (MMTP). In this case, the service data delivered using the MMTP may include service components for a linear service and/or service signaling information thereof.

As a second method, service data may be processed into DASH segments and transmitted using real time object delivery over unidirectional transport (ROUTE), based on MPEG DASH. In this case, the service data delivered through the ROUTE protocol may include service components for a linear service, service signaling information thereof and/or NRT data. That is, the NRT data and non-timed data such as files may be delivered through ROUTE.

Data processed according to MMTP or ROUTE protocol may be processed into IP packets through a User Datagram Protocol/Internet Protocol (UDP/IP) layer. In other words, in a UDP/IP layer, a UDP packet is made by adding a UDP header to a UDP payload including data processed according to MMTP or ROUTE protocol and an IP/UDP packet is made by adding an IP header to the UDP packet. In the present disclosure, for convenience of description, an IP/UDP packet will be referred to as an IP packet. In service data delivery over the broadcast network, a service list table (SLT) may also be delivered over the broadcast network through a UDP/IP layer. The SLT may be delivered in a low level signaling (LLS) table. The SLT and LLS table will be described later.

IP packets may be processed into link layer packets in a link layer. The link layer may encapsulate various formats of data delivered from a higher layer into link layer packets and then deliver the packets to a physical layer. The link layer will be described later.

In hybrid service delivery, at least one service element may be delivered through a broadband path. In hybrid service delivery, data delivered over broadband may include service components of a DASH format, service signaling information thereof and/or NRT data. This data may be processed through HTTP/TCP/IP and delivered to a physical layer for broadband transmission through a link layer for broadband transmission.

The physical layer may process the data received from the delivery layer (higher layer and/or link layer) and transmit the data over the broadcast or broadband network. A detailed description of the physical layer will be given later.

The service will be described. The service may be a collection of service components displayed to a user, the components may be of various media types, the service may be continuous or intermittent, the service may be real time or non real time, and a real-time service may include a sequence of TV programs.

The service may have various types. First, the service may be a linear audio/video or audio service having app based enhancement. Second, the service may be an app based service, reproduction/configuration of which is controlled by a downloaded application. Third, the service may be an ESG service for providing an electronic service guide (ESG). Fourth, the service may be an emergency alert (EA) service for providing emergency alert information.

When a linear service without app based enhancement is delivered over the broadcast network, the service component may be delivered by (1) one or more ROUTE sessions or (2) one or more MMTP sessions.

When a linear service having app based enhancement is delivered over the broadcast network, the service component may be delivered by (1) one or more ROUTE sessions or (2) zero or more MMTP sessions. In this case, data used for app based enhancement may be delivered through a ROUTE session in the form of NRT data or other files. In one embodiment of present disclosure, simultaneous delivery of linear service components (streaming media components) of one service using two protocols may not be allowed.

When an app based service is delivered over the broadcast network, the service component may be delivered by one or more ROUTE sessions. In this case, the service data used for the app based service may be delivered through the ROUTE session in the form of NRT data or other files.

Some service components of such a service, some NRT data, files, etc. may be delivered through broadband (hybrid service delivery).

That is, in one embodiment of present disclosure, linear service components of one service may be delivered through the MMT protocol. In another embodiment of present disclosure, the linear service components of one service may be delivered through the ROUTE protocol. In another embodiment of present disclosure, the linear service components of one service and NRT data (NRT service components) may be delivered through the ROUTE protocol. In another embodiment of present disclosure, the linear service components of one service may be delivered through the MMT protocol and the NRT data (NRT service components) may be delivered through the ROUTE protocol. In the above-described embodiments, some service components of the service or some NRT data may be delivered through broadband. Here, the app based service and data regarding app based enhancement may be delivered over the broadcast network according to ROUTE or through broadband in the form of NRT data. NRT data may be referred to as locally cached data.

Each ROUTE session includes one or more LCT sessions for wholly or partially delivering content components configuring the service. In streaming service delivery, the LCT session may deliver individual components of a user service, such as audio, video or closed caption stream. The streaming media is formatted into a DASH segment.

Each MMTP session includes one or more MMTP packet flows for delivering all or some of content components or an MMT signaling message. The MMTP packet flow may deliver a component formatted into MPU or an MMT signaling message.

For delivery of an NRT user service or system metadata, the LCT session delivers a file based content item. Such content files may include consecutive (timed) or discrete (non-timed) media components of the NRT service or metadata such as service signaling or ESG fragments. System metadata such as service signaling or ESG fragments may be delivered through the signaling message mode of the MMTP.

Figure 2:
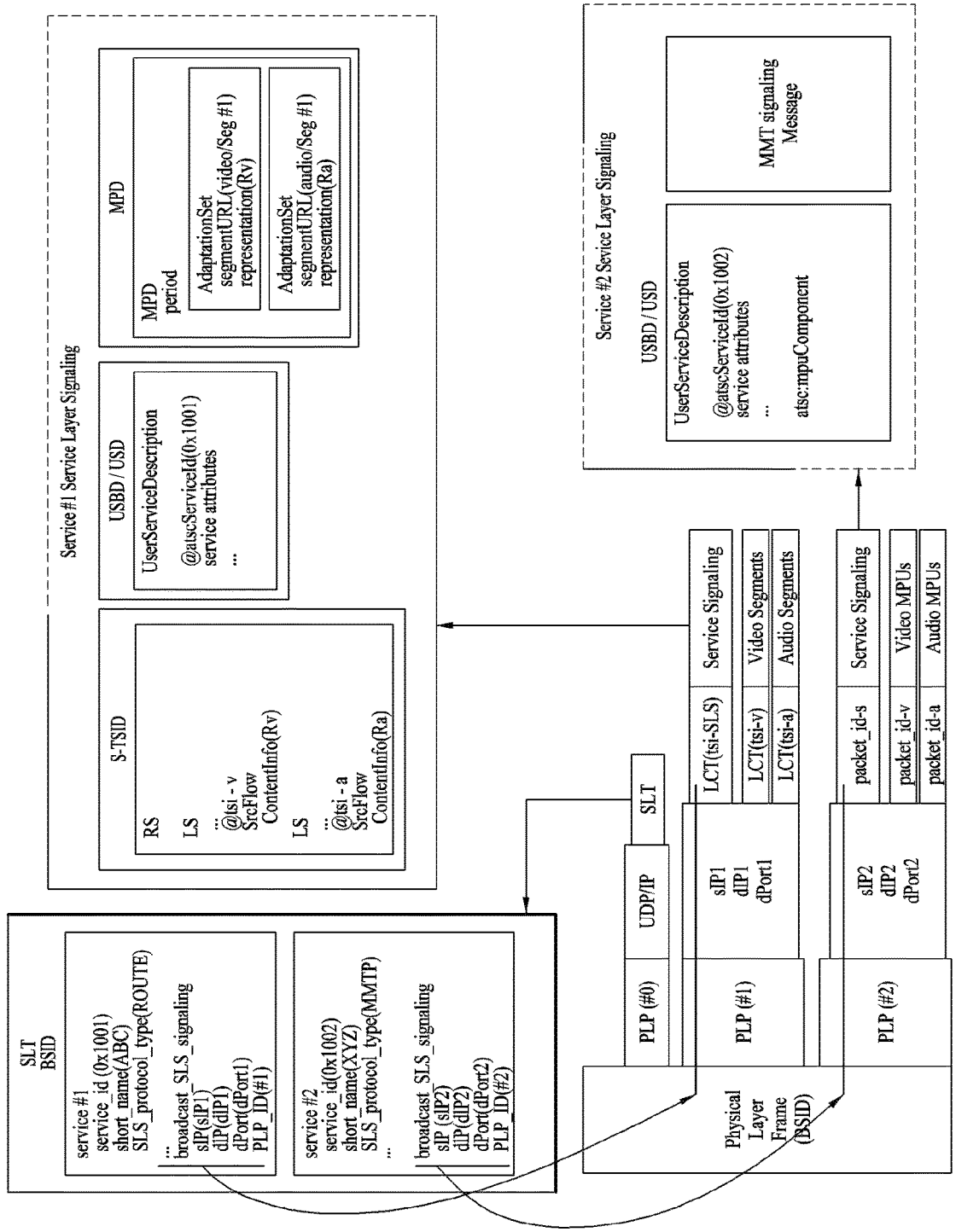
FIG. 2 is a diagram showing a service discovery procedure according to an embodiment of the present disclosure.

A receiver may detect a broadcast signal while a tuner tunes to frequencies. The receiver may extract and send an SLT to a processing module (i.e., SLT parser). The SLT parser may parse the SLT and acquire data and generate or update a channel map based on the acquired data. The receiver may acquire and deliver bootstrap information of the SLT to a ROUTE or MMT client. The receiver may acquire and store an SLS. FIG. 2 is a diagram showing a service discovery procedure according to one embodiment of present disclosure.

A broadcast stream delivered by a broadcast signal frame of a physical layer may carry low level signaling (LLS). LLS data may be carried through payload of IP packets delivered to a well-known IP address/port. This LLS may include an SLT according to type thereof. The LLS data may be formatted in the form of an LLS table. A first byte of every UDP/IP packet carrying the LLS data may be the start of the LLS table. Unlike the shown embodiment, an IP stream for delivering the LLS data may be delivered to a PLP along with other service data.

The SLT may enable the receiver to generate a service list through fast channel scan and provides access information for locating the SLS. The SLT includes bootstrap information. This bootstrap information may enable the receiver to acquire service layer signaling (SLS) of each service. When the SLS, that is, service signaling information, is delivered through ROUTE, the bootstrap information may include destination IP address, source IP address, and destination port information of an LCT channel carrying the SLS or a ROUTE session including the LCT channel. When the SLS is delivered through the MMT, the bootstrap information may include destination IP address and destination port information of an MMTP session carrying the SLS.

In the shown embodiment, the SLS of service #1 described in the SLT is delivered through ROUTE and the SLT may include bootstrap information sIP1, dIP1 and dPort1 of the ROUTE session including the LCT channel delivered by the SLS. The SLS of service #2 described in the SLT is delivered through MMT and the SLT may include bootstrap information dIP2 and dPort2 of the MMTP session including the MMTP packet flow delivered by the SLS.

The SLS is signaling information describing the properties of the service and may include receiver capability information for significantly reproducing the service or providing information for acquiring the service and the service component of the service. When each service has separate service signaling, the receiver acquires appropriate SLS for a desired service without parsing all SLSs delivered within a broadcast stream.

When the SLS is delivered through the ROUTE protocol, the SLS may be delivered through a dedicated LCT channel of a ROUTE session indicated by the SLT. In some embodiments, this LCT channel may be an LCT channel identified by tsi=0. In this case, the SLS may include a user service bundle description (USBD)/user service description (USD), service-based transport session instance description (S-TSID) and/or media presentation description (MPD). The SLS may further include an HTML Entry pages Location Description (HELD), a Distribution Window Description (DWD) and/or a Regional Service Availability Table (RAT).

Here, USBD/USD is one of SLS fragments and may serve as a signaling hub describing detailed description information of a service.

The S-TSID is one of SLS fragments and may provide overall session description information of a transport session carrying the service component of the service. The S-TSID may provide the ROUTE session through which the service component of the service is delivered and/or transport session description information for the LCT channel of the ROUTE session. The S-TSID may provide component acquisition information of service components associated with one service. The S-TSID may provide mapping between DASH representation of the MPD and the tsi of the service component. The component acquisition information of the S-TSID may be provided in the form of the identifier of the associated DASH representation and tsi and may or may not include a PLP ID in some embodiments. Through the component acquisition information, the receiver may collect audio/video components of one service and perform buffering and decoding of DASH media segments.

The MPD is one of SLS fragments and may provide a description of DASH media presentation of the service. The MPD may provide a resource identifier of media segments and provide context information within the media presentation of the identified resources. The MPD may describe DASH representation (service component) delivered over the broadcast network and describe additional DASH presentation delivered over broadband (hybrid delivery). HELD provides application-related metadata that enables the loading and unloading of an application including the information about application-related files, such as an application entry page, files associated with the entry page, media assets expected to be consumed by the application, or a combination of these content types for one or more applications associated with a service.

DWD provides a broadcast delivery schedule of NRT files for consumption by either a receiver or broadcaster applications, and may contain additional metadata such as application context identifiers and filter codes that enable selective content reception, identification of the application to which the application-related files belong.

RSAT provides a schedule of upcoming changes to available broadcast services in the region. This schedule indicates when services will move to another broadcast or will be discontinued.

When the SLS is delivered through the MMT protocol, the SLS may be delivered through a dedicated MMTP packet flow of the MMTP session indicated by the SLT. In some embodiments, the packet_id of the MMTP packets delivering the SLS may have a value of 00. In this case, the SLS may include a USBD/USD and/or MMT packet (MP) table. The SLS may further include an HELD and a DWD.

Here, the USBD is one of SLS fragments and may describe detailed description information of a service as in ROUTE. This USBD may include reference information (URI information) of other SLS fragments. The USBD of the MMT may reference an MP table of MMT signaling. In some embodiments, the USBD of the MMT may include reference information of the S-TSID and/or the MPD. Here, the S-TSID is for NRT data delivered through the ROUTE protocol. Even when a linear service component is delivered through the MMT protocol, NRT data may be delivered via the ROUTE protocol. The MPD is for a service component delivered over broadband in hybrid service delivery. The MP table is a signaling message of the MMT for MPU components and may provide overall session description information of an MMTP session carrying the service component of the service. In addition, the MP table may include a description of an asset delivered through the MMTP session. The MP table is streaming signaling information for MPU components and may provide a list of assets corresponding to one service and location information (component acquisition information) of these components. The detailed description of the MP table may be defined in the MMT or modified. Here, the asset is a multimedia data entity, is combined by one unique ID, and may mean a data entity used to one multimedia presentation. The asset may correspond to service components configuring one service. A streaming service component (MPU) corresponding to a desired service may be accessed using the MP table. The MP table may be referenced by the USBD as described above.

The other MMT signaling messages may be defined Additional information associated with the service and the MMTP session may be described by such MMT signaling messages.

The ROUTE session is identified by a source IP address, a destination IP address and a destination port number. The LCT session is identified by a unique transport session identifier (TSI) within the range of a parent ROUTE session. The MMTP session is identified by a destination IP address and a destination port number. The MMTP packet flow is identified by a unique packet_id within the range of a parent MMTP session.

In case of ROUTE, the S-TSID, the USBD/USD, the MPD or the LCT session delivering the same may be referred to as a service signaling channel. In case of MMTP, the USBD/USD, the MMT signaling message or the packet flow delivering the same may be referred to as a service signaling channel.

Unlike the shown embodiment, one ROUTE or MMTP session may be delivered over a plurality of PLPs. That is, one service may be delivered through one or more PLPs. Unlike the shown embodiment, in some embodiments, components configuring one service may be delivered through different ROUTE sessions. In addition, in some embodiments, components configuring one service may be delivered through different MMTP sessions. In some embodiments, components configuring one service may be divided and delivered in a ROUTE session and an MMTP session. Although not shown, components configuring one service may be delivered through broadband (hybrid delivery).

FIG. 3 is a diagram showing a low level signaling (LLS) table and a service list table (SLT) according to one embodiment of present disclosure.

One embodiment t3010 of the LLS table may include information according to an LLS_table_id field, an LLS_table_version field and/or an LLS_table_id field. The LLS table may further include an LLS_group_id field and a group_count_minus1 field.

The LLS_table_id field may identify a type of table delivered in the body. The LLS_table_version field may provide the version information of the LLS table. In one embodiment, a value of this field is increased as much as 1 whenever data of the table identified by combination the LLS_table_id field and the LLS_group_id field are changed.

According to the value of the LLS_table_id field, the LLS table may include at least one of the above-described SLT, a rating region table (RRT) including information on a content advisory rating, SystemTime information for providing information associated with a system time, Advanced Emergency Alerting Table (AEAT) for providing information associated with emergency alert. In some embodiments, the other information may be included in the LLS table. The LLS table may include an Advanced Emergency Alerting Table (AEAT) fragment based on Advanced Emergency Alerting Message Format (AEA-MF) structure instead of the CAP message. The AEAT may include the CAP message. Besides these, different information may be included in LLS table according to embodiments.

The LLS_group_id field associates this instance of LLS_table( ) with a group of tables with the same LLS_group_id. The scope of this field is the broadcast stream. That is, the value of the LLS_group_id field shall be unique within this broadcast stream.

The group_count_minus1 field indicates one less than the total number of different LLS table groups of tables in the ALP packet stream carried in a current LLS packet stream or a specific PLP. A value 0 indicates that LLS_table( )s carrying only one value of LLS_group_id is present, a value of 1 indicates that LLS_table( )s carrying two values of LLS_group_id are present.

One embodiment t3020 of the shown SLT may include an @bsid attribute, an @sltCapabilities attribute, an sltInetUrl element and/or a Service element. Each field may be omitted according to the value of the shown Use column or a plurality of fields may be present.

The @bsid attribute may be the identifier of a broadcast stream. The @sltCapabilities attribute may provide capability information required to decode and significantly reproduce all services described in the SLT. The sltInetUrl element may provide base URL information used to obtain service signaling information and ESG for the services of the SLT over broadband. The sltInetUrl element may further include an @urlType attribute, which may indicate the type of data capable of being obtained through the URL. For example, when a value of the @urlType attribute is 1', the sltInetUrl element indicates a URL of a service layer signaling server. When a value of the @urlType attribute is '2', the sltInetUrl element indicates a URL of an ESG server. When a value of the @urlType attribute is '3', the sltInetUrl element indicates a URL of a Service Usage Data Gathering Report server. When a value of the @urlType attribute is '4', the sltInetUrl element indicates a URL of a Dynamic Event WebSocket server.

The Service element may include information on services described in the SLT, and the Service element of each service may be present. The Service element may include an @serviceId attribute, an @sltSvcSeqNum attribute, an @protected attribute, an @majorChannelNo attribute, an @minorChannelNo attribute, an @serviceCategory attribute, an @shortServiceName attribute, an @hidden attribute, an @broadbandAccessRequired attribute, an @svcCapabilities attribute, a BroadcastSvcSignaling element and/or an svcInetUrl element. The Service element may further include an @globalserviceID attribute.

The @serviceId attribute is the identifier of the service and the @globalserviceID attribute is a globally unique URI value that represents the identity of the service. The @sltSvcSeqNum attribute may indicate the sequence number of the SLT information of the service. The @protected attribute may indicate whether at least one service component necessary for significant reproduction of the service is protected. The @majorChannelNo attribute and the @minorChannelNo attribute may indicate the major channel number and minor channel number of the service, respectively.

The @serviceCategory attribute may indicate the category of the service. The category of the service may include a linear A/V service, a linear audio service, an app based service, an ESG service, an EAS service, etc. The @shortServiceName attribute may provide the short name of the service. The @hidden attribute may indicate whether the service is for testing or proprietary use. The @broadbandAccessRequired attribute may indicate whether broadband access is necessary for significant reproduction of the service. The @svcCapabilities attribute may provide capability information necessary for decoding and significant reproduction of the service. The Service attribute may include an @essential element. The @essential element indicates whether an essential portion of this service is delivered via this broadcast stream.

The BroadcastSvcSignaling element may provide information associated with broadcast signaling of the service. This element may provide information such as location, protocol and address with respect to signaling over the broadcast network of the service. Details thereof will be described below.

The svcInetUrl element may provide URL information for accessing the signaling information of the service over broadband. The sltInetUrl element may further include an @urlType attribute, which may indicate the type of data capable of being obtained through the URL.

The above-described BroadcastSvcSignaling element may include an @ slsProtocol attribute, an @ slsMajorProtocolVersion attribute, an @ slsMinorProtocolVersion attribute, an @ slsPlpId attribute, an @ slsDestinationIpAddress attribute, an @ slsDestinationUdpPort attribute and/or an @ slsSourceIpAddress attribute.

The @slsProtocol attribute may indicate the protocol used to deliver the SLS of the service (ROUTE, MMT, etc.). The @slsMajorProtocolVersion attribute and the @slsMinorProtocolVersion attribute may indicate the major version number and minor version number of the protocol used to deliver the SLS of the service, respectively.

The @ slsPlpId attribute may provide a PLP identifier for identifying the PLP delivering the SLS of the service. In some embodiments, this field may be omitted and the PLP information delivered by the SLS may be checked using a combination of the information of the below-described LMT and the bootstrap information of the SLT.

The @ slsDestinationIpAddress attribute, the @ slsDestinationUdpPort attribute and the @ slsSourceIpAddress attribute may indicate the destination IP address, destination UDP port and source IP address of the transport packets delivering the SLS of the service, respectively. These may identify the transport session (ROUTE session or MMTP session) delivered by the SLS. These may be included in the bootstrap information.

FIG. 4 is a diagram showing a USBD and an S-TSID delivered through ROUTE according to one embodiment of present disclosure.

One embodiment t4010 of the shown USBD may have a bundleDescription root element. The bundleDescription root element may have a userServiceDescription element. The userServiceDescription element may be an instance of one service.

The userServiceDescription element may include an @globalServiceID attribute, an @ serviceId attribute, an @serviceStatus attribute, an @fullMPDUri attribute, an @sTSIDUri attribute, a name element, a serviceLanguage element, a capabilityCode element and/or a deliveryMethod element. Each field may be omitted according to the value of the shown Use column or a plurality of fields may be present.

The @globalServiceID attribute is the globally unique identifier of the service and may be used for link with ESG data (Service @globalServiceID). The @serviceId attribute is a reference corresponding to the service entry of the SLT and may be equal to the service ID information of the SLT. The @serviceStatus attribute may indicate the status of the service. This field may indicate whether the service is active or inactive.

The @fullMPDUri attribute may reference the MPD fragment of the service. The MPD may provide a reproduction description of a service component delivered over the broadcast or broadband network as described above. The @sTSIDUri attribute may reference the S-TSID fragment of the service. The S-TSID may provide parameters associated with access to the transport session carrying the service as described above.

The name element may provide the name of the service. This element may further include an @lang attribute and this field may indicate the language of the name provided by the name element. The serviceLanguage element may indicate available languages of the service. That is, this element may arrange the languages capable of being provided by the service.

The capabilityCode element may indicate capability or capability group information of a receiver necessary to significantly reproduce the service. This information is compatible with capability information format provided in service announcement.

The deliveryMethod element may provide transmission related information with respect to content accessed over the broadcast or broadband network of the service. The deliveryMethod element may include a broadcastAppService element and/or a unicastAppService element. Each of these elements may have a basePattern element as a sub element.

The broadcastAppService element may include transmission associated information of the DASH representation delivered over the broadcast network. The DASH representation may include media components over all periods of the service presentation.

The basePattern element of this element may indicate a character pattern used for the receiver to perform matching with the segment URL. This may be used for a DASH client to request the segments of the representation. Matching may imply delivery of the media segment over the broadcast network.

The unicastAppService element may include transmission related information of the DASH representation delivered over broadband. The DASH representation may include media components over all periods of the service media presentation.

The basePattern element of this element may indicate a character pattern used for the receiver to perform matching with the segment URL. This may be used for a DASH client to request the segments of the representation. Matching may imply delivery of the media segment over broadband.

One embodiment t4020 of the shown S-TSID may have an S-TSID root element. The S-TSID root element may include an @serviceId attribute and/or an RS element. Each field may be omitted according to the value of the shown Use column or a plurality of fields may be present.

The @serviceId attribute is the identifier of the service and may reference the service of the USBD/USD. The RS element may describe information on ROUTE sessions through which the service components of the service are delivered. According to the number of ROUTE sessions, a plurality of elements may be present. The RS element may further include an @bsid attribute, an @sIpAddr attribute, an @dIpAddr attribute, an @dport attribute, an @PLPID attribute and/or an LS element.

The @bsid attribute may be the identifier of a broadcast stream in which the service components of the service are delivered. If this field is omitted, a default broadcast stream may be a broadcast stream including the PLP delivering the SLS of the service. The value of this field may be equal to that of the @bsid attribute.

The @sIpAddr attribute, the @dIpAddr attribute and the @dport attribute may indicate the source IP address, destination IP address and destination UDP port of the ROUTE session, respectively. When these fields are omitted, the default values may be the source address, destination IP address and destination UDP port values of the current ROUTE session delivering the SLS, that is, the S-TSID. This field may not be omitted in another ROUTE session delivering the service components of the service, not in the current ROUTE session.

The @PLPID attribute may indicate the PLP ID information of the ROUTE session. If this field is omitted, the default value may be the PLP ID value of the current PLP delivered by the S-TSID. In some embodiments, this field is omitted and the PLP ID information of the ROUTE session may be checked using a combination of the information of the below-described LMT and the IP address/UDP port information of the RS element.

The LS element may describe information on LCT channels through which the service components of the service are transmitted. According to the number of LCT channel, a plurality of elements may be present. The LS element may include an @tsi attribute, an @PLPID attribute, an @bw attribute, an @startTime attribute, an @endTime attribute, a SrcFlow element and/or a RepairFlow element.

The @tsi attribute may indicate the tsi information of the LCT channel. Using this, the LCT channels through which the service components of the service are delivered may be identified. The @PLPID attribute may indicate the PLP ID information of the LCT channel. In some embodiments, this field may be omitted. The @bw attribute may indicate the maximum bandwidth of the LCT channel. The @ startTime attribute may indicate the start time of the LCT session and the @endTime attribute may indicate the end time of the LCT channel.

The SrcFlow element may describe the source flow of ROUTE. The source protocol of ROUTE is used to transmit a delivery object and at least one source flow may be established within one ROUTE session. The source flow may deliver associated objects as an object flow.

The RepairFlow element may describe the repair flow of ROUTE. Delivery objects delivered according to the source protocol may be protected according to forward error correction (FEC) and the repair protocol may define an FEC framework enabling FEC protection.

FIG. 5 is a diagram showing a USBD delivered through MMT according to one embodiment of present disclosure.

One embodiment of the shown USBD may have a bundleDescription root element. The bundleDescription root element may have a userServiceDescription element. The userServiceDescription element may be an instance of one service.

The userServiceDescription element may include an @globalServiceID attribute, an @ serviceId attribute, a Name element, a serviceLanguage element, a contentAdvisoryRating element, a Channel element, a mpuComponent element, a routeComponent element, a broadbandComponent element and/or a ComponentInfo element. The userServiceDescription element may further include an @servicestatus attribute and otherRatings element.

Each field may be omitted according to the value of the shown Use column or a plurality of fields may be present.

The @ globalServiceID attribute, the @ serviceId attribute, the @ servicestatus, the Name element and/or the serviceLanguage element may be equal to the fields of the USBD delivered through ROUTE. The contentAdvisoryRating element may indicate the RRT-based content advisory rating of the service. The otherRatings element may indicate non-RRT content advisory rating of the service. This information is compatible with content advisory rating information format provided in service announcement. The Channel element may include information associated with the service. A detailed description of this element will be given below.

The mpuComponent element may provide a description of service components delivered as the MPU of the service. This element may further include an @mmtPackageId attribute, an @contentIdSchemeIdUri attribute, an @contentIdValue attribute, an @nextMmtPackageId attribute, an @nextcontentIdSchemeIdUri attribute, an and/or @nextcontentIdValue attribute. The @mmtPackageId attribute may reference the MMT package of the service components delivered as the MPU of the service. The @contentIdSchemeIdUri attribute may indicate URI to identify a scheme of a content ID related to the current MMT package. The @contentIdValue attribute may indicate a value of a content ID related to the current MMT package. The @nextMmtPackageId attribute may reference an MMT package to be used after the MMT package referenced by the @mmtPackageId attribute in terms of time. The @nextcontentIdSchemeIdUri attribute may indicate URI to identify a scheme of a content ID related to the next MMT package. The @nextcontentIdValue attribute may indicate a value of a content ID related to the next MMT package. Through the information of this element, the MP table may be referenced.

The routeComponent element may include a description of the service components of the service. Even when linear service components are delivered through the MMT protocol, NRT data may be delivered according to the ROUTE protocol as described above. This element may describe information on such NRT data. A detailed description of this element will be given below.

The broadbandComponent element may include the description of the service components of the service delivered over broadband. In hybrid service delivery, some service components of one service or other files may be delivered over broadband. This element may describe information on such data. This element may further an @fullMPDUri attribute. This attribute may reference the MPD describing the service component delivered over broadband. In addition to hybrid service delivery, the broadcast signal may be weakened due to traveling in a tunnel and thus this element may be necessary to support handoff between broadband and broadband. When the broadcast signal is weak, the service component is acquired over broadband and, when the broadcast signal becomes strong, the service component is acquired over the broadcast network to secure service continuity.

The ComponentInfo element may include information on the service components of the service. According to the number of service components of the service, a plurality of elements may be present. This element may describe the type, role, name, identifier or protection of each service component. Detailed information of this element will be described below.

The above-described Channel element may further include an @serviceGenre attribute, an @serviceIcon attribute and/or a ServiceDescription element. The @serviceGenre attribute may indicate the genre of the service and the @ serviceIcon attribute may include the URL information of the representative icon of the service. The ServiceDescription element may provide the service description of the service and this element may further include an @serviceDescrText attribute and/or an @serviceDescrLang attribute. These attributes may indicate the text of the service description and the language used in the text.

The above-described routeComponent element may further include an @sTSIDUri attribute, an @ sTSIDDestinationIpAddress attribute, an @ sTSIDDestinationUdpPort attribute, an @ sTSIDSourceIpAddress attribute, an @sTSIDMajorProtocolVersion attribute and/or an @sTSIDMinorProtocolVersion attribute.

The @sTSIDUri attribute may reference an S-TSID fragment. This field may be equal to the field of the USBD delivered through ROUTE. This S-TSID may provide access related information of the service components delivered through ROUTE. This S-TSID may be present for NRT data delivered according to the ROUTE protocol in a state of delivering linear service component according to the MMT protocol.

The @sTSIDDestinationIpAddress attribute, the @sTSIDDestinationUdpPort attribute and the @sTSIDSourceIpAddress attribute may indicate the destination IP address, destination UDP port and source IP address of the transport packets carrying the above-described S-TSID. That is, these fields may identify the transport session (MMTP session or the ROUTE session) carrying the above-described S-TSID.

The @ sTSIDMajorProtocolVersion attribute and the @sTSIDMinorProtocolVersion attribute may indicate the major version number and minor version number of the transport protocol used to deliver the above-described S-TSID, respectively.

The above-described ComponentInfo element may further include an @componentType attribute, an @componentRole attribute, an @componentProtectedFlag attribute, an @componentId attribute and/or an @componentName attribute.

The @componentType attribute may indicate the type of the component. For example, this attribute may indicate whether the component is an audio, video or closed caption component. The @componentRole attribute may indicate the role of the component. For example, this attribute may indicate main audio, music, commentary, etc. if the component is an audio component. This attribute may indicate primary video if the component is a video component. This attribute may indicate a normal caption or an easy reader type if the component is a closed caption component.

The @componentProtectedFlag attribute may indicate whether the service component is protected, for example, encrypted. The @componentId attribute may indicate the identifier of the service component. The value of this attribute may be the asset_id (asset ID) of the MP table corresponding to this service component. The @componentName attribute may indicate the name of the service component.

As described above, in an embodiment of present disclosure, service components of one service may be delivered through a plurality of ROUTE sessions. In this case, an SLS may be acquired through bootstrap information of an SLT. The S-TSID may describe not only the ROUTE session delivered by the SLS but also transport session description information of another ROUTE session carried by the service components. To this end, the service components delivered through the plurality of ROUTE sessions may all be collected. This is similarly applicable to the case in which the service components of one service are delivered through a plurality of MMTP sessions. For reference, one service component may be simultaneously used by the plurality of services.

In another embodiment of present disclosure, bootstrapping of an ESG service may be performed by a broadcast or broadband network. By acquiring the ESG over broadband, URL information of the SLT may be used. ESG information may be requested using this URL.

In another embodiment of present disclosure, one service component of one service may be delivered over the broadcast network and the other service component may be delivered over broadband (hybrid). The S-TSID may describe components delivered over the broadcast network such that the ROUTE client acquires desired service components. In addition, the USBD may have base pattern information to describe which segments (which components) are delivered through which path. Accordingly, the receiver can confirm a segment to be requested from the broadband service and a segment to be detected in a broadcast stream.

In another embodiment of present disclosure, scalable coding of a service may be performed. The SLT may have all capability information necessary to render the service. For example, when one service is provided in HD or UHD, the capability information of the SLT may have a value of "HD or UHD". The receiver may check which component is reproduced in order to render the UHD or HD service using the MPD.

In another embodiment of present disclosure, through a TOI field of the LCT packets delivered through the LCT channel delivering the SLS, which SLS fragment is delivered using the LCT packets (USBD, S-TSID, MPD, etc.) may be identified.

In another embodiment of present disclosure, app components to be used for app based enhancement/an app based service may be delivered over the broadcast network as NRT components or may be delivered over broadband. In addition, app signaling for app based enhancement may be performed by an application signaling table (AST) delivered along with the SLS. In addition, an event which is signaling for operation to be performed by the app may be delivered in the form of an event message table (EMT) along with the SLS, may be signaled in the MPD or may be in-band signaled in the form of a box within DASH representation. The AST, the EMT, etc. may be delivered over broadband. App based enhancement, etc. may be provided using the collected app components and such signaling information.

In another embodiment of present disclosure, an AEAT may be included and provided in the above-described LLS table for emergency alert. Rich media content for emergency alert may also be provided. Rich media may be signaled by an AEAT and, if rich media is present, the rich media may be provided as an EAS service signaled by the SLT.

In another embodiment of present disclosure, linear service components may be delivered over the broadcast network according to the MMT protocol. In this case, NRT data (e.g., app components) of the service may be delivered over the broadcast network according to the ROUTE protocol. In addition, the data of the service may be delivered over broadband. The receiver may access the MMTP session delivering the SLS using the bootstrap information of the SLT. The USBD of the SLS according to the MMT may reference the MP table such that the receiver acquires linear service components formatted into the MPU delivered according to the MMT protocol. In addition, the USBD may further reference the S-TSID such that the receiver acquires NRT data delivered according to the ROUTE protocol. In addition, the USBD may further reference the MPD to provide a reproduction description of data delivered over broadband.

In another embodiment of present disclosure, the receiver may deliver location URL information capable of acquiring a file content item (file, etc.) and/or a streaming component to a companion device through a web socket method. The application of the companion device may acquire components, data, etc. through a request through HTTP GET using this URL. In addition, the receiver may deliver information such as system time information, emergency alert information, etc. to the companion device.

Hereinafter, link layer will be described.

Figure 6:
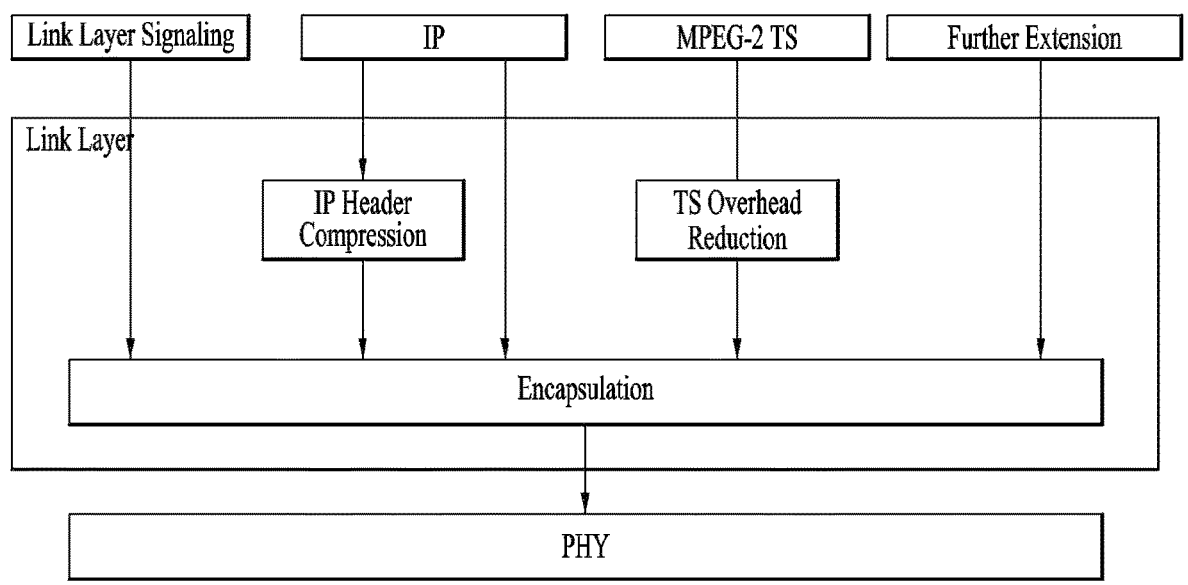
FIG. 6 is a diagram showing a link layer protocol architecture according to an embodiment of the present disclosure.

FIG. 6 is a diagram showing a link layer protocol architecture according to an embodiment of the present disclosure.

Figure 7:
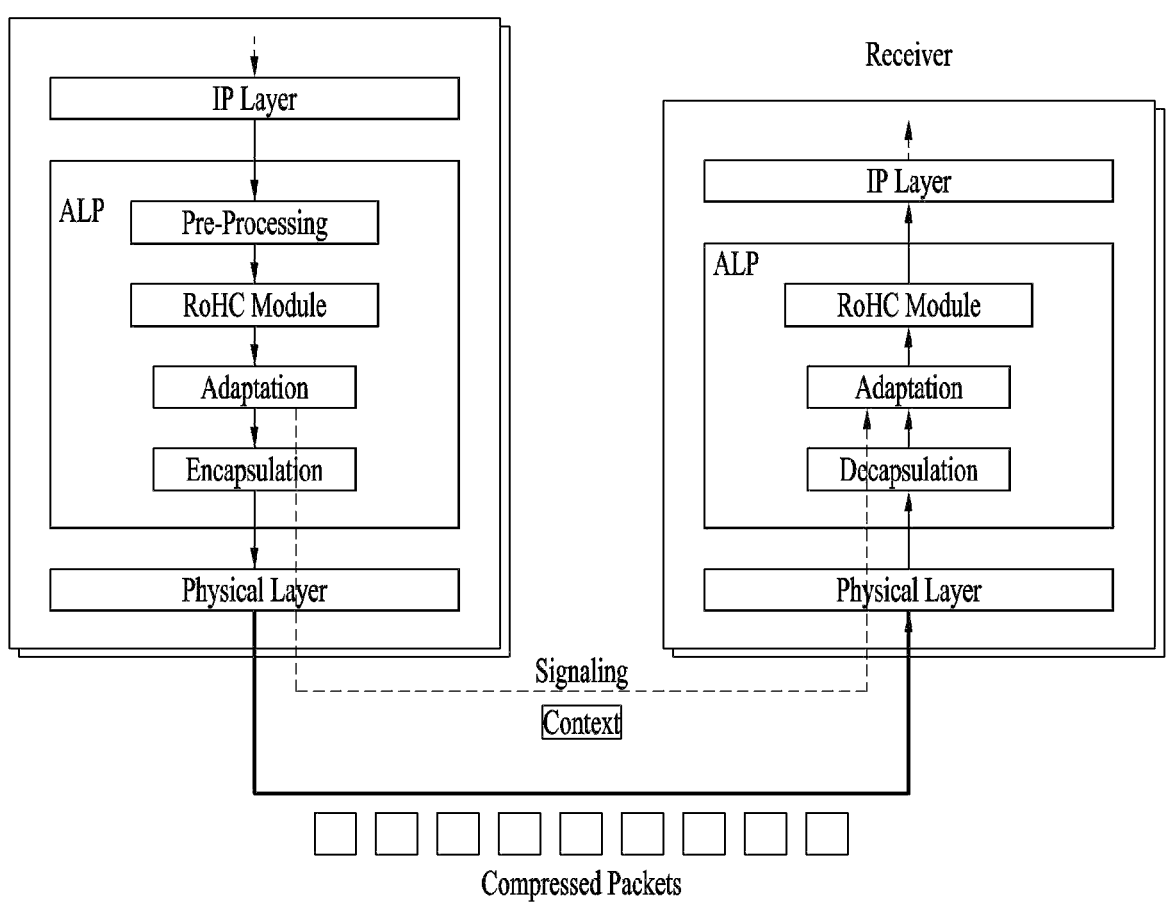
FIG. 7 is a diagram showing link layer operation according to an embodiment of the present disclosure.

FIG. 7 is a diagram of the present disclosure showing link layer operation when an input packet is an IP packet.

The link layer may be a layer between a physical layer and a network layer. A transmission side may transmit data from the network layer to the physical layer and a reception side may transmit data from the physical layer to the network layer. The purpose of the link layer is to compress (abstract) all input packet types into one format for processing by the physical layer and to secure flexibility and expandability of an input packet type which is not defined yet. In addition, the link layer may provide option for compressing (abstracting) unnecessary information of the header of input packets to efficiently transmit input data. Operation such as overhead reduction, encapsulation, etc. of the link layer is referred to as a link layer protocol and packets generated using this protocol may be referred to as link layer packets. The link layer may perform functions such as packet encapsulation, overhead reduction and/or signaling transmission. In the present disclosure, the link layer protocol is referred to as an ATSC link layer protocol (ALP), and the link layer packet is referred to as an ALP packet.

At the transmission side, the link layer may perform an overhead reduction procedure with respect to input packets and then encapsulate the input packets into link layer packets. In addition, in some embodiments, the link layer may perform encapsulation into the link layer packets without performing the overhead reduction procedure. Due to use of the link layer protocol, data transmission overhead on the physical layer may be significantly reduced and the link layer protocol according to present disclosure may provide IP overhead reduction and/or MPEG-2 TS overhead reduction.

When IP packets are input as input packets, the link layer may sequentially perform IP header compression, adaptation and/or encapsulation as shown in FIG. 7. In some embodiments, some processes may be omitted. At this time, a pre-processing module may be used prior to an RoHC module for optimal operation of IP header compression. First, when IP packets fragmented from a single IP packet are input, the pre-processing module collects the IP packets and recovers to the IP packet prior to fragmentation by performing pre-processing and then the recovered IP packet to the RoHC module. When the input IP packet is not an IP packet fragmented from the IP packet, the IP packet outputs to the RoHC module without performing pre-processing.

The RoHC module may perform IP packet header compression for IP packets input to reduce unnecessary overhead. Context information may be extracted from the compressed header by performing the adaptation procedure in an adaptation module and transmitted out of band. The IP header compression and the adaption procedure may be collectively referred to as IP header compression. Also, the pre-processing, the IP header compression and the adaption procedure may be collectively referred to as IP header compression. Thereafter, the IP packets and/or the header compressed packets and/or context information may be encapsulated into link layer packets by performing the encapsulation procedure in an encapsulation module. According to an embodiment of the present disclosure, the pre-processing module, the RoHC module, and the adaption module may be collectively referred to as an IP header compression unit and the IP header compression unit and the encapsulation module may be collectively referred to as an ALP stream generator. That is, the ALP stream generator is a single ALP stream generator generating a single ALP stream. The ALP stream may be referred to as a link layer stream.

When MPEG 2 TS packets are input as input packets, the link layer may sequentially perform overhead reduction and/or an encapsulation procedure with respect to the TS packets. In some embodiments, some procedures may be omitted. In overhead reduction, the link layer may provide sync byte removal, null packet deletion and/or common header removal (compression). Through sync byte removal, overhead reduction of 1 byte may be provided per TS packet. Null packet deletion may be performed in a manner in which reinsertion is possible at the reception side. In addition, deletion (compression) may be performed in a manner in which common information between consecutive headers may be restored at the reception side. Some of the overhead reduction procedures may be omitted. Thereafter, through the encapsulation procedure, the TS packets may be encapsulated into link layer packets. The link layer packet structure for encapsulation of the TS packets may be different from that of the other types of packets.

Next, IP header compression will be described.

The IP packets may have a fixed header format but some information necessary for a communication environment may be unnecessary for a broadcast environment. The link layer protocol may compress the header of the IP packet to provide a mechanism for reducing broadcast overhead.

A transmitter may include an RoHC module (or header compressor) and/or an adaptation module for IP header compression as shown in FIG. 7. The RoHC module may reduce the size of headers of IP packets based on a RoHC method. Then, adaptation module may extract context information from the header compressed IP packets and generate signaling information related to header compression. A receiver may recover packet headers based on signaling information and context information to reconfigure original IP packets. Hereinafter, IP header compression may mean only IP header compression by an RoHC module and may be a concept that combines IP header compression by the RoHC module and the adaptation procedure by the adaptation module. This may be the same as in decompressing of the receiver.

In the present disclosure, for convenience of description, IP packets prior to compression will be referred to as data packets, and packets after compression in RoHC type will be referred to as RoHC packets (or header compressed data packets). Streams including IP packets prior to compression will be referred to as IP streams or IP packet streams, and streams including RoHC packets will be referred to as RoHC packet streams or RoHC IP streams.

The data packet which is IP packet prior to compression includes a header and a payload, and the header includes at least IP header and UDP header in accordance with ROHC UDP profile (0x0002). That is, the data processed in the delivery layer of the transmission system in accordance with MMTP or ROUTE protocol are capsulated into IP packets in the UDP/IP layer and then transmitted to the link layer. At this time, in one embodiment, the UDP header is added to UDP payload, which includes the data processed in accordance with the MMTP or ROUTE protocol, to generate UDP packet, and the IP header is added to the UDP packet to generate IP/UDP packet. In the present disclosure, for convenience of description, the packet that includes the IP header, the UDP header and the payload or the packet that includes the IP header and the payload will be referred to as IP packet or data packet.

In one embodiment, IP version, source IP address, destination IP address, IP fragment flag, source port number, destination port number of information included in an IP header and a UDP header of IP packets are little changed during IP streaming. In the present disclosure, fields for transmitting information which is little changed during streaming will be referred to as static fields. Also, information transmitted to the static fields will be referred to as static information. In the present disclosure, the static information is used to refer to static chain information. In RoHC compression, after such static information is transmitted once, additional information is not performed for a while. This will be referred to as Initialization and Refresh (IR) state, and RoHC packets for transmitting the static information to the header will be referred to as IR packets.

In addition, additional transmission is separately performed for dynamic information frequently changed but maintained for a certain time. The dynamic information is transmitted through a dynamic field, and is used to mean the same as the dynamic chain information in the present disclosure.

RoHC packets for transmitting the dynamic information to the header will be referred to as IR-DYN packets. In one embodiment, the IR packets also include dynamic information. That is, since the IR packets and the IR-DYN packets include all kinds of information, the packets have a size similar to that of the existing header.

Figure 8:
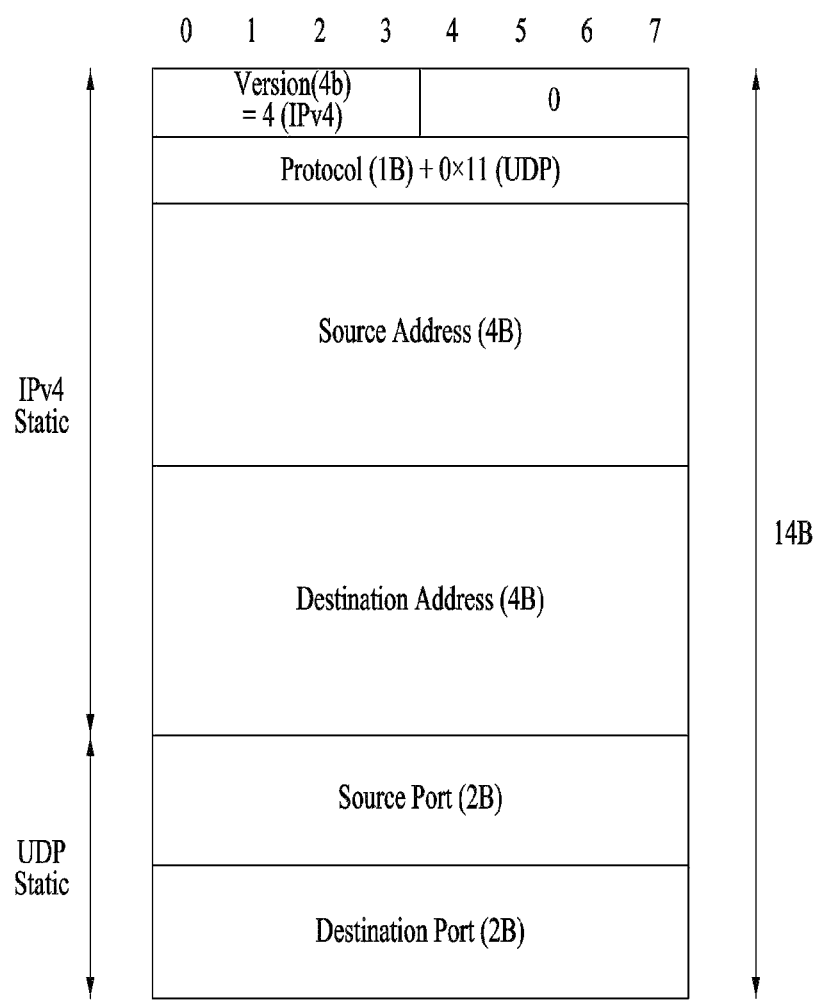
FIG. 8 illustrates one example of static chain information of IP/UDP header of IP packets according to the present disclosure.

FIG. 8 illustrates one example of static chain information included in the IP header and the UDP header. The static chain information may include an IP version field, a protocol field, a source IP address field, a destination IP address field, a source port number field, and a destination port number field.

The IP version field indicates whether a version of the corresponding IP packet is IPv4 or IPv6. In one embodiment, IPv4 is used.

The protocol field indicates an upper layer protocol stored in the payload of the corresponding IP packet.

The source IP address field and the destination IP address field respectively indicate a source IP address and a destination IP address of the corresponding packet.

The source port number field and the destination port number field respectively indicate a source port number and a destination port number of the corresponding packet.

Figure 9:
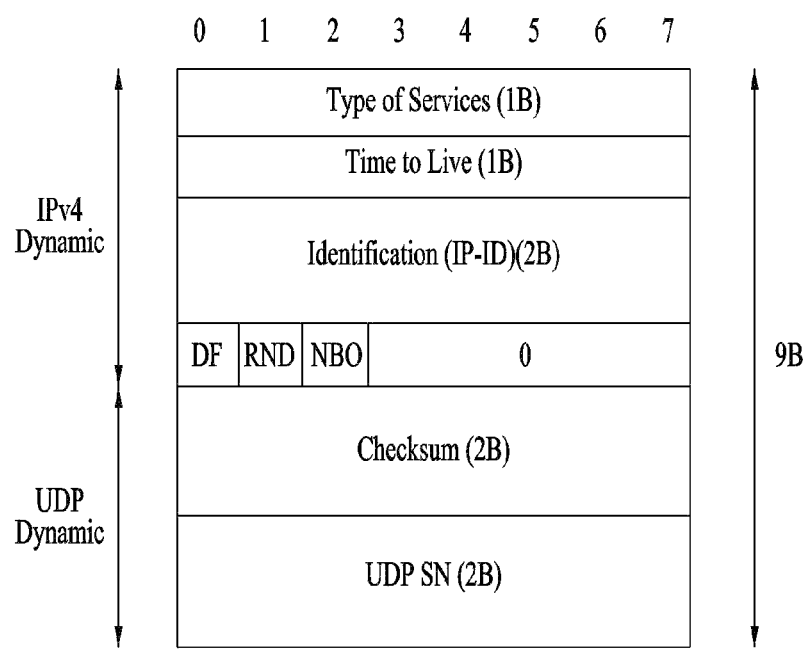
FIG. 9 illustrates one example of dynamic chain information of IP/UDP header of IP packets according to the present disclosure.

FIG. 9 illustrates one example of dynamic chain information included in the IP header and the UDP header. The dynamic chain information may include a Type Of Services (TOS) field, a Time To Live (TTL) field, an identification (hereinafter, referred to as IP-ID) field, a Don't Fragment (DF) field, an RND field, an NBO field, a CRC checksum field, and a sequence number (SN) field.

The TOS field displays a content related to quality of service (QoS) provided by the IP protocol to a user. That is, the TOS field defines a priority of the IP packets.

The TTL field indicates the time when the corresponding packet may survive within the network.

The IP-ID (Identification) field is an identifier for identifying each IP packet. The IP packets fragmented from one IP packet have the same IP-ID field value. The IP packets which are not fragmented have different values. In the present disclosure, for convenience of description, the packets fragmented from one IP packet will be referred to as fragmented packets or fragmented IP packets.

The DF field indicates whether a corresponding packet has been fragmented. The RND field is a flag indicating whether IP-ID is randomly operated. For example, if the DF field value is 0, it indicates that the corresponding packet is a fragmented packet, and if the DF field value is 1, it indicates that the corresponding packet is a packet which is not fragmented. The NBO field is a field indicating whether the IP-ID corresponds to a network byte order (NBO). The dynamic chain information may further include a more fragment (MF) flag field and a fragment offset field. The MF flag field indicates whether the corresponding packet is the last fragmented packet. For example, if the MF flag field value is 0, it indicates that the corresponding packet is the last fragmented packet, and if the MF flag field value is 1, it indicates that more fragmented packets exist. In other words, if the MF flag field value is 1, it indicates that the corresponding packet is not the last fragmented packet. The fragmented offset field indicates a relative position of the corresponding fragmented packet in a data region within IP packets when the IP packets are fragmented.

If there is no IP fragmentation, all IP-ID field values of the IP packets which will be input are '0x00', and the value of the DF field is always '1'. In this case, IP-ID encoding is not used. A context value of IP-ID is set to '0x00', and context information of IP-ID is not updated. The context value of the DF in a dynamic chain is set to '1'. This case will be referred to as an unused IP-ID case.

If IP fragmentation is either present or its presence is unknown, IP-ID values of the input IP packets are monotonically increased, and the value of the DF field is always '0'. Even though the fragmented packets are re-assembled prior to RoHC module, the IP-ID fields are compressed. In this case, the IP-ID is encoded by an offset IP-ID encoding scheme. A context of the IP-ID is updated based on the offset IP-ID encoding scheme. In the dynamic chain, the context value of the DF field is set to '0'. This case will be referred to as a sequential IP-ID case.

The checksum field is optional, and the receiver calculates checksum for all packets for error detection of data, wherein checksum is only used in the UDP header. If the test result of the checksum field is different from the original data, the receiver discards data before moving to an application layer (that is, upper layer). In addition, if the checksum field value is 0x0000, the receiver does not perform a checksum test.

The SN field displays a sequence number indicating the order of each packet included in packet streams. In one embodiment, the SN field is located next to the checksum field and generated in the IP header compressor (that is, compressor). The sequence number may be used for synchronization between an RoHC-U Description Table (RDT) and a compressed packet.

Meanwhile, the other packets except the IR packet and the IR-DYN packet among the RoHC packets will be referred to as compressed packets. In one embodiment, a header of each compressed packet (or compressed packet) includes 1-2 byte information only.

Although not shown in FIGS. 9 and 10, the IP header further includes a total length field, and the UDP header further includes a length field. The total length field of the IP header indicates a sum size of the IP header and the actual data region in a byte unit. That is, the total length field of the IP header indicates a total length of the corresponding IP packet. The length field of the UDP header indicates a sum size of the UDP header and the actual data region in a byte unit. That is, the length field of the UDP header indicates a total length of the corresponding IP packet. In accordance with the operation of RoHC, the total length field and the length field are not transmitted from the compressor (that is, IP header compressor) of the transmitting side to the decompressor (that is, IP header decompressor) of the receiving side.

Next, fragmentation of the IP packets will be described.

When a size of an IP packet to be transmitted from the IP/UDP layer to the link layer is greater than a Maximum Transmission Unit (MTU), fragmentation is performed for the IP packet, whereby the IP packet is split into two or more fragmented packets and then transmitted. In this case, in one embodiment, the MTU means a size of data that may be transmitted from the IP/UDP layer to the link layer at one time. That is, if the size of the IP packet to be transmitted to the link layer is greater than the MTU, the IP packet cannot be transmitted, whereby fragmentation is performed for the IP packet.

If fragmentation is performed for the IP packet, the IP packet is split into two or more fragments and IP header is added to the front of each fragment to generate fragment packets. In other words, each fragment packet is an IP packet comprised of an IP header and a payload.

For example, it is assumed that one IP packet having the UDP/IP header is fragmented into three IP packets. In this case, the same IP-ID field value is maintained in each IP header of three fragmented packets but different fragment offset field values are present. The DF flag field values within each IP header of the three fragmented packets are all se to 0, and therefore indicate that the corresponding packets are fragmented packets.

At this time, the UDP header is only present in the first fragmented packet, and the IP header is present in all of three fragmented packets.

Meanwhile, the RoHC scheme is used for header compression of the IP packets as described above. In one embodiment, considering characteristics of ATSC 3.0 broadcast link, RoHC framework operates in a unidirectional mode (U-mode). A plurality of header compression files are defined in the RoHC framework. Each profile indicates a specific protocol combination, and profile identifiers are allocated by Internet Assigned Numbers Authority (IANA). In one embodiment, '0x0002' profile is used for ATSC 3.0.

Next, an example of RoHC profile defined for ATSC 3.0 will be described.

That is, the Profile Identifier is 0x0002, Profile is RoHC UDP, Protocol Combination is UDP/IP, and Reference standard is RFC 3095 and RFC 4815.

That is, if even any one of the IP header and the UDP header does not exist in the header of the input IP packets, the RoHC module of the link layer does not perform header compression.

Therefore, if it is assumed that one IP packet having the UDP/IP header is fragmented into three IP packets as described above, header compression is not performed for the other two fragmented IP packets having no UDP header. In other words, the RoHC module applies an uncompressed profile of which profile number is 0x00 if IP packets having no UDP header are input by IP fragmentation. At this time, header compression efficiency may not be expected for the uncompressed profile because the uncompressed profile transmits an actual IP header as it is by using RoHC header format.

That is, header compression is performed for IP packet having the IP header and the UDP header by 0x02 profile, whereas header compression is performed for IP packet having the IP header but having no UDP header by 0x00 profile.

If IP header compression is performed as above, some problems may occur. That is, if a compressed profile is changed in the middle of packet streams, a problem occurs in that system complexity and delay are increased. If a single type packet stream is delivered, one profile and RoHC packet structure according to one profile may be used but additional profile for IP fragmentation should be configured and correspond to additional RoHC packet structure. Also, delay occurs in the transmitter when converting a profile, and the receiver needs much memory capacity for synchronization between packet streams header compressed using different profiles. In order that a bandwidth is efficiently used based on RoHC and at the same time mass broadcast streams are quickly transmitted and received, it is important to reduce overhead. In order to reduce overhead, it is most effective to increase capacity for a broadcast transmitting network but a problem occurs in that much cost and time are required for updating an infrastructure of a broadcast system.

In the present disclosure, in order to the above problem, a pre-processing module is provided prior to the RoHC module, and the IP packets fragmented in the pre-processing module are re-assembled into the original unfragmented IP packets and then output to the RoHC module.

That is, in one embodiment, if the IP packets input by referring to the IP header of the input IP packets are fragmented IP packets, until all fragmented IP packets constituting the corresponding IP/UDP packets are received, the fragmented IP packets are stored in the buffer or memory. If the fragmented IP packets constituting the corresponding IP/UDP packets are all received, the received fragmented IP packets are combined and recovered to the original IP/UDP packets.

Then, since the IP packets input to the RoHC module include the IP header and the UDP header, header compression is performed in 0x02 profile, and consideration for the other profiles is not required.

Meanwhile, the RoHC framework defines RoHC channels to identify a compressed packet flow, that is, RoHC packet flow. In the present disclosure, one PLP may be mapped into one RoHC channel. Therefore, CID should separately be managed in each PLP. In one embodiment of the present disclosure, each RoHC channel includes small Context ID (CID) and large CID of a 1 byte size.

Also, in one embodiment, the RoHC framework defines the following configuration parameters to establish a context state between the compressor and the decompressor in each RoHC channel.

MAX_CID parameter indicates a maximum CID value to be used by the compressor.

LAEGE CIDS parameter indicates CID configuration. If this parameter is 'false', small CID is used in the RoHC channel, and if this parameter is 'true', large CID is used in the RoHC channel. In one embodiment of the present disclosure, this parameter is inferred from the max_CID field in RDT. In one embodiment of the present disclosure, the decompressor regards that the LARGE_CIDS parameter as 'false' if the max_CID field has a value smaller than or equal to 15, and regards the LARGE_CIDS parameter as 'true' if the max_CID field has a value greater than 15.

PROFILES parameter indicates a range of a protocol (or layer) used for compression in the compressor. In one embodiment, the PROFILES parameter is transmitted through context_profile field of the RDT.

The context of the compressor is the state that it is used to compress a header. The context of the decompressor is the state that it is used to decompress a header. Either of these or two in combination are usually referred to as "context" when it is clear which is intended. The context contains relevant information from previous headers in the packet stream, such as static fields and possible reference values for compression and decompression. Also, additional information describing packet streams is also a part of the context. For example, the additional information includes information as to how IP-ID field is changed and information as to how normal inter-packet is increased in sequence numbers or time stamp. Also, header field related information of a previous packet required for compression is a part of the context.

Hereinafter, adaptation will be described.

In case of transmission through a unidirectional link, if the receiver does not have context information, the decompressor of the receiver cannot restore the received packet header until a complete context is received. This may cause channel change delay and turn-on delay. For this reason, the context information and the configuration parameters are transmitted to the RDT (RoHC-U Description Table).

Therefore, the adaption function may construct link layer signaling including the RDT by using the context information and/or the configuration parameters. In addition, the adaptation function provides out of band transmission of the context information and the configuration parameter between the compressor and the decompressor. That is, out of band transmission may be performed through link layer signaling. In other words, the adaptation function is used to reduce a decompression error caused by loss of the context information and error change delay. In the present disclosure, link layer signaling and link layer signaling information are used to mean the same.

Hereinafter, extraction of the context information will be described.

The context information is extracted from the header compressed IP packets, that is, the RoHC packets, and various methods may be used in accordance with an adaptation mode.

Figure 10A:
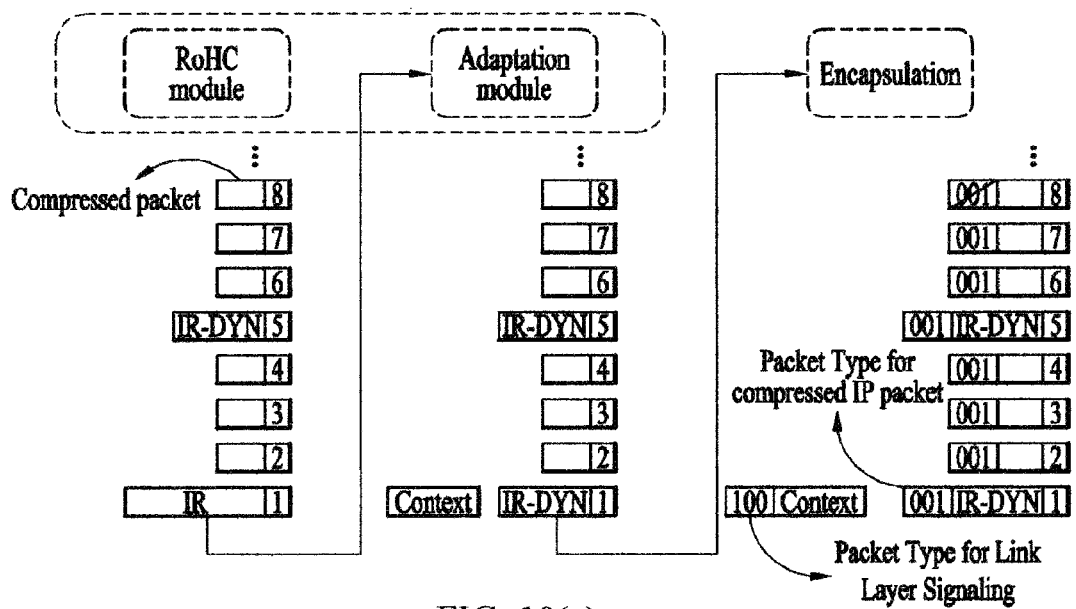
FIGS. 10(*a*) and 10(*b*) illustrate examples of adaptation modes 2 and 3 in IP header compression according to one embodiment of the present disclosure.
Figure 10B:
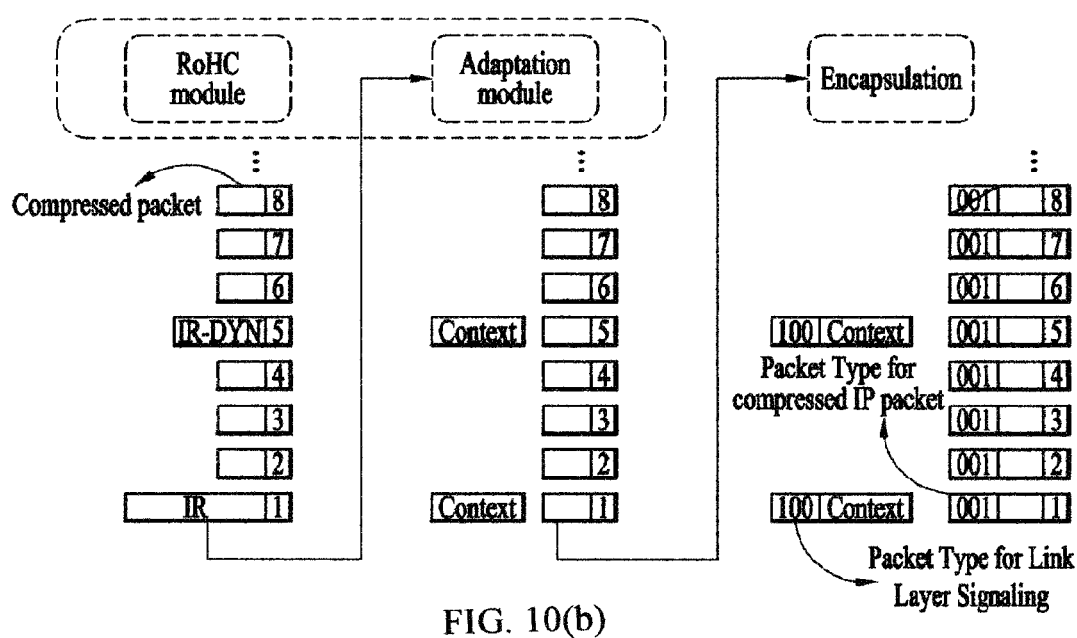

FIGS. 10(a) and 10(b) are diagrams illustrating a procedure of extracting and processing context information when an adaptation mode is 2 and when an adaptation mode is 3.

Adaptation mode 1 is a mode for not performing any operation for a basic RoHC stream (that is, RoHC packet flow). In this mode, an adaptation module may operate as a buffer. In other words, in the adaptation mode 1, context information is not extracted from the RoHC packets. The RoHC packets in RoHC packet flow are encapsulated into at least one link layer packet in an encapsulation module and then transmitted to a physical layer.

In the adaptation mode 2 of FIG. 10(a), the adaptation module detects IP packets from the RoHC packet flow, and extract context information (that is, static chain information) from a header of the detected IR packets. In one embodiment, the IR packets from which the context information is extracted are converted to IR-DYN packets, wherein the IR-DYN packets are replaced with original IR packets and transmitted to the encapsulation module in the same order in the RoHC packet flow. In one embodiment, the extracted context information is transmitted to the encapsulation module by included a RoHC-U Description Table (RDT) of link layer signaling information. The encapsulation module encapsulates packets in the RoHC packet flow into at least one link layer packet, and encapsulates the link layer signaling information into at least one link layer packet and transmits the encapsulated information to the physical layer. A PLP for transmitting at least one link layer packet including the RoHC packet flow may be different from or the same as a PLP for transmitting at least one link layer packet including the link layer signaling.

In the adaptation mode 3 of FIG. 10(b), the adaptation module detects IR packets and IR-DYN packets from the RoHC packet flow, and extract context information from the detected IR packets and IR-DYN packets. In one embodiment, the context information extracted from the IR packets is static chain information and dynamic chain information, and the context information extracted from the IR-DYN packets is dynamic chain information. The IR and IR-DYN packets from which the context information is extracted are converted to compressed packets. The converted compressed packets may be replaced by the original IR and IR-DYN packets and transmitted in the RoHC packet flow in the same order. In one embodiment, the extracted context information is transmitted to the encapsulation module by being included the RDT of the link layer signaling information. The encapsulation module encapsulates packets in the RoHC packet flow into at least one link layer packet, and encapsulates the link layer signaling information into at least one link layer packet and transmits the encapsulated information to the physical layer. A PLP for transmitting at least one link layer packet including the RoHC packet flow may be different from or the same as a PLP for transmitting at least one link layer packet including the link layer signaling. At least one link layer packet including the link layer signaling information may be transmitted through a specific physical data path. In some embodiments, the specific physical data path may mean one of general PLPs or a PLP to which low level signaling (LLS) is forwarded, or may mean a dedicated PLP or L1 signaling path.

In this case, the RDT may be signaling information including information (or header compression information) related to header compression and/or context information (static chain and/or dynamic chain). In some embodiments, the RDT may be transmitted whenever the context information is changed. Also, in some embodiments, the RDT may be transmitted from every physical frame. To transmit the RDT from every physical frame, a previous RDT may be reused.

Hereinafter, packet encapsulation will be described.

A link layer protocol, that is, the encapsulation module may encapsulate all types of input packets such as IP packets and TS packets into a link layer packet. Through this case, the physical layer has only to process one packet format independently from a protocol type of a network layer (in this case, MPEG-2 TS packet may be considered as a type of a network layer packet). That is, each network layer packet or input packet is modified to payload of a generic link layer packet in the encapsulation module.

Segmentation may be used during the packet encapsulation procedure. If the network layer packet is too large to be processed by the physical layer, the network layer packet may be split into two or more segments. The link layer packet header may include fields for executing segmentation in a transmitting side and recombining in a receiving side. The respective segments may be encapsulated into the link layer packet in the same order as the original position.

Concatenation may also be used during the packet encapsulation procedure. If the network layer packet is enough small so that the payload of the link layer packet includes several network layer packets, concatenation may be performed. The link layer packet header may include fields for executing concatenation. In case of concatenation, each input packet may be encapsulated into the payload of the link layer packet in the same order as the original input order.

One link layer packet may include a header and a payload, wherein the header may include a base header, additional header and/or optional header. The additional header may further be added depending on the status of concatenation or segmentation, and necessary fields suitable for the status may be included in the additional header. Also, the optional header may further be added for additional information delivery. The presence of the optional header is indicated by a flag field of the additional header. In some embodiments, a field indicating the presence of the additional header and the optional header may be located in the base header.

Figure 11:
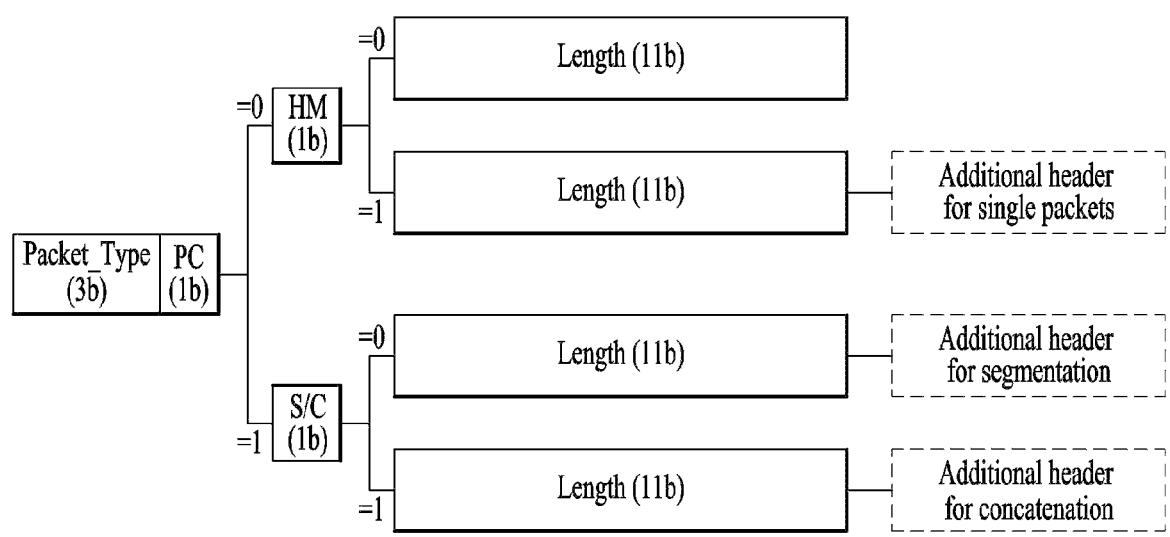
FIG. 11 illustrates a based header structure of a link layer packet according to one embodiment of the present disclosure.

FIG. 11 is a diagram illustrating a base header structure of a link layer packet according to one embodiment of the present disclosure.

The base header of the link layer packet has a hierarchical structure. The base header may have a length of 2 bytes corresponding to a minimum length of the link layer picketer header.

The base header according to one embodiment of the present disclosure may include a packet_type field of 3 bits, a PC field of 1 bit, and/or a length field of 11 bits. In some embodiments, the base header may further include an HM field or S/C field of 1 bit.

FIG. 12 is a table illustrating embodiments of code values allocated to a packet_type field.

The packet_type field indicates an original protocol or a packet type of input data prior encapsulation into the link layer packet as shown in FIG. 12. That is, IPv4 packet, compressed IP packet, link layer signaling packet and the other types of packets may be encapsulated with such a base header structure. However, in some embodiments, MPEG-2 TS packet may be encapsulated with a specific structure different from the base header structure. If the packet_type has a value of "000", "010", "100" or "110", the original data type of link layer packet is one of IPv4 packet, compressed IP packet, link layer signaling packet or extension packet. If the MPEG-2 TS packet is capsulated into a link layer packet, the value of the packet_type may be "111". The other values of the packet_type field may be reserved for future use.

The Payload_Configuration (PC) field indicates a configuration of a payload. A value of 0 indicates that the link layer packet delivers one whole input packet and next field is Header_Mode. A value of 1 indicates that the link layer packet delivers one or more input packets (concatenations) or some of great input packets (segmentation) and next field is Segmentation_Concatenation.

If the Header_Mode (HM) field is set to 0, it indicates that there is no additional header and indicates that a payload length of the link layer packet is shorter than 2048 bytes. This value may be varied depending on embodiments. The value of 1 indicates that additional header exists next to the length field. In this case, the length of the payload may be greater than 2047 bytes/or optional features (substream identification, header extension, etc.) may be used. This value may be varied depending on embodiments. This field may exist only if the Payload_Configuration field of the link layer packet has a value of 0.

If the Segmentation_Concatenation (S/C) field is set to 0, it indicates that the payload delivers segments of input packets and additional header for segmentation exists next to the length field. A value of 1 indicates that the payload delivers complete input packets having payloads more than 0 and additional header for concatenation exists next to the length field. This field may exist only if the Payload_Configuration field of the link layer packet has a value of 1.

The length field may indicate 11 lower bits (that is, 11 least significant bits (LSBs)) of a byte unit length of the payload delivered by the corresponding link layer packet. If a Length_MSB field exists in additional header, the length field is concatenated in the Length_MSB field and becomes the LSB to provide an actual total length of the payload. The number of bits of the length field may be changed to other bits in addition to 11 bits.

Therefore, types of the following packet structures are available. That is, a single packet having no additional header, a single packet having additional header, a segmented packet, and a concatenated packet are available. In some embodiments, more packet configurations may be available by additional header, optional header, combination of additional header for signaling information and additional header for type extension, which will be described later.

Figure 13:
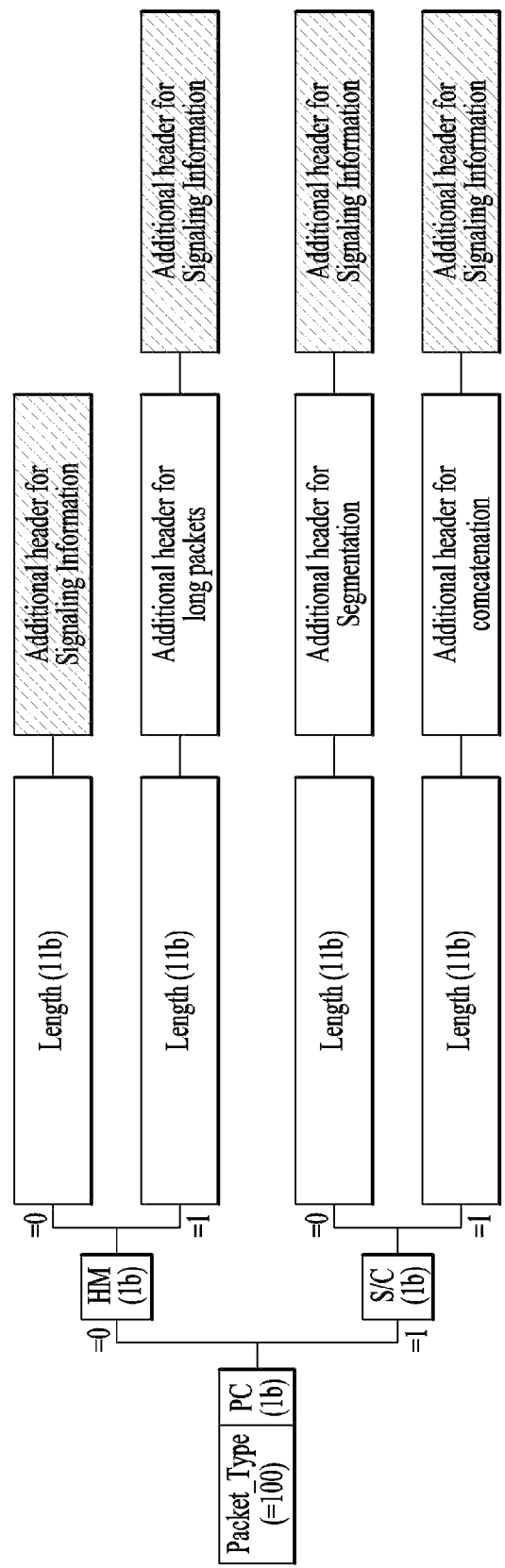
FIG. 13 illustrates additional header structure for signaling information of a link layer packet according to another embodiment of the present disclosure.

FIG. 13 is a diagram illustrating base header and additional header structures of a link layer packet for signaling information according to one embodiment of the present disclosure.

That is, how link layer signaling is incorporated into the link layer packet is as follows. The link layer packet including link layer signaling, that is, signaling packet is identified when the packet_type field of the base header is equal to 100.

In FIG. 13, an oblique portion is additional header for signaling information. That is, on signaling encapsulation, the link layer packet may include two parts (that is, additional header for signaling information and actual signaling table). The signaling table is included in the payload of the link layer packet. Therefore, in one embodiment, a total length of the link layer packet including the signaling table is indicated in the link layer packet header.

FIG. 14 is a diagram illustrating one embodiment of a syntax structure of additional header (signaling_information_hdr( )) of the present disclosure. In FIG. 12, some fields may be omitted or added in accordance with embodiments.

A Signaling_Type field is an 8-bit field that may indicate a signaling type. In one embodiment, if a value of the Signaling_Type field is 0x01, it indicates that the signaling table is a Link Mapping Table (LMT), and if a value of the Signaling_Type field is 0x02, it indicates that the signaling table is an RDT.

A Signaling_Type_Extension field is a 16-bit field that may indicate attributes of signaling. Details of the corresponding field may be defined in each signaling table.

A Signaling_Version field is an 8-bit field that may indicate a version of signaling. In one embodiment, a value of this field is increased as much as 1 whenever data of signaling identified by the Signaling_type field are changed.

A Signaling_Format field is a 2-bit field that may indicate a data format of signaling data. In this case, the data format may mean binary, XML, etc.

A Signaling_Encoding field is a 2-bit field that may specify encoding/compression format. This field may indicate whether compression has not been performed or specific compression has been performed.

The RDT and the LMT are tables included in link layer signaling and the link layer signaling may operate at a level lower than that of the IP layer. In the reception side, the link layer signaling can be obtained earlier than IP level signaling such as the LLS, including the SLT and the SLS. Accordingly, the link layer signaling may be acquired before upper-layer signaling is received (i.e., session establishment).

Link layer signaling may include internal link layer signaling and external link layer signaling according to an input path. Internal link layer signaling may be signaling information generated at the link layer. This includes the RDT or the LMT. External link layer signaling may be signaling information received from an external module, an external protocol or a higher layer. An encapsulation module in the link layer may encapsulate link layer signaling into a link layer packet and deliver the link layer packet to a physical layer. At this time, a link layer packet structure (header structure) for link layer signaling may be defined and link layer signaling information may be encapsulated into a link layer packet according to this structure.

FIG. 15 is a diagram showing a syntax structure of a link mapping table (LMT) according to one embodiment of present disclosure. That is, a signaling table is an LMT, in the additional header for signaling information in the link layer header of the link layer packet, a value of the signaling_type field is 0x01, a value of the signaling_type_extension field is 0xFFFF, a value of the signaling_format field is 00 and a value of the signaling_encoding field is 00.

LMT may provide a list of upper layer sessions carried to a PLP. Also, the LMT may provide additional information for processing link layer packets for delivering the upper layer sessions from the link layer. In this case, the upper layer session may be referred to as multicast. In the present disclosure, multicast means that data are simultaneously transmitted to many receivers through an IP network or means a set of data simultaneously transmitted to many receivers through an IP network. The LMT may signal information as to IP streams or transport sessions transmitted through a specific PLP. On the contrary, the LMT may signal information as to PLP to which a specific transport session is delivered.

In one embodiment, the LMT provides only information on UDP/IPv4 multicasts. Also, in one embodiment, for transmission efficiency of the LMT, segmentation is not used for the LMT.

The LMT may be transmitted through the PLP identified to deliver the LLS. Here, the PLP for delivering the LLS may be identified by an L1B_lls_flag field of L1 basic signaling data and an L1D_plp_lls_flag field of L1 detail signaling data of a physical layer. The L1B_lls_flag field indicates the presence or absence of LLS in one or more PLPs in the current frame. In an embodiment, when a value of the L1B_lls_flag field is 0, it indicates there is no LLS in the current frame and when a value of the L1B_lls_flag field is 1, it indicates there is LLS carried in the current frame. The L1D_plp_lls_flag field indicates whether the current PLP carries LLS for each PLP. The purpose of these fields is to allow receivers to quickly locate upper layer signaling information (i.e., LLS). That is, the LMT may also be transmitted through the same PLP along with the LLS. As described above, each instance of the LMT may describe mappings between PLPs and IP addresses/ports for any IP address/port associated with any multicast referenced in the identified PLP carrying the LLS tables. As described above, the LLS may include an SLT and, in this regard, the IP address/ports described by the LMT may be any IP address/ports related to any service, described by the SLT transmitted through the PLP such as a corresponding LMT.

However, the LMT does not describe mappings for the multicast that is associated with LLS, namely multicasts with destination address 224.0.23.60 and destination port 4397.

Additionally, any LMT may describe mappings between PLPs and IP addresses/ports for any multicast, whether or not referenced in the identified PLP carrying the LLS tables.

In some embodiments, the PLP identifier information in the above-described SLT, SLS, etc. may be used to confirm information indicating through which PLP a specific transport session indicated by the SLT or SLS is transmitted may be confirmed.

In another embodiment, the PLP identifier information in the above-described SLT, SLS, etc. will be omitted and PLP information of the specific transport session indicated by the SLT or SLS may be confirmed by referring to the information in the LMT. In this case, the receiver may combine the LMT and other IP level signaling information to identify the PLP. Even in this embodiment, the PLP information in the SLT, SLS, etc. is not omitted and may remain in the SLT, SLS, etc.

The LMT may include a PLP_ID field, a num_session field and/or information on each session. The LMT may describe IP streams transmitted through one PLP and may describe information on a plurality of PLPs by adding a PLP loop. In this case, as described above, the LMT may describe PLPs of all IP addresses/ports related to all service described by the SLT transmitted together using a PLP loop. The sessions in the LMT of FIG. 15 may be the same meaning as multicasts according to embodiments. The LMT may further include a num_PLPs_minus1 field.

The num_PLPs_minus1 field indicates a value one less than the number of PLPs for which multicast-to-PLP mapping is provided in the table. The PLP_ID field may indicate a PLP corresponding to the session. When the PLP loop is used, each PLP_ID field may identify each target PLP. Fields from the PLP_ID field may be included in the PLP loop. Here, the below-described PLP_ID field may be an identifier of one PLP of the PLP loop and the following fields may be fields corresponding to the corresponding PLP.

The num_session field may indicate the number of higher layer sessions delivered through the PLP identified by the PLP_ID field. According to the number indicated by the num_session field, information on each session may be included. This information may include a src_IP_add field, a dst_IP_add field, a src_UDP_port field, a dst_UDP_port field, an SID_flag field, a compressed_flag field, an SID field, and/or a context_id field.

The src_IP_add field, the dst_IP_add field, the src_UDP_port field, and the dst_UDP_port field may indicate the source IP address, the destination IP address, the source UDP port and the destination UDP port of the transport session among the higher layer sessions delivered through the PLP identified by the PLP_ID field.

The SID_flag field may indicate whether the link layer packet delivering the upper layer session identified by the four fields, the src_IP_add field, the dst_IP_add field, the src_UDP_Port field, the dst_UDP_Port field has an SID field in the optional header. The link layer packet delivering the higher layer session may have an SID field in the optional header and the SID field value may be equal to that of the SID field in the LMT.

The compressed_flag field may indicate whether header compression is applied to the link layer packet delivering the upper layer session identified by the four fields, the src_IP_add field, the dst_IP_add field, the src_UDP_Port field, the dst_UDP_Port field. In addition, presence/absence of the below-described context_id field may be determined according to the value of this field. When header compression is applied (compressed_flag=1), the RDT may be present and the PLP ID field of the RDT may have the same value as the corresponding PLP_ID field related to the present compressed_flag field.

The SID field may indicate a sub stream ID (SID) of link layer packets for delivering the upper layer session identified by the four fields, the src_IP_add field, the dst_IP_add field, the src_UDP_Port field, the dst_UDP_Port field. The link layer packets may include the SID having the same value as the present SID field in the optional header. Thereby, the receiver may filter link layer packets using information of the LMT and SID information of a link layer packet header without parsing of all link layer packets.

The context_id field may provide a reference for a context id (CID) provided in the RDT. The CID information of the RDT may indicate the context ID of the compression IP stream (i.e., RoHC stream). The RDT may provide context information of the compression IP stream. Through this field, the RDT and the LMT may be associated.

In the above-described embodiments of the signaling information/table of present disclosure, the fields, elements or attributes may be omitted or may be replaced with other fields. In some embodiments, additional fields, elements or attributes may be added.

FIG. 16 is a diagram illustrating one embodiment of a syntax structure of a RoHC-U Description Table (RDT) according to one embodiment of the present disclosure. That is, in on embodiment, if the signaling table is an RDT, the signaling_type field value of additional header for signaling information in link layer header of the corresponding link layer packet is 0x02, its signaling_type_extension field value is 0xFFFF, its signaling_format field value is 00, and its signaling_encoding field value is 00.

The RDT of FIG. 16 may include a PLP_ID field, a max_CID field, an adaptation_mode field, a context_config field, a num_context field, a context_id field, a context_profile field, a context_length field, a static_chain_byte ( ) field and/or a dynamic_chain_byte ( ) field.

The PLP_ID field may be an 8-bit field indicating a PLP corresponding to the corresponding RDT table.

The max_CID field indicates a maximum value of context ID used to correspond to this PLP.

The context_id field may be an 8-bit field indicating context ID (CID) of compressed IP stream (i.e., RoHC stream). In the corresponding system, CID of 8 bits may be used for large CID.

The context_profile field may be an 8-bit field indicating a range of a protocol (or layer) used to compress IP packets. In the present disclosure, if the context_profile field value is 0, the data packet has a RoHC compression format, or it indicates that actual header information has not been compressed. In one embodiment, if the context_profile field value is 1, it indicates that RoHC compression type has been applied up to RTP, if the context_profile field value is 2, it indicates that RoHC compression type has been applied up to UDP, if the context_profile field value is 3, it indicates that RoHC compression type has been applied up to ESP, and if the context_profile field value is 4, it indicates that RoHC compression type has been applied up to IP. The corresponding field may be omitted.

The adaptation_mode field may be a 2-bit field indicating a mode of the adaptation module in the corresponding PLP. In one embodiment of the present disclosure, if the adaptation_mode field value is 00, it indicates adaptation mode 1, if the adaptation_mode field value is 01, it indicates adaptation mode 2, and if the adaptation_mode field value is 10, it indicates adaptation mode 3. Each adaptation mode has been described as above.

The context_config field may be a 2-bit field indicating combination of context information. If the context information does not exist in the corresponding table, the corresponding field may be set to '0x00'. If static_chain_byte ( ) is included in the corresponding table, the corresponding field may be set to '0x01'. If dynamic_chain_byte ( ) is included in the corresponding table, the corresponding field may be set to '0x02'. If both static_chain_byte ( ) and dynamic_chain_byte ( ) are included in the corresponding table, the context_config field may be set to '0x03'.

The num_context field indicates the number of contexts of this table. A value of the num_context field cannot be greater than that of the max_CID field.

The context_length field may be an 8-bit field indicating a length of static_chain_byte ( ), dynamic_chain_byte ( ) or a sequence obtained by adding static_chain_byte ( ) and dynamic_chain_byte ( ). The corresponding field may be omitted.

The static_chain_byte ( ) field may be a field for delivering static information used to initialize the RoHC-U decompressor. A size and structure of the corresponding field depend on the context profile.

The dynamic_chain_byte ( ) field may be a field for delivering dynamic information used to initialize the RoHC-U decompressor. A size and structure of the corresponding field depend on the context profile.

The static_chain_byte ( ) may be defined as subheader information of IR packets. The dynamic_chain_byte ( ) may be defined as subheader information of IR packets and IR-DYN packets.

In the RDT of FIG. 16, a context loop is repeated as much as the num_context field value. Each context loop includes a context_id field, a context_config field, and a context_length field. Also, each context loop further includes a static_chain_byte ( ) field and/or a dynamic_chain_byte ( ) field in accordance with the context_config field value.

If the adaptation module of FIG. 7 operates in adaptation mode 1 or adaptation mode 2, the context_config field of the RDT may be set to '0x00' or '0x01', and if the adaptation module operates in adaptation mode 2 or adaptation mode 3, the context_config field of the RDT may be set to '0x02' or '0x03'.

As described above, ALP streams including link layer packets generated by the link layer are transmitted to the physical layer.

Meanwhile, the RDT that includes header compression information and context information (in case of adaptation modes 2 and 3) according to the present disclosure may be categorized into two transmission modes. One of the two transmission modes will be referred to as catalog RDT, and the other one will be referred to as discrete RDT. In the present disclosure, for convenience of description, the catalog RDT may be referred to as a first RDT, and the discrete RDT may be referred to as a second RDT. On the contrary, the discrete RDT may be referred to as a first RDT, and the catalog RDT may be referred to as a second RDT.

In one embodiment of the present disclosure, the catalog RDT is defined as RDT transmission mode that includes context information for one or more RoHC/ALP streams and transmitted to a signaling PLP. Therefore, the present disclosure may provide multiple RDTs for multiplex ALP streams. In one embodiment, the signaling PLP also transmits LMT, LLS, etc. The receiver may acquire the catalog RDT from the random access point. The catalog RDT may be transmitted to a specific robust PLP instead of the signaling PLP. In one embodiment, the LMT is transmitted through the specific PLP. If the catalog PLP is transmitted through the PLP that transmits LMT, the receiver may simultaneously acquire the LMT and the catalog RDT. In one embodiment of the present disclosure, the PLP for transmitting the catalog RDT is different from the PLP for transmitting RoHC packet flow related with the catalog RDT.

In the present disclosure, the discrete RDT is defined in an RDT transmission mode exclusively carried in ALP streams supported by itself. This approach is matched with RFC 3095, and context is always carried within related IP streams. That is, the discrete RDT is frequently generated in accordance with a context change, and may be transmitted to the PLP to which RoHC packet flow related therewith is transmitted, together with the RoHC packet flow. Since the discrete RDT is generated if a context is changed, and is immediately transmitted, the discrete RDT may not be transmitted to the random access point. In one embodiment of the present disclosure, the PLP for transmitting the discrete RDT is the same as the PLP for transmitting the RoHC packet flow related with the discrete RDT.

A syntax structure of the catalog RDT may be the same as or different from a syntax structure of the discrete RDT. In one embodiment of the present disclosure, the catalog RDT and the discrete RDT depend on the RDT syntax structure of FIG. 16.

Also, in one embodiment, '100' is allocated as a value of a packet type field of a link layer packet for transmitting the catalog RDT and a value of a packet type field of a link layer packet for transmitting a discrete RDT.

In one embodiment, if the value of the packet type field of the link layer packet is '100', the header of the corresponding link layer packet further includes additional header for signaling information.

In one embodiment, when the catalog RDT and the discrete RDT are simultaneously transmitted, if the receiver is in the status of a channel change, the receiver first processes the catalog RDT.

In one embodiment, when the catalog RDT and the discrete RDT are simultaneously transmitted, if the receiver is receiving content streams, the receiver first processes the discrete RDT.

In order to perform this operation, a method for identifying the catalog RDT from the discrete RDT in the receiver is required.

In one embodiment of the present disclosure, the catalog RDT and the discrete RDT are identified using a signaling_type field of additional header for signaling information in the header. That is, the receiver identifies a table delivered to a payload of a corresponding link layer packet as the catalog RDT if a value of a packet type field of the link layer packet received in the signaling PLP is '100' and a value of a signaling_type field of additional header for signaling information of the corresponding link layer packet is 0x02. Also, the receiver identifies a table delivered to a payload of a corresponding link layer packet as the discrete RDT if a value of a packet type field of the link layer packet received in the data PLP is '100' and a value of a signaling_type field of additional header for signaling information of the corresponding link layer packet is 0x02.

Figure 17:
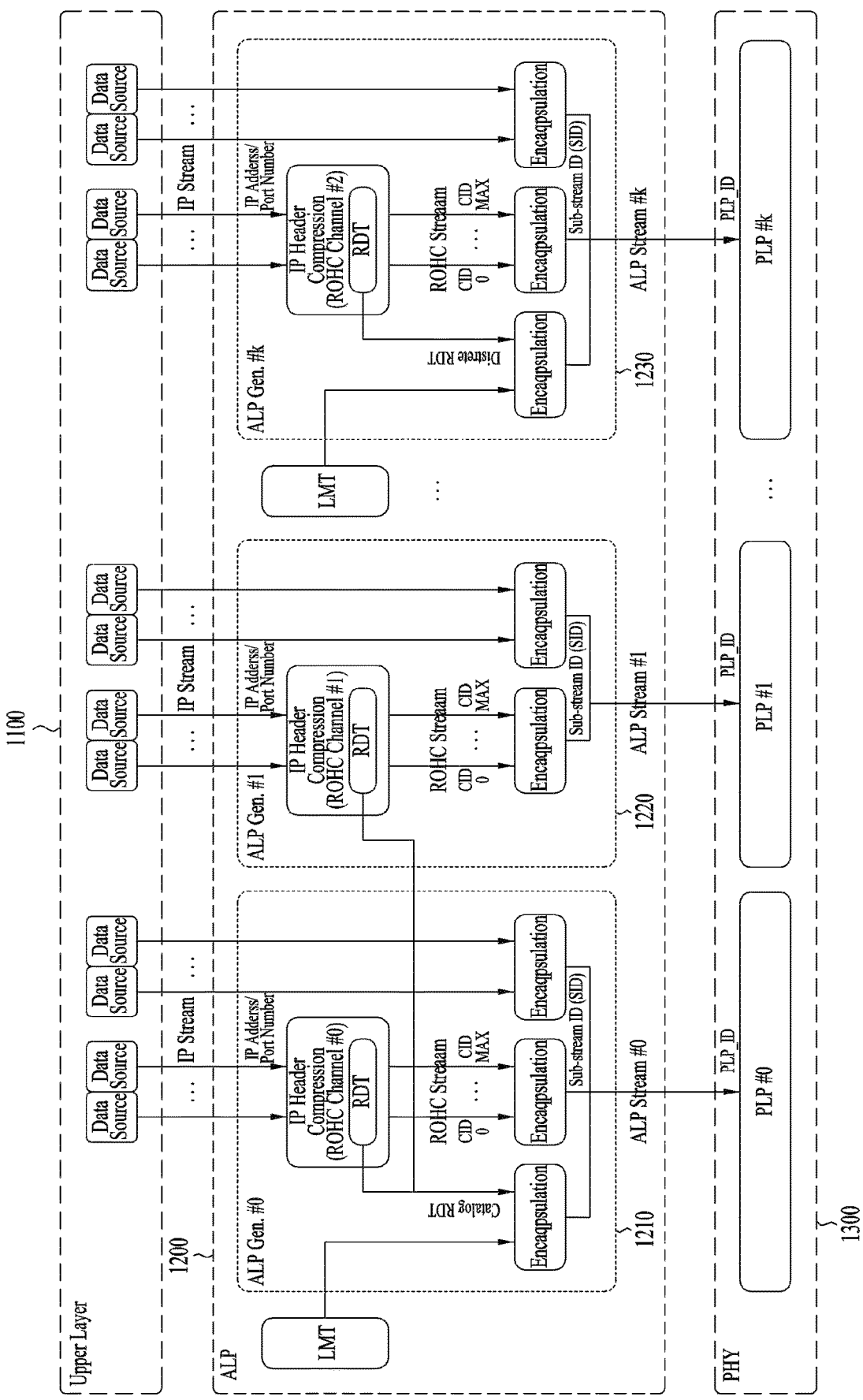
FIG. 17 is a schematic block view illustrating one example of an ATSC link layer protocol (ALP) system according to the present disclosure.

FIG. 17 is a schematic block view illustrating one example of a link layer system for transmission of ATSC link layer protocol (ALP) streams according to the present disclosure. In FIG. 17, the link layer system includes an upper layer block 1100, a link layer block 1200, and a physical layer block 1300.

In one embodiment, a data source of the upper layer block 1100 is a multicast identified by a source IP address, a destination IP address, a source UDP port number, and a destination UDP number. In the present disclosure, multicast means that data are simultaneously transmitted to many receivers through an IP network or means a set of data simultaneously transmitted to many receivers through an IP network.

In the present disclosure, multicast is referred to as IP streams, or is referred to as an upper layer session.

The link layer block 1200 generates one or more ALP streams from one or more multicasts input from the upper layer block 1100 and then delivers the generated ALP streams to one or more PLPs of the physical layer block 1300. Each ALP stream includes one or more link layer packets.

At this time, one ALP stream is delivered to only one PLP. Therefore, in order to deliver the plurality of ALP streams, the link layer block 1200 should include a plurality of ALP streams generators, and the physical layer block 1300 should process data of a plurality of PLPs. For example, in order to generate and deliver k number of ALP streams (k is 2 or more), k number ALP stream generators and k number of PLPs are required.

In other words, each ALP stream output from each ALP stream generator of the link layer block 1200 is delivered to its unique PLP. Therefore, PLP ID for identifying the PLP may be used as ALP stream ID for identifying a corresponding ALP stream and ALP stream generator ID for identifying a corresponding ALP stream generator.

Also, in the aforementioned RoHC compression, the RoHC framework defines RoHC channels to identify a compressed packet flow. In one embodiment of the present disclosure, a single RoHC channel is configured in an ALP stream. Therefore, the PLP ID for identifying the PLP may be mapped into RoHC channel number for identifying the RoHC channel.

That is, the RoHC channel, the ALP stream and the PLP may be mapped into one another in a 1:1:1 relationship. Therefore, the PLP ID for identifying the PLP may be used as an identifier for identifying the RoHC channel and the identifier for identifying the ALP stream.

Therefore, each ALP stream generator includes an IP header compressor for outputting RoHC streams and an encapsulation module for outputting ALP streams.

The IP header compressor includes a pre-processing module, an RoHC module, and an adaptation module. The RoHC module of the IP header compressor performs header compression by receiving IP packets in one or more multicasts. If IP packets input for header compression are fragmented packets, after the pre-processing module performs IP de-fragmentation and restores IP packets prior to fragmentation, the RoHC module performs header compression.

If the header compression is performed, RoHC packets corresponding to IP packets prior to compression are generated. The RoHC packets include IR packet, IR-DYN packet, and compressed packets, and streams including the RoHC packets will be referred to as RoHC streams (or compressed IP streams).

Then, the adaptation module performs an adaptation function for the RoHC packets based on the adaptation mode and outputs the RoHC streams to the encapsulation module. A type of at least one RoHC packet included in the RoHC streams output from the RoHC module is varied depending on the adaptation mode.

For example, in case of the adaptation mode 1, context information is not extracted from the RoHC packets, and the RDT includes only information on header compression. In this case, the RoHC streams output to the encapsulation module include at least IR packet, IR-DYN packet and compressed packets.

In case of the adaptation mode 2, context information (that is, static chain information) is extracted from the header of the IR packet of the RoHC packets, and the IR packet from which the context information is extracted is converted to the IR-DYN packet. The converted IR-DYN packet is replaced from the original IR packet and transmitted to the encapsulation module in the same order within the RoHC streams. That is, the RoHC streams output to the encapsulation module include at least IR-DYN packet generated by the header compression, the converted IR-DYN packet, and the compressed packets. The context information extracted from the IR packet is included in the RDT and then transmitted to the encapsulation module.

In case of the adaptation mode 3, context information (that is, static chain information and dynamic chain information from IR packet and dynamic chain information from IR-DYN packet) is extracted from the IR packet and the IR-DYN packet of the RoHC packets. The IR packet and the IR-DYN packet, from which the context information is extracted, are converted to the compressed packets. The converted compressed packets are replaced from the original IR and IR-DYN packets and transmitted to the encapsulation module in the same order within the RoHC streams. That is, the RoHC streams output to the encapsulation module include the compressed packets generated by the header compression and the converted compressed packets. The context information extracted from the IR and IR-DYN packets is included in the RDT and then output to the encapsulation module.

The encapsulation module generates at least one link layer packet including the RDT and at least one link layer packet including packets within the RoHC streams. At this time, a value of a packet type field within a header of at least one link layer packet including the RDT is 100, and a value of a packet type field within a header of at least one link layer packet including packets within the RoHC streams is 010. In addition, the encapsulation module may generate at least one link layer packet including IP packets (that is, IP packets which are not header compressed) within one or more multicasts. A value of a packet type field within a header of at least one link layer packet including IP packets which are not subjected to the IP header compressor is 000. In the present disclosure, LLS is transmitted to IP packets having IP address 224.0.23.60 and a destination port number 4937. In one embodiment, header compression is not performed for IP packets including the LLS.

The encapsulation module may include all or at least one of an encapsulator for generating at least one link layer packet including RDT, an encapsulator for generating at least one link layer packet including packets within the RoHC streams, and an encapsulator for generating at least one link layer packet including IP packets which are not subjected to the IP header compressor. In one embodiment, if a plurality of encapsulators are provided in the encapsulation module, output streams of each encapsulator may be referred to as sub streams, each of which is identified by a sub stream identifier. The presence of the sub stream identifier and each sub stream identifier are signaled to the corresponding link layer packet and/or LMT.

One ALP stream is only output from the encapsulation module. The ALP stream includes at least one link layer packet including the RDT, at least one link layer packet including packets within the RoHC streams, and at least one link layer packet including IP packets which are not subjected to the IP header compressor, depending on RDT type, header compression, etc.

The ALP stream output from the encapsulation module is delivered to the corresponding PLP of the physical layer block 1300. At this time, PLP ID for identifying the PLP is signaled to the corresponding LMT. That is, IP address/port information for identifying one or more multicasts included in the ALP stream and mapping information for mapping the PLP for transmitting the ALP stream are signaled to the LMT.

For convenience of description, in FIG. 17, a reference numeral 1210 denotes a first ALP stream generator, a reference numeral 1220 denotes a second ALP stream generator, and a reference numeral 1230 denotes a third ALP stream generator. In one embodiment, the first ALP stream generator 1210 includes a first IP header compressor for generating and outputting a first RDT and a first RoHC stream based on one or more multicasts, and a first encapsulation module for generating and outputting a first ALP stream based on the first RoHC stream. In one embodiment, the second ALP stream generator 1220 includes a second IP header compressor for generating and outputting a second RDT and a second RoHC stream based on one or more multicasts, and a second encapsulation module for generating and outputting a second ALP stream based on the second RoHC stream. In one embodiment, the second ALP stream generator 1230 includes a third IP header compressor for generating and outputting a third RDT and a third RoHC stream based on one or more multicasts, and a third encapsulation module for generating and outputting a third ALP stream based on the third RoHC stream.

In one embodiment, PLP ID signaled to the first RDT is the same as PLP ID of a PLP for transmitting the first ALP stream including the first RoHC channel. In one embodiment, PLP ID signaled to the second RDT is the same as PLP ID of a PLP for transmitting the second ALP stream including the second RoHC channel. In one embodiment, PLP ID signaled to the third RDT is the same as PLP ID of a PLP for transmitting the third ALP stream including the third RoHC channel.

At this time, each RDT, as shown in FIG. 16, includes a PLP_ID field, a max_CID field, an adaptation_mode field, a context_config field, a num_context field, and a context loop repeated as much as a value of the num_context field. Each context loop includes a context_id field, a context_config field, and a context_length field. Also, each context loop further includes a static_chain_byte ( ) field and/or a dynamic_chain_byte ( ) field in accordance with a value of the context_config field. Each field will be understood with reference to FIG. 16 and omitted herein.

Meanwhile, in the present disclosure, the RDT is categorized into a catalog RDT and a discrete RDT in accordance with the RDT transmission mode as described above.

In one embodiment of FIG. 17, a first RDT and a second RDT are categorized into the catalog RDT, and a third RDT is categorized into the discrete RDT. That is, the catalog RDT that includes the first RDT and the second RDT is encapsulated into at least one link layer packet and then transmitted to a specific PLP. The third RDT is encapsulated into at least one link layer packet and then transmitted to the PLP for transmitting the third RoHC channel. The specific PLP for transmitting the catalog RDT may be a signaling PLP, a PLP (PLP #0) for transmitting the first RoHC channel, or a PLP (PLP #1) for transmitting the second RoHC channel. That is, the catalog RDT including a plurality of RDTs for a plurality of ALP streams may be encapsulated into at least one link layer packet and then transmitted through the specific PLP.

At this time, there may be various methods for encapsulating the catalog RDT including the plurality of RDTs into at least one link layer packet.

In one embodiment of the present disclosure, the catalog RDT including the plurality of RDTs is encapsulated into one link layer packet by a concatenation scheme. That is, the RDTs included in the catalog RDT are concatenated in a payload of one link layer packet and signaled to a header of the corresponding link layer packet. In this case, the catalog RDT including the plurality of RDTs may be transmitted to one link layer packet without affecting the existing reception system that receives one RDT (backward compatible). In other words, if the catalog RDT including the plurality of RDTs is transmitted by a concatenation scheme, multiple PLP data of the context may be transmitted at the same time.

For example, it is assumed that the catalog RDT includes two RDTs as shown in FIG. 17. In this case, in a header structure of a link layer packet for link layer signaling shown in FIG. 13, a packet_type field value in a base header is "100, a PC field value is '1', and an S/C field value is also "1". A Length_LSB field of 11 bits of the base header and a Length_MSB field of additional header for concatenation indicate a total length of a payload of a corresponding link layer packet, and a count field indicates the number of RDTs concatenated in the payload of the corresponding link layer packet. Therefore, the count field has a value of "2". The SIF field has a value of "0", and the component_length field indicates a length of each of two RDTs. Subsequently, in one embodiment, a value of a signaling_type field of additional header for signaling information is "0x02", a value of a signaling_type_extension field is "0xFFFF", a value of a signaling_format field is "00", and a value of a signaling_encoding field is "00". In one embodiment of the present disclosure, a concatenation scheme is used for transmission of multiple RDTs of the catalog RDT in a system Random Access Point (RAP). In this case, the RAP means a first byte of a data sequence where a media client and a decoder may start to operate.

In another embodiment of the present disclosure, each RDT in the catalog RDT is encapsulated into each link layer packet. In this case, link layer packets are generated as much as the number of RDTs included in the catalog RDT, and a header of each link layer packet includes a base header and additional header for signaling information.

In still another embodiment of the present disclosure, a PLP loop repeated as much as the number of RDTs included in the catalog RDT is added to the RDT structure of FIG. 16 and therefore context information and header compression information related with RoHC channel transmitted to a corresponding PLP are signaled.

Meanwhile, a specific PLP for transmitting the catalog RDT that includes the first RDT and the second RDT also transmits the LMT. The LMT, as shown in FIG. 15, provides a list of multicasts carried to the PLP #0 and a list of multicasts carried to the PLP #1. Also, the LMT provides additional information for processing link layer packets for carrying the multicasts from the link layer. In one embodiment of FIG. 17, the catalog RDT and the LMT are carried through PLP #0.

In FIG. 17, the third RDT which is the discrete RDT signals header compression information and context information related with the third RoHC channel, and is transmitted to the same PLP (PLP #3) together with the third RoHC channel. At this time, the LMT is also transmitted to the PLP #3, and the LMT, as shown in FIG. 15, provides a list of multicasts carried to the PLP #3 and additional information for processing link layer packets for carrying the multicasts from the link layer.

In FIG. 17, all IP header compressors of a plurality of ALP stream generators 1210 to 1230 may operate, and at least one of them may operate or none of them may operate.

Figure 18:
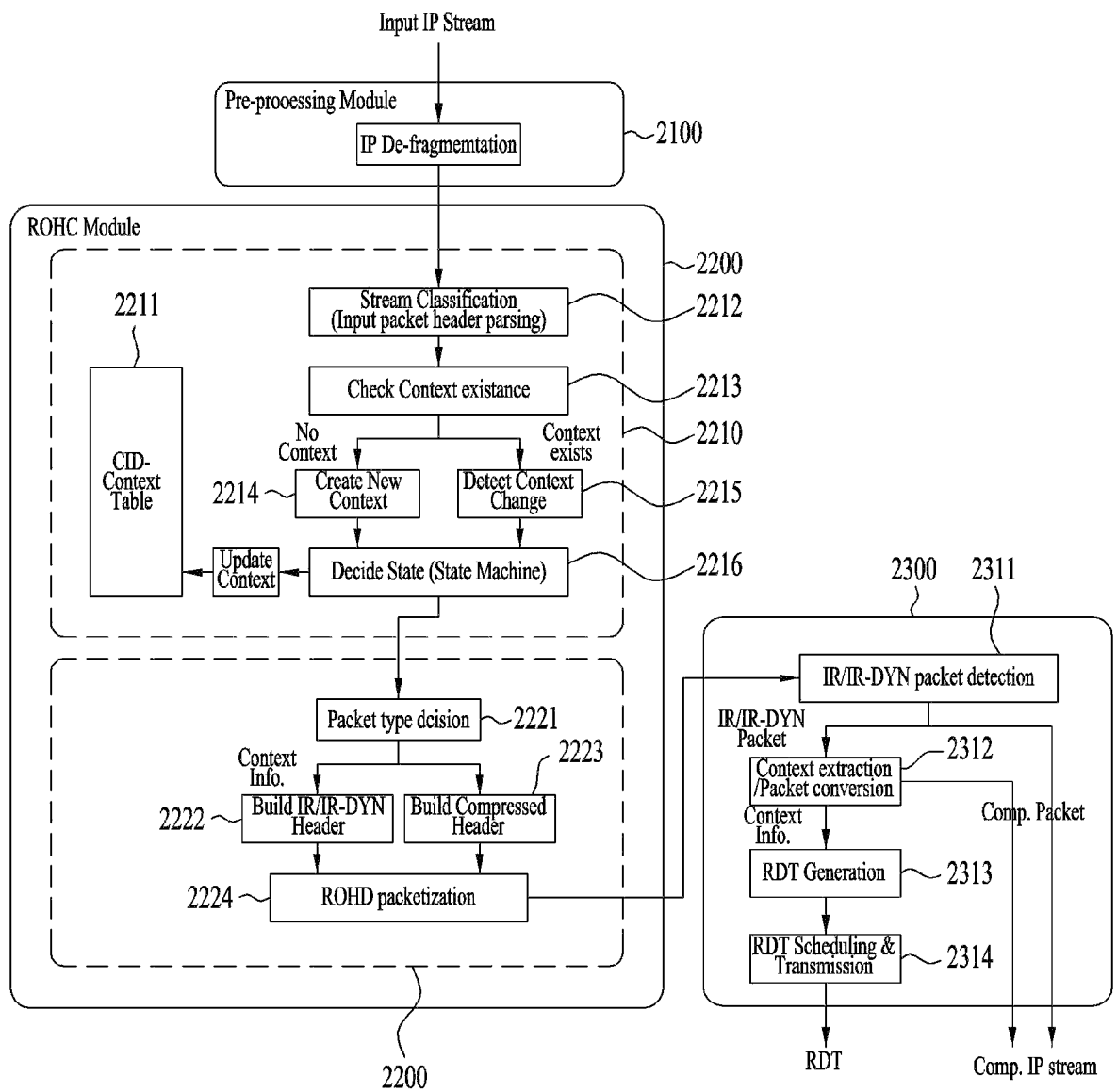
FIG. 18 is a schematic block view illustrating one example of an IP header compressor according to the present disclosure.

FIG. 18 is a detailed schematic block view illustrating one example of an IP header compressor included in each ALP stream generator according to the present disclosure.

The IP header compressor includes a pre-processing module 2100, an RoHC module 2200, and an adaptation module 2300.

The pre-processing module 2100 collects fragmented IP packets, performs IP de-fragmentation to restore IP packets prior to fragmentation and outputs the restored IP packets to the RoHC module 2200 if IP packets in IP streams input for header compression are fragmented packets. Therefore, each header of the IP packets output from the pre-processing module 2100 includes both an IP header and a UDP header. Since the procedure of determining whether the IP packets are fragmented and defragmenting the IP packets has been described as above, its detailed description will be omitted herein. If the input IP packets are defragmented packets, the pre-processing module 2100 outputs the IP packets to the RoHC module 2200 as they are.

The RoHC module 2200 performs header compression for the IP packets of the IP streams output from the pre-processing module 2100 in accordance with RoHC scheme.

To this end, in one embodiment, the RoHC module 2200 includes a context management unit 2210 and an RoHC packet generator 2220.

In one embodiment, the context management unit 2210 includes a context table 2211, a stream classification unit 2212, a context check unit 2213, a context generator 2214, a context change detector 2215, a state machine unit 2216, and a context update unit 2217.

In one embodiment, the RoHC packet generator 2220 includes a packet type determination unit 2221, a first packet header generator 2222, a second packet header generator 2223, and an RoHC packetizer 2224.

In one embodiment, the adaptation module 2300 includes a packet detector 2311, a context information extractor 2312, an RDT generator 2313, and an RDT output unit 2314.

The stream classification unit 2212 of the context management unit 2210 classifies the IP streams by parsing a header of the IP packets output from the pre-processing module 2100 to perform header compression based on context. In one embodiment, the stream classification unit 2212 classifies the IP streams based on static context information of the input IP packets. In one embodiment, the static context information includes at least IP address and port number. Particularly, in one embodiment, when the IP packets have the same combination of a source IP address, a destination IP address, a source UDP port number, and a destination UDP port number, the IP packets may be considered as the same IP stream.

After the IP streams are classified by the stream classification unit 2212, the context check unit 2213 checks whether a context of the classified IP streams exists. If the input IP packet is a first IP packet of the IP streams, since there is no context information stored to be related with the IP streams, the context check unit 2213 determines that there is no context of the IP streams. In other words, if header compression is performed, IR packets are generated and context information is extracted from the IR packets and then stored. If the input IP packet is the first IP packet of the corresponding IP stream, since the corresponding IP stream is prior to header compression, there is no context information which is stored. In one embodiment, the context information is stored in a context table 2211 of the context management unit 2210.

If the context check unit 2213 checks that there is no context, the context generator 2214 generates a new context based on header information of the input IP packet and outputs the generated context to the state machine 2216. If the context check unit 2213 checks that there a context, the context change detector 2215 checks whether the context has been changed. In one embodiment, the context change detector 2215 checks whether the context has been changed by comparing the context stored in the context table 2211 with the header information of the input IP packets. This case may occur when dynamic information in the IP packet header is changed. If the context has been changed, the changed context is output to the state machine 2216 and if the context has not been changed, the state machine 2216 is informed that the context has not been changed, by using a flag, etc.

The state machine 2216 determines a current state based on the output of the context generator 2214 or the context change detector 2215. The state machine 2216 determines one of three states, that is, an Initialization and Refresh (IR) state, a First Order (FO) state, a Second Order (SO) state.

In the IR state that is the first state of compression, an uncompressed header, that is, a full header is transmitted, and a packet transmitted in the IR state is referred to as an IR packet.

In the FO state, the compressor recognizes and stores static fields such as IP address and port number. Also, in the FO state, the compressor transmits difference values of dynamic fields. That is, the FO state is the state that the static fields are compressed and at the same time the dynamic fields are partially compressed. In the FO state, the IR-DYN packets may be transmitted, and compressed packets such as UO-1 and UOR-2 may be transmitted.

In the SO state, the compressor compresses all of the dynamic fields such as sequence number, and transmits a partial checksum for verifying next packet and an encoded sequence number. In the SO state, the compressed packet such as UO-0 is transmitted.

That is, all of the static fields and most of the dynamic fields are compressed in the FO state while all of the dynamic fields are predictively compressed using the sequence number and checksum. In order that movement between the compressed states occurs, periodic timeout should occur, and a change pattern of a packet header should be required.

A new context or changed context output from the context generator 2214 or the context change detector 2215 is stored in the context table 2211 through the state machine 2216 and the context update unit 2217.

The state determined by the state machine 2216 is output to the RoHC packet generator 2220.

The packet type determination unit 2221 of the RoHC packet generator 2220 determines a packet type of the RoHC packet corresponding to the input IP packet based on the state determined by the state machine 2216. Although not mentioned above, the IP packet output from the pre-processing module 2100 is also output to the packet type determination unit 2221 of the RoHC packet generator 2220 through the blocks 2212, 2213, 2214, 2215 and 2216 of the context management unit 2210.

In one embodiment, the packet type of the ROHC packet determined by the packet type determination unit 2221 is one of the IR packet, the IR-DYN packet and the compressed packet. The compressed packet may be one of the UO-0 packet, UO-1 packet and UOR-2 packet. In one embodiment of the present disclosure, the UO-0 packet will be described. For example, if the state determined by the state machine 2216 is the IR state, the packet type determination unit 2221 determines the packet type of the RoHC packet as the IR packet. If the state determined by the state machine 2216 is the FO state, the packet type determination unit 2221 determines the packet type of the RoHC packet as the IR-DYN packet. If the state determined by the state machine 2216 is the SO state, the packet type determination unit 2221 determines the packet type of the RoHC packet as the compressed packet.

If the determined packet type of the RoHC packet is the IR packet or the IR-DYN packet, the packet type determination unit 2221 outputs context information of the corresponding packet to the first packet header generator 2222 together with the determined packet type information. If the determined packet type of the RoHC packet is the compressed packet, the packet type determination unit 2221 outputs the determined packet type information to the second packet header generator 2223.

In one embodiment, if the determined packet type of the RoHC packet is the IR packet, the packet type determination unit 2221 generates context information of the IR packet based on at least one of a new context generated by the context generator 2214 and the header of the input IP packet.

In one embodiment, if the determined packet type of the RoHC packet is the IR-DYN packet, the packet type determination unit 2221 generates context information of the IR-DYN packet based on at least one of the changed context output from the context change detector 2215 and the header of the input IP packet.

If the packet type determined by the packet type determination unit 2221 is the IR packet, the first packet header generator 2222 builds the header of the IR packet that includes context information provided by the packet type determination unit 2221. If the packet type determined by the packet type determination unit 2221 is the IR-DYN packet, the first packet header generator 2222 builds the header of the IR-DYN packet that includes context information provided by the packet type determination unit 2221. If the packet type determined by the packet type determination unit 2221 is the compressed packet, the second packet header generator 2223 builds the header of the compressed packet, that is, the header of the UO-0 packet.

When the first packet header generator 2222 builds the header of the IR packet or the header of the IR-DYN packet or when the second packet header generator 2223 builds the header of the compressed packet, CID is allocated to the corresponding header.

As described above, CID is classified into small CID and large CID of 1 byte. The small CID is classified into a case that a CID value is 0 and a case that a CID value is not 0. When the CID value is not 0, the CID includes the most significant bit (MSB) of 4 bits indicating there is CID and the least significant bit (LSB) of 4 bits for signaling the actual CID value. When the CID value is 0, a field indicating the CID value does not exist in the corresponding header. If a CID related field indicating the CID value does not exist in the header of the ROHC packet, the receiver determines that CID of the corresponding packet is 0. Therefore, when the CID value is 0, a header length of the corresponding RoHC packet is reduced as much as 1 byte as compared with the case that the CID value is not 0.

Figures 19A, 19B, 19C:
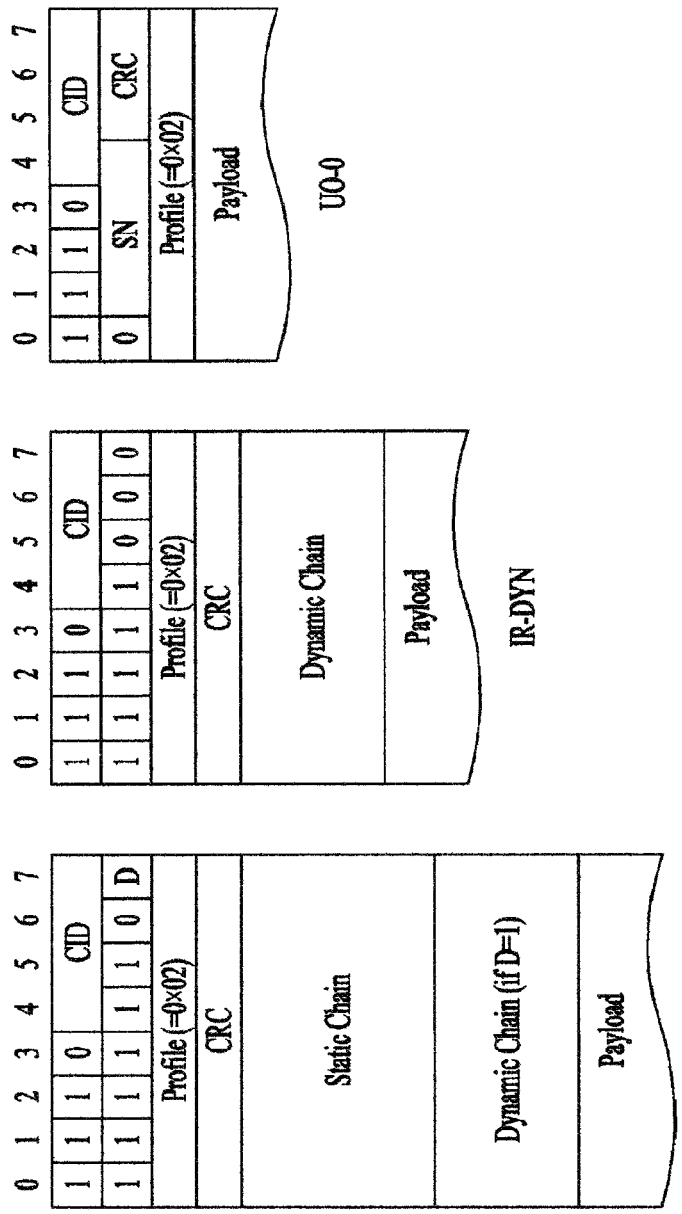
FIGS. 19(*a*) to 19(*c*) illustrate examples of IR packet, IR-DYN packet and UO-0 packet formats when small CID is allocated and has a value not 0.

FIGS. 19(a) to 19(c) illustrate examples of IR packet, IR-DYN packet and UO-0 packet formats when small CID is allocated and has a value not 0.

A first octet of the IR packet in FIG. 19(a) includes 4 bits of the LSB for signaling small CID not 0 and 4 bits of the MSB indicating that there is CID. Identification information for identifying that the RoHC packet is the IR packet is signaled to a second octet of the IR packet. In one embodiment, the identification information for identifying the IR packet is 1111110D. In this case, a flag D indicates whether dynamic chain information exists in the header of the IR packet. For example, if the flag D has a value of 0, it indicates that there is no dynamic chain information in the header of the IR packet, and if the flag D has a value of 1, it indicates that there is dynamic chain information in the header of the IR packet. Context profile information is signaled to a third octet of the IR packet, and CRC information is signaled to a fourth octet of the IR packet. Static chain information is signaled to at least one next octet, and then dynamic chain information is signaled to at least one next octet.

A first octet of the IR-DYN packet in FIG. 19(b) includes 4 bits of the LSB for signaling small CID not 0 and 4 bits of the MSB indicating that there is CID. Identification information for identifying that the RoHC packet is the IR-DYN packet is signaled to a second octet of the IR-DYN packet. In one embodiment, the identification information for identifying the IR-DYN packet is 11111000. Context profile information is signaled to a third octet of the IR-DYN packet, and CRC information is signaled to a fourth octet of the IR-DYN packet. Dynamic chain information is signaled to at least one next octet.

A first octet of the UO-0 packet in FIG. 19(c) includes 4 bits of the LSB for signaling small CID not 0 and 4 bits of the MSB indicating that there is CID. 0 is signaled to a first bit of a second octet, a sequence number is signaled to next 4 bits, and CRC information is signaled to the other 3 bits.

FIGS. 20(a) to 20(c) illustrate examples of IR packet, IR-DYN packet and UO-0 packet formats when small CID is allocated and has a value of 0. When the CID value is 0, CID related octet (that is, byte) does not exist. That is, the receiver determines that CID of the corresponding packet is 0 if there is no CID related octet in the header of the IR packet, the IR-DYN packet or the UO-0 packet.

When the CID value is 0, as shown in FIGS. 20(a) to 20(c), a header length of each of the IR packet, the IR-DYN packet and the UO-0 packet is reduced as much as 1 byte as compared with the case that the CID value is not 0.

Since FIGS. 20(a) to 20(c) are the same as FIGS. 19(a) to 19(c) except that there is no CID related octet, their detailed description will be omitted herein.

Figures 21A, 21B, 21C:
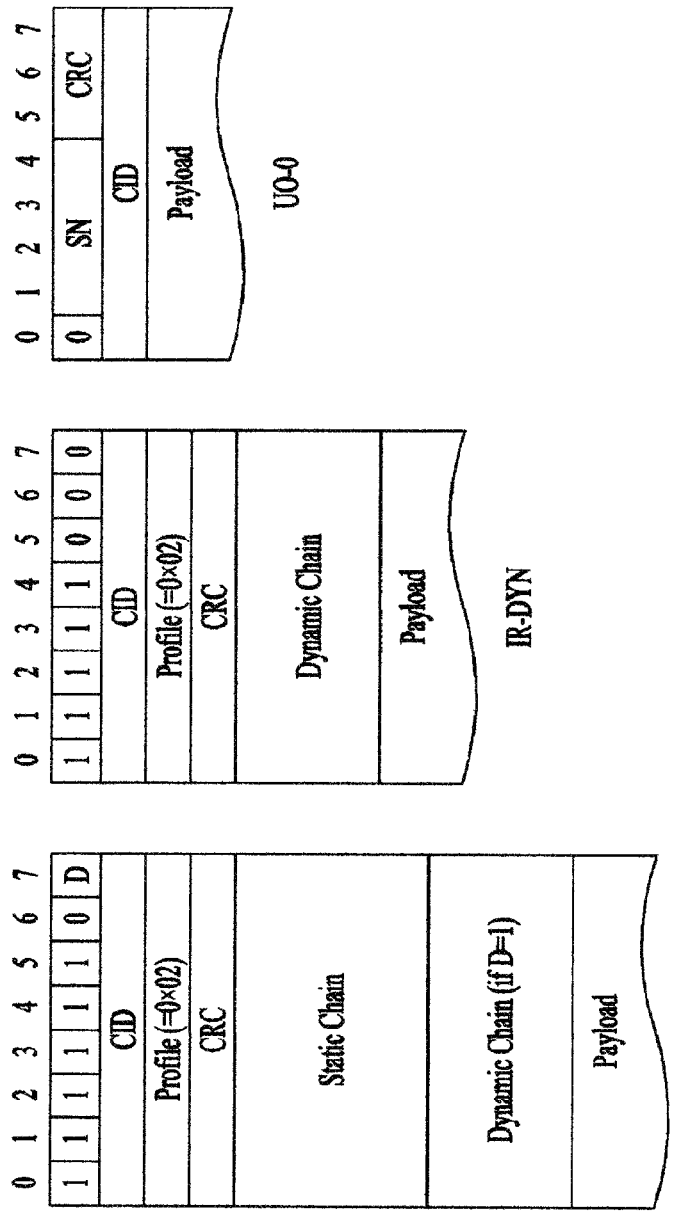
FIGS. 21(*a*) to 21(*c*) illustrate examples of IR packet, IR-DYN packet and UO-0 packet formats when large CID is allocated.

FIGS. 21(a) to 21(c) illustrate examples of IR packet, IR-DYN packet and UO-0 packet formats when large CID is allocated.

Identification information for identifying that the RoHC packet is the IR packet is signaled to a first octet of the IR packet in FIG. 21(a), and large CID is signaled to a second octet of the IR packet. Since a portion which is not described in FIG. 21(a) is the same as FIG. 19(a), its detailed description will be omitted herein.

Identification information for identifying that the RoHC packet is the IR-DYN packet is signaled to a first octet of the IR-DYN packet in FIG. 21(b), and large CID is signaled to a second octet of the IR-DYN packet. Since a portion which is not described in FIG. 21(b) is the same as FIG. 19(b), its detailed description will be omitted herein.

0 is signaled to a first bit of a first octet of the UO-0 packet in FIG. 21(c), and a sequence number is signaled to next 4 bits, and CRC information is signaled to the other 3 bits. Large CID is signaled to a second octet of the UO-0 packet.

A payload of the input IP packet becomes a payload of any one of the packets in FIGS. 19(a) to 19(c), FIGS. 20(a) to 20(c) and FIGS. 21(a) to 21(c). That is, the header of the RoHC packet generated by the first packet header generator 2222 or the packet heard generator 2223 is added to the payload of the input IP packet, whereby the RoHC packet is generated. In other words, header compression is performed for the input IP packet. In case of the IR packet or the IR-DYN packet, a sequence number is included in the dynamic chain information.

In the present disclosure, since one PLP is mapped into one RoHC channel, the CID is managed separately at each PLP.

IP packets having the same combination of a source IP address, a destination IP address, a source UDP port number, and a destination UDP port number (that is, static context information) are considered as the same IP stream. In one embodiment, the same CID is allocated to RoHC packets corresponding to the IP packets included in the same IP stream. At this time, in one embodiment, CID allocated to the IP stream is not allocated to the other IP streams. That is, if any one of the source IP address, the destination IP address, the source UDP port number and the destination UDP port number of the input IP packet is different from a previous IP packet, the input IP packet is considered to be included in another IP stream. This rule is applied within one RoHC channel in one embodiment.

That is, CID is classified only in the RoHC channel. For example, although the same CID should not be allocated to IP stream #0 and IP stream #1 included in the RoHC channel #0, the same CID may be allocated to IP stream #0 included in RoHC channel #0 and IP stream #1 included in RoHC channel #1.

In the present disclosure, the case that CID is allocated to IP stream means that CID is allocated to each header of RoHC packets corresponding to the IP packets included in the IP stream. At this time, if the IP packets are included in the same IP stream, the same CID value is allocated to each header of the RoHC packets corresponding to the IP packets. Therefore, in one embodiment, the CID may be used by the receiver to identify RoHC stream (that is, compressed IP stream) that includes RoHC packets. In one embodiment of the present disclosure, CDs are managed by the context table 2211.

In one embodiment of the present disclosure, when CDs are allocated to multiple IP streams within one RoHC channel, CID=0 (CID having a value of 0) is allocated to the IP stream (that is, the most common IP stream) that includes the most IP packets. That is, since the RoHC packet (FIG. 19(b), FIG. 20(b) and FIG. 21(b)) having a CID value of 0 is smaller than the RoHC packet having a CID value not 0 as much as 1 byte, if CID=0 is allocated to IP stream having more IP packets, compression efficiency may be more enhanced. As shown, since the case that CID having a value of 0 is allocated means that there is no CID related byte in the corresponding RoHC packet, a header length of the RoHC becomes shorter than the case that there is CID related byte. Since the same CID is allocated to the RoHC packets included in the same IP stream, if CID having a value of 0 is allocated to IP stream having more IP packets, compression efficiency is higher than IP stream having less IP packets.

In other words, since one PLP is mapped into one RoHC channel, the CID having a value of 0 may be allocated to the most common IP stream per PLP. If there is no CID byte in the corresponding RoHC packet based on the RoHC packet structure, it means that CID of the corresponding RoHC packet is 0.

The case that the same CID is allocated to each header of RoHC packets corresponding to IP packets included in the same IP stream has been described as one embodiment.

However, the CID value may optionally vary within the same IP stream. For example, a CID value allocated to IP stream #1 may be changed from 1 to 3. That is, if a context or LLS is changed within the same stream, the CID value may optionally vary. For example, the LLS should repeatedly be transmitted at least once every 5 seconds, and if the LLS is changed, LMT and RDT should be updated, whereby the CID may be changed within the same stream.

In one embodiment of the present disclosure, when the CID value needs to be changed within the same IP stream, the CID value is changed at an initialization and refreshment point. The initialization and refreshment point means a point when the IR packet is transmitted. The point when the IR packet is transmitted becomes a point when RDT is transmitted.

The first packet header generator 2222 generates a header of the IR packet such as FIG. 19(a), FIG. 20(a) or FIG. 21(a) or a header of the IR-DYN packet such as FIG. 19(b) or FIG. 20(b) or FIG. 21(b) through the aforementioned procedure. The second packet header generator 2223 generates a header of the compressed packet such as FIG. 19(c), FIG. 20(c) or FIG. 21(c). In FIGS. 19 to 21, selection of (a), (b) and (c) is determined depending on whether CID is small CID or large CID, and is determined depending on whether the CID value is 0 or not if the CID is small CID. In one embodiment, selection of FIGS. 19, 20 and 21, that is, selection of the IR packet, the IR-DYN packet or the compressed packet is performed based on the state determined by the state machine 2216 and the packet type determined by the packet type determination unit 2221.

The RoHC packetizer 2224 generates the corresponding RoHC packet by using the header of the IR packet or the header of the IR-DYN packet output from the first packet header generator 2222 or the header of the compressed packet output from the second packet header generator 2223 and the payload of the corresponding IP packet. That is, the corresponding RoHC packet is generated by adding the packet header output from the first packet header generator 2222 or the second packet header generator 2223 to the front of the payload of the corresponding IP packet. For example, if the input packet header is the IR packet header, the corresponding RoHC packet includes the IR packet header and the payload of the corresponding IP packet. This packet will be referred to as IR packet. If the input packet header is the IR-DYN packet header, the corresponding RoHC packet includes the IR-DYN packet header and the payload of the corresponding IP packet. This packet will be referred to as IR-DYN packet. If the input packet header is the compressed packet header, the corresponding RoHC packet includes the compressed packet header and the payload of the corresponding IP packet. This packet will be referred to as compressed packet.

The RoHC packet generated by the RoHC packetizer 2224 is output to the packet detector 2311 of the adaptation module 2300.

The packet detector 2311 detects whether the RoHC packet output from the RoHC packetizer 2224 is the IR packet, the IR-DYN packet or the compressed packet.

The IR packet or the IR-DYN packet detected from the packet detector 2311 is output to the context information extractor 2312 and the compressed packet is output to the encapsulation module as it is.

The context information extractor 2312 extracts context information from the IR packet and/or the IR-DYN packet in accordance with the adaptation mode and performs packet conversion. At this time, it is assumed that the context information extractor 2312 knows adaptation mode. The adaptation mode may be managed by the context table 2211, or may be managed and controlled by a controller (not shown) or a scheduler (not shown).

For example, in case of the adaptation mode 1, there is no procedure of extracting context information from the context information extractor 2312 and converting the packet, and the context information extractor 2312 outputs the input IR packet or the input IR-DYN packet to the encapsulation module. That is, the RoHC streams (that is, compressed IP streams) output to the encapsulation module include at least one of the IR packet, the IR-DYN packet, and the compressed packets. Subsequently, the RDT generator 2313 generates RDT that includes only header compression information, and the RDT output unit 2314 performs scheduling and RDT transmission to the encapsulation module.

In case of the adaptation mode 2, the context information extractor 2312 extracts context information (that is, static chain information) from the input IR packet, and converts the IR packet from which the context information is extracted, to the IR-DYN packet. At this time, the extracted context information is output to the RDT generator 2313, and the converted IR-DYN packet is replaced from the original IR packet and transmitted to the encapsulation module in the same order within the RoHC streams. That is, the RoHC streams output to the encapsulation module include at least one of the converted IR-DYN packet, the IR-DYN packet generated by header compression, and the compressed packets. The RDT generator 2313 generates RDT that includes header compression information and the extracted context information, and the RDT output unit 2314 performs scheduling and RDT transmission to the encapsulation module.

In case of the adaptation mode 3, the context information extractor 2312 extracts context information (that is, static chain information and dynamic chain information) from the input IR packet, and extracts context information (that is, dynamic chain information) from the input IR-DYN packet. The IR packet and the IR-DYN packet, from which the context information is extracted, are respectively converted to the compressed packets. The converted compressed packets are replaced from the original IR packet and IR-DYN packet and transmitted to the encapsulation module in the same order within the RoHC streams. That is, the RoHC streams output to the encapsulation module include at least one of the compressed packets generated by header compression and the converted compressed packets. The RDT generator 2313 generates RDT that includes header compression information and the extracted context information, and the RDT output unit 2314 performs scheduling and RDT transmission to the encapsulation module.

In one embodiment of the present disclosure, if a broadcast channel is configured by a single PLP, the adaptation mode 1 is used in the adaptation module 2300. If a signaling PLP is separately configured for a broadcast service, the adaptation mode 2 or 3 is used in the adaptation module 2300. Also, in one embodiment, when the context is updated frequently, the adaptation mode 2 is used in the adaptation module 2300. In addition, in one embodiment, when the context is updated rarely, the adaptation mode 3 is used in the adaptation module 2300.

When the receiver starts decompression, the adaptation mode 1 should be on standby until the IR packet is received, the adaptation mode 2 should be on standby until the IR-DYN packet is received, and the adaptation mode 3 does not need to wait for any packet. That is, in the adaptation mode 3, decompression may start at any compressed packet. Therefore, the adaptation mode 3 of the three adaptation modes is the most efficient.

Figure 22:
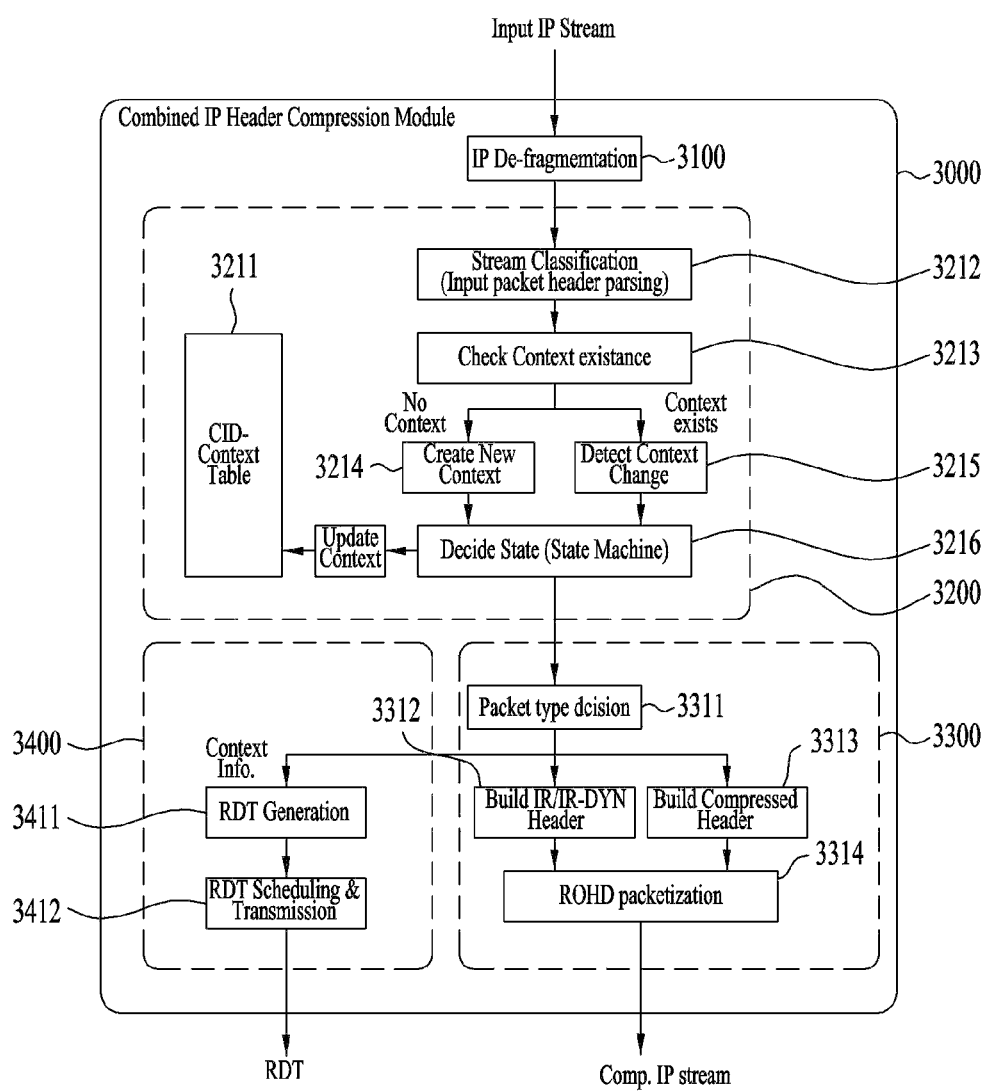
FIG. 22 is a schematic block view illustrating one example of an IP header compressor according to the present disclosure.

FIG. 22 is a schematic block view illustrating another example of an IP header compressor included in each ALP stream generator according to the present disclosure.

In one embodiment, the IP header compressor includes a pre-processing module 3100, a context management unit 3200, an RoHC packet generator 3300, and a signaling generator 3400. In the present disclosure, the context management unit 3200, the RoHC packet generator 3300 and the signaling generator 3400 will collectively be referred to as an RoHC module. That is, FIG. 18 illustrates that the adaptation function is performed by the adaptation module, whereas FIG. 22 illustrates that a procedure of extracting context information from the IR packet and/or the IR-DYN packet and converting the packet is not performed and the adaptation function is performed by the RoHC module.

Since the configuration and operation of the pre-processing module 3100 and the context management unit 3200 are the same as those of the pre-processing module 2100 and the context management unit 2200 of FIG. 18, their detailed description will be omitted herein. The pre-processing module 3100 may be provided outside or inside the RoHC module.

In one embodiment, the RoHC packet generator 3300 of the RoHC module ludes a packet type determination unit 3311, a first packet header generator 3312, a second packet header generator 3313, and an RoHC packetizer 3314.

In one embodiment, the signaling generator 3400 of the RoHC module includes an RDT generator 3411 and an RDT output unit 3412.

In one embodiment, the packet type determination unit 3311 of the RoHC packet generator 3300 determines a packet type of RoHC packet corresponding to the input IP packet based on the state determined by the state machine 3216 and the adaptation mode.

It is assumed that the packet type determination unit 3311 knows the adaptation mode which will be applied when the packet type is determined as the IR packet or the IR-DYN packet. The adaptation mode may be managed by the context table 3211, or may be managed and controlled by a controller (not shown) or a scheduler (not shown). Although not mentioned above, the IP packet output from the pre-processing module 2100 is input to the packet type determination unit 3311 of the RoHC packet generator 3300 through the blocks 3212, 3213, 3214, 3215 and 3216 of the context management module 3200.

In one embodiment, the packet type of the ROHC packet finally determined by the packet type determination unit 3311 is one of the IR packet, the IR-DYN packet and the compressed packet. The compressed packet may be one of the UO-0 packet, UO-1 packet and UOR-2 packet. In one embodiment of the present disclosure, the UO-0 packet will be described.

In one embodiment, the packet type determination unit 3311 provides corresponding context information to the RDT generator 3411 of the signaling generator 3400 in accordance with the adaptation mode. In one embodiment, the context information is generated in accordance with the packet type determined based on at least one of a new context output from the context generator 3214 or the changed context output from the context change detector 3215 or the header of the input IP packet.

In one embodiment, when the adaptation mode is 1 and the state determined by the state machine 3216 is the IR state, the packet type determination unit 3311 determines the packet type of the RoHC packet as the IR packet, and outputs packet type information indicating that the determined packet type is the IR packet to the first packet header generator 3312. The first packet header generator 3312 generates a header of the IR packet based on the header of the input IP packet and the packet type information indicating the IR packet and outputs the generated header to the RoHC packetizer 3314. The header of the IR packet is generated by one format of FIG. 19(a), FIG. 20(a) and FIG. 21(a) in accordance with a type (whether CID is small CID or large CID, and CID value is 0 or not if the CID is small CID) of CID. The RoHC packetizer 3314 outputs the IR packet generated by adding the header of the IR packet to the payload of the input IP packet to the encapsulation module. The RDT generator 3411 of the signaling generator 3400 generates RDT that includes only header compression information, and then outputs the generated RDT through the RDT output unit 3412. At this time, the RDT generator 3411 may generate RDT whenever the packet type is determined as the IR packet by the packet type determination unit 3311 or may newly generate RDT for only a first IP packet of the corresponding IP stream and then reuse the previous RDT.

In one embodiment, when the adaptation mode is 1 and the state determined by the state machine 3216 is the FO state, the packet type determination unit 3311 determines the packet type of the RoHC packet as the IR-DYN packet, and outputs packet type information indicating that the determined packet type is the IR-DYN packet to the first packet header generator 3312. The first packet header generator 3312 generates a header of the IR-DYN packet based on the header of the input IP packet and the packet type information indicating the IR-DYN packet and outputs the generated header to the RoHC packetizer 3314. The header of the IR-DYN packet is generated by one format of FIG. 19(b), FIG. 20(b) and FIG. 21(b) in accordance with a type of CID. The RoHC packetizer 3314 outputs the IR-DYN packet generated by adding the header of the IR-DYN packet to the payload of the input IP packet to the encapsulation module.

In one embodiment, when the adaptation mode is 1 and the state determined by the state machine 3216 is the SO state, the packet type determination unit 3311 determines the packet type of the RoHC packet as the compressed packet, and outputs packet type information indicating that the determined packet type is the compressed packet to the second packet header generator 3313. The second packet header generator 3313 generates a header of the compressed packet based on the packet type information indicating the compressed packet and outputs the generated header to the RoHC packetizer 3314. The header of the compressed packet is generated by one format of FIG. 19(c), FIG. 20(c) and FIG. 21(c) in accordance with a type of CID. The RoHC packetizer 3314 outputs the compressed packet generated by adding the header of the compressed packet to the payload of the input IP packet to the encapsulation module.

In one embodiment, when the adaptation mode is 2 and the state determined by the state machine 3216 is the IR state, the packet type determination unit 3311 determines the packet type of the RoHC packet as the IR-DYN packet, and outputs packet type information indicating that the determined packet type is the IR-DYN packet to the first packet header generator 3312, and outputs context information (that is, static chain information) to the signaling generator 3400. In one embodiment, the context information is extracted (or generated) based on at least one of a new context output from the context generator 3214 and the header of the input IP packet. The first packet header generator 3312 generates a header of the IR-DYN packet based on the header of the input IP packet and the packet type information indicating the IR-DYN packet and outputs the generated header to the RoHC packetizer 3314. The header of the IR-DYN packet is generated by one format of FIG. 19(b), FIG. 20(b) and FIG. 21(b) in accordance with a type of CID. The RoHC packetizer 3314 outputs the IR-DYN packet generated by adding the header of the IR-DYN packet to the payload of the input IP packet to the encapsulation module. The RDT generator 3411 of the signaling generator 3400 generates RDT that includes header compression information and the context information (that is, static chain information), and then outputs the generated RDT through the RDT output unit 3412.

In one embodiment, when the adaptation mode is 2 and the state determined by the state machine 3216 is the FO state, the packet type determination unit 3311 determines the packet type of the RoHC packet as the IR-DYN packet, and outputs packet type information indicating that the determined packet type is the IR-DYN packet to the first packet header generator 3312. The first packet header generator 3312 generates a header of the IR-DYN packet based on the header of the input IP packet and the packet type information indicating the IR-DYN packet and outputs the generated header to the RoHC packetizer 3314. The header of the IR-DYN packet is generated by one format of FIG. 19(b), FIG. 20(b) and FIG. 21(b) in accordance with a type of CID. The RoHC packetizer 3314 outputs the IR-DYN packet generated by adding the header of the IR-DYN packet to the payload of the input IP packet to the encapsulation module.

In one embodiment, when the adaptation mode is 2 and the state determined by the state machine 3216 is the SO state, the packet type determination unit 3311 determines the packet type of the RoHC packet as the compressed packet, and outputs packet type information indicating that the determined packet type is the compressed packet to the second packet header generator 3313. The second packet header generator 3313 generates a header of the compressed packet based on the packet type information indicating the compressed packet and outputs the generated header to the RoHC packetizer 3314. The header of the compressed packet is generated by one format of FIG. 19(c), FIG. 20(c) and FIG. 21(c) in accordance with a type of CID. The RoHC packetizer 3314 outputs the compressed packet generated by adding the header of the compressed packet to the payload of the input IP packet to the encapsulation module.

In one embodiment, when the adaptation mode is 3 and the state determined by the state machine 3216 is the IR state, the packet type determination unit 3311 determines the packet type of the RoHC packet as the compressed packet, and outputs packet type information indicating that the determined packet type is the compressed packet to the second packet header generator 3313, and outputs context information (that is, static chain information and dynamic chain information) to the signaling generator 3400. In one embodiment, the context information is extracted (or generated) based on at least one of a new context output from the context generator 3214 and the header of the input IP packet. The second packet header generator 3313 generates a header of the compressed packet based on the packet type information indicating the compressed packet and outputs the generated header to the RoHC packetizer 3314. The header of the compressed packet is generated by one format of FIG. 19(c), FIG. 20(c) and FIG. 21(c) in accordance with a type of CID. The RoHC packetizer 3314 outputs the compressed packet generated by adding the header of the compressed packet to the payload of the input IP packet to the encapsulation module. The RDT generator 3411 of the signaling generator 3400 generates RDT that includes header compression information and the context information (that is, static chain information and dynamic chain information), and then outputs the generated RDT through the RDT output unit 3412.

In one embodiment, when the adaptation mode is 3 and the state determined by the state machine 3216 is the FO state, the packet type determination unit 3311 determines the packet type of the RoHC packet as the compressed packet, and outputs packet type information indicating that the determined packet type is the compressed packet to the second packet header generator 3313, and outputs context information (that is, dynamic chain information) to the signaling generator 3400. In one embodiment, the context information is extracted (or generated) based on at least one of a changed context output from the context change detector 3215 and the header of the input IP packet. The second packet header generator 3313 generates a header of the compressed packet based on the packet type information indicating the compressed packet and outputs the generated header to the RoHC packetizer 3314. The header of the compressed packet is generated by one format of FIG. 19(c), FIG. 20(c) and FIG. 21(c) in accordance with a type of CID. The RoHC packetizer 3314 outputs the compressed packet generated by adding the header of the compressed packet to the payload of the input IP packet to the encapsulation module. The RDT generator 3411 of the signaling generator 3400 generates RDT that includes header compression information and the context information (that is, dynamic chain information), and then outputs the generated RDT through the RDT output unit 3412.

In one embodiment, when the adaptation mode is 3 and the state determined by the state machine 3216 is the SO state, the packet type determination unit 3311 determines the packet type of the RoHC packet as the compressed packet, and outputs packet type information indicating that the determined packet type is the compressed packet to the second packet header generator 3313. The second packet header generator 3313 generates a header of the compressed packet based on the packet type information indicating the compressed packet and outputs the generated header to the RoHC packetizer 3314. The header of the compressed packet is generated by one format of FIG. 19(c), FIG. 20(c) and FIG. 21(c) in accordance with a type of CID. The RoHC packetizer 3314 outputs the compressed packet generated by adding the header of the compressed packet to the payload of the input IP packet to the encapsulation module.

The RDT output from the RDT output unit 3412 is transmitted in one transmission type of the catalog RDT and the discrete RDT. The RoHC packets output from the RoHC packetizer 3314 in accordance with the adaptation mode will be referred to as RoHC streams (that is, compressed IP streams). That is, in the adaptation mode 1, the RoHC packetizer 3314 outputs RoHC streams that include the IR packet, the IR-DYN packet and the compressed packets. In the adaptation mode 2, the RoHC packetizer 3314 outputs RoHC streams that include the IR-DYN packet instead of the IR packet, in a position of the ROHC stream where the IR packet will be output. In the adaptation mode 3, the RoHC packetizer 3314 outputs RoHC streams that include the compressed packet instead of the IR packet and the IR-DYN packet, in a position of the RoHC stream where the IR packet and the IR-DYN packet will be output.

As described above, there is no procedure of extracting context information from the IR packet and/or the IR-DYN packet in accordance with the adaptation mode and converting the IR packet, from which the context information is extracted, to the IR-DYN packet or the compressed packet or converting the IR-DYN packet, from which the context information is extracted, to the compressed packet in FIG. 22. Therefore, the procedure of FIG. 22 is simpler than that of FIG. 18. Also, when hardware is implemented, hardware complexity is reduced. Therefore, the implementation cost is reduced.

The encapsulation module generates at least one link layer packet that includes the RDT and at least one link layer packet that includes packets in the RoHC stream.

The IP stream classification method, the CID allocation method, the adaptation mode selection method and the RDT transmission method in FIG. 18 are equally applied to FIG. 22 in one embodiment.

The respective blocks in FIG. 18 and/or FIG. 22 may be steps for executing subsequent procedures stored in the memory or hardware components configured by hardware. The respective blocks may be located inside/outside the apparatus. In addition, the respective blocks in FIG. 18 and/or FIG. 22 may be omitted in accordance with some embodiments or may be replaced with other blocks for performing similar/same operation.

Meanwhile, RoHC compression needs periodic initialization and refreshment of a context. This is related with IR packet generation and RDT repeat rate. RoHC compression specifies periodic refreshment of context initialization. In one embodiment of the present disclosure, since a unidirectional mode is only used, periodic initialization is designated. In one embodiment, if periodic refreshment occurs, a related RDT is transmitted immediately. In order that a system Random Access Point (RAP) transmits the RDT, RoHC initialization and refreshment period is equal to the system RAP period in one embodiment. If there is no period shorter for initialization and refreshment, 5 seconds are used as an initialization period in one embodiment. Therefore, RoHC initialization is aligned with periodic RDT transmission.

The RDT should be transmitted from the system RAP but may be transmitted between system RAPs due to fast acquisition of signaling included in the RDT.

Figure 23:
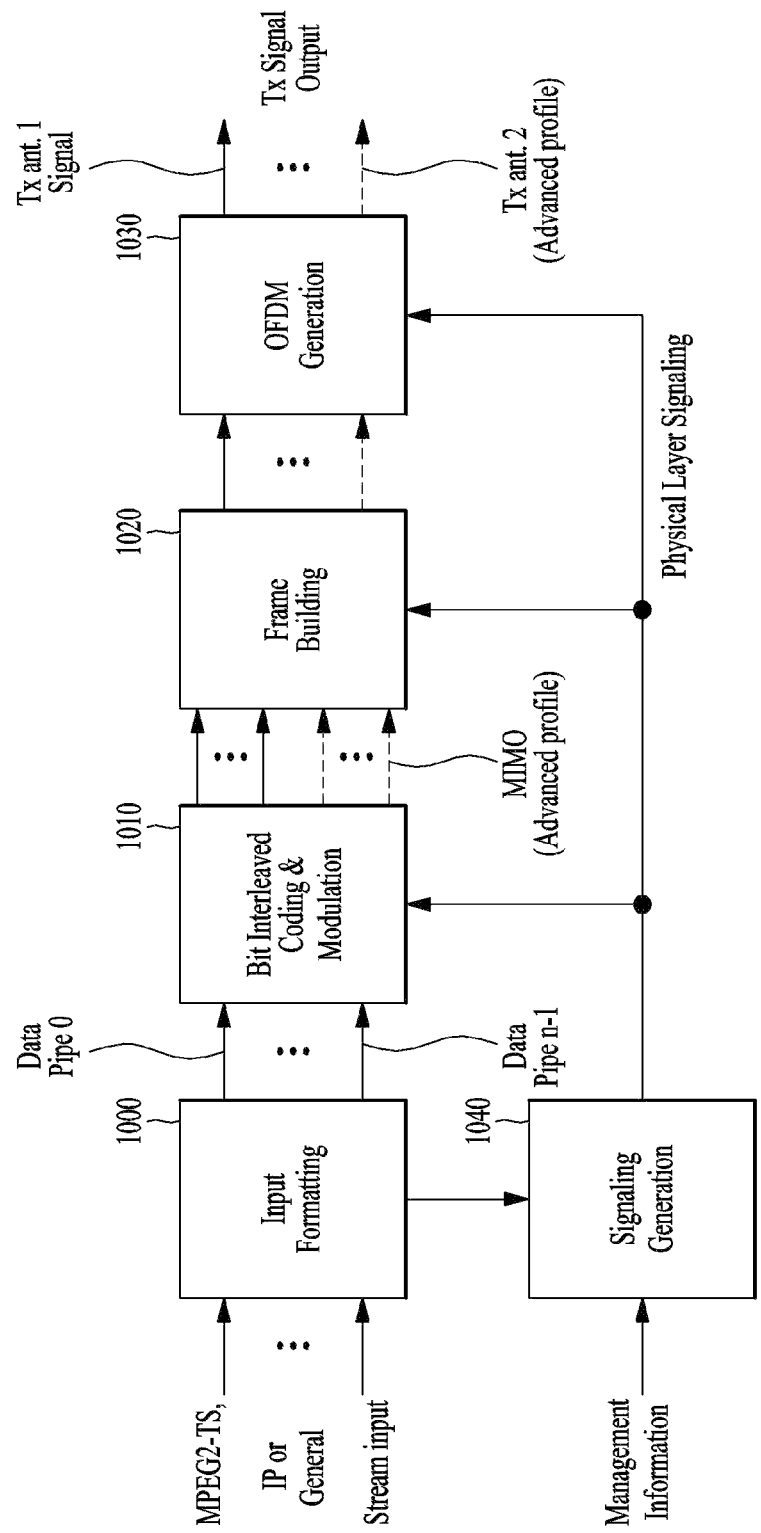
FIG. 23 is a schematic block view illustrating one example of a broadcast transmission apparatus according to the present disclosure.

FIG. 23 is a diagram showing a structure of a broadcast signal transmission device of a next-generation broadcast service in a physical layer according to an embodiment of present disclosure.

The broadcast signal transmission device of the next-generation broadcast service according to an embodiment of present disclosure may include an input formatting block 1000, a bit interleaved coding & modulation (BICM) block 1010, a frame building block 1020, an orthogonal frequency division multiplexing (OFDM) generation block 1030, and a signaling generation block 1040. An operation of each block of the broadcast signal transmission device will be described.

According to an embodiment of present disclosure, input data may be at least one ALP stream of FIG. 17. Each ALP stream may include link layer packets.

The input formatting block 1000 may output each ALP stream through each data pipe (i.e., physical layer pipe) to which independent coding and modulation are applied. The data pipe may be a basic unit for robustness control and may affect quality of service (QoS). One or more services or service components may affect one data pipe. The data pipe may be a logical channel in a physical layer for delivering service data or metadata for delivering one or more services or service components.

In the present disclosure, the data pipe DP is a physical path used as the same meaning as the physical layer pipe (PLP), and its title may be changed depending on intention of a designer.

The input formatting block 1000 generates baseband packets by adding a baseband header to a baseband payload including at least one link layer packet per data pipe and then outputs the baseband packets to the corresponding BICM block 1010 through the corresponding data pipe. Each data pipe includes streams of the baseband packets. The BICM block 1010 operates per data pipe.

The BICM block 1010 may include a forward error correction (FEC) encoder, a bit interleaver, and a constellation mapper.

The FEC encoder may perform FEC encoding on an input baseband packet (BBP) using external coding (BCH) and internal coding (LDPC). The output of the FEC encoder is an FEC frame. The external coding (BCH) may be a selective coding method. The bit interleaver may bit interleave output of the data FEC encoder to achieve optimized performance using a combination of the LDPC code and a modulation method. The constellation mapper may modulate cell word from a bit interleaver or a cell word demultiplexer using QPSK, QAM-16, irregular QAM (NUQ-64, NUQ-256, NUQ-1024), or irregular constellation (NUC-16, NUC-64, NUC-256, NUC-1024) and output a power-normalized constellation point (i.e., QAM symbol) to the frame building block 1020.

The frame building block 1020 may include a time interleaver, a frame builder, and a frequency interleaver. The time interleaver may time-interleave an FEC block input and output the interleaved FEC block to the frame builder. The frame builder may map data cells of a data pipe output by being time interleaved, into OFDM symbols in the frame and perform frequency interleaving for frequency domain diversity by the frequency interleaver.

In one embodiment, the outputs of the frame building block 1020 are OFDM symbols, such as preamble or data, which are sequentially arranged in a final frame, and frequency interleaving in the frequency interleaver is performed for the OFDM symbols. That is, the frequency interleaver may provide frequency diversity by randomly interleaving the input data cells. Also, the frequency interleaver may operate for data corresponding to an OFDM symbol pair comprised of two sequential OFDM symbols or data corresponding to one OFDM symbol by using a different interleaving seed order to obtain maximum interleaving gain in a single frame.

The frame output by being subjected to frequency interleaving is divided into a preamble region and a data region. In the OFDM generation block 1030, a bootstrap region including bootstrap data is inserted in front of the preamble of the frame. In one embodiment, L1 signaling data transmitted through the preamble are generated in the signaling generation block 1040.

The L1 signaling data include L1-Basic signaling data and L1-Detail signaling data. The L1-Basic signaling data may be referred to as PLS1 data, and the L1-Detail signaling data may be referred to as PLS2 data.

The OFDM generation block 1030 modulates OFDM carriers by a cell generated by the frame building block 1020, inserts pilots, and generates a time domain signal for transmission. Also, the corresponding block sequentially inserts guard intervals, applies PAPR reduction processing and then generates a final RF signal by inserting a bootstrap including bootstrap data into the front of the corresponding frame.

The signaling generation block 1040 may generate physical layer signaling information used for an operation of each functional block. Physical layer signaling information according to one embodiment of the present disclosure may include L1-Basic signaling data and L1-Detail signaling data. In one embodiment, the L1-Basic signaling data (or PLS1 data) delivers basic information on the system as well as parameters required for decoding of the L1-Detail signaling data (or PLS2 data). In one embodiment, a length of the L1-Basic signaling data is fixed to 200 bits. The L1-Detail signaling data (or PLS2 data) define data context and information required for decoding of data context in detail.

The BICM block 1010 may further include a BICM block for protection of the L1 signaling data (or PLS data). The BICM block for protection of the L1 signaling data (or PLS data) may include an FEC encoder, a bit interleaver and a constellation mapper.

The FEC encoder may include a scrambler for respectively scrambling L1-Basic signaling data (or PLS1 data) and L1-Detail signaling data (or PLS2 data), a BCH encoding/zero insertion block for performing outer encoding (e.g., BCH) for the scrambled L1-Basic and detail signaling data (or PLS 1 and 2 data) and inserting zero bit after BCH encoding, an LDPC encoding block for performing encoding by using LDPC code, and an LDPC parity puncturing block. The output bits of the zero-inserted L1-Basic signaling data and/or L1-Detail signaling data may be subjected to permutation after LDPC encoding. The bit interleaver may perform bit interleaving for the L1-Basic signaling data and L1-Detail signaling data, which are subjected to shortening and puncturing, and the constellation mapper may map the bit interleaved L1-Basic signaling data and L1-Detail signaling data into constellation. In one embodiment, time interleaving is not performed for the L1 signaling data but frequency interleaving is performed for the L1 signaling data.

Figure 24:
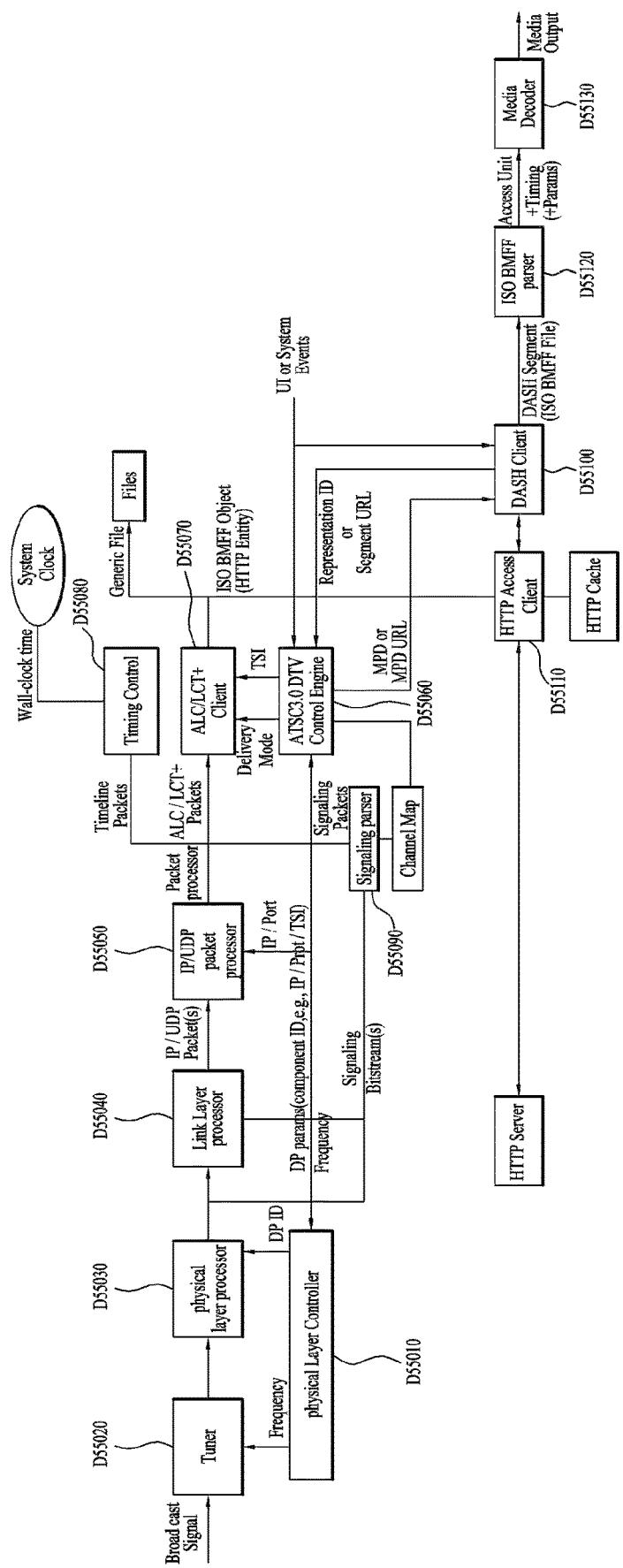
FIG. 24 is a schematic block view illustrating one example of a hybrid broadcast reception apparatus according to the present disclosure.

FIG. 24 is a block diagram illustrating one embodiment of a hybrid broadcast signal reception device according to the present disclosure.

The hybrid broadcast receiver may receive a hybrid broadcast service through interaction between terrestrial broadcasting and a broadband from a DTV service of a next generation broadcast system. The hybrid broadcast receiver may receive broadcast Audio/Video (A/V) contents transmitted through terrestrial broadcasting, and may receive enhancement data associated with the A/V contents or some of the A/V contents. In this specification, the broadcast A/V contents may be referred to as media contents.

The hybrid broadcast receiver may include a Physical Layer Controller D55010, a tuner D55020, a Physical Layer Processor D55030, a Link Layer Processor D55040, an IP/UDP packet processor D55050, an ATSC 3.0 DTV Control Engine D55060, an ALC/LCT+Client D55070, a Timing Control D55080, a Signaling Parser D55090, a Dynamic Adaptive Streaming over HTTP (DASH) Client D55100, an HTTP Access Client D55110, an ISO Base Media File Format (BMFF) Parser, (ISO BMFF Parser) D55120, and/or a Media Decoder D55130.

The physical layer controller D55010 may control the operation of the tuner D55020, the physical layer processor D55030, etc. by using Radio Frequency (RF) information of a terrestrial broadcast channel desired to be received by the hybrid broadcast receiver.

The tuner D55020 receives and processes a broadcast signal, which is transmitted through a broadcast network, through m number of antennas, and outputs the broadcast signal to the physical layer processor D55030.

In one embodiment, the physical layer processor D55030 performs demodulation, frame parsing, deinterleaving, and error correction decoding for the broadcast signal output from the tuner D55020.

Figure 25:
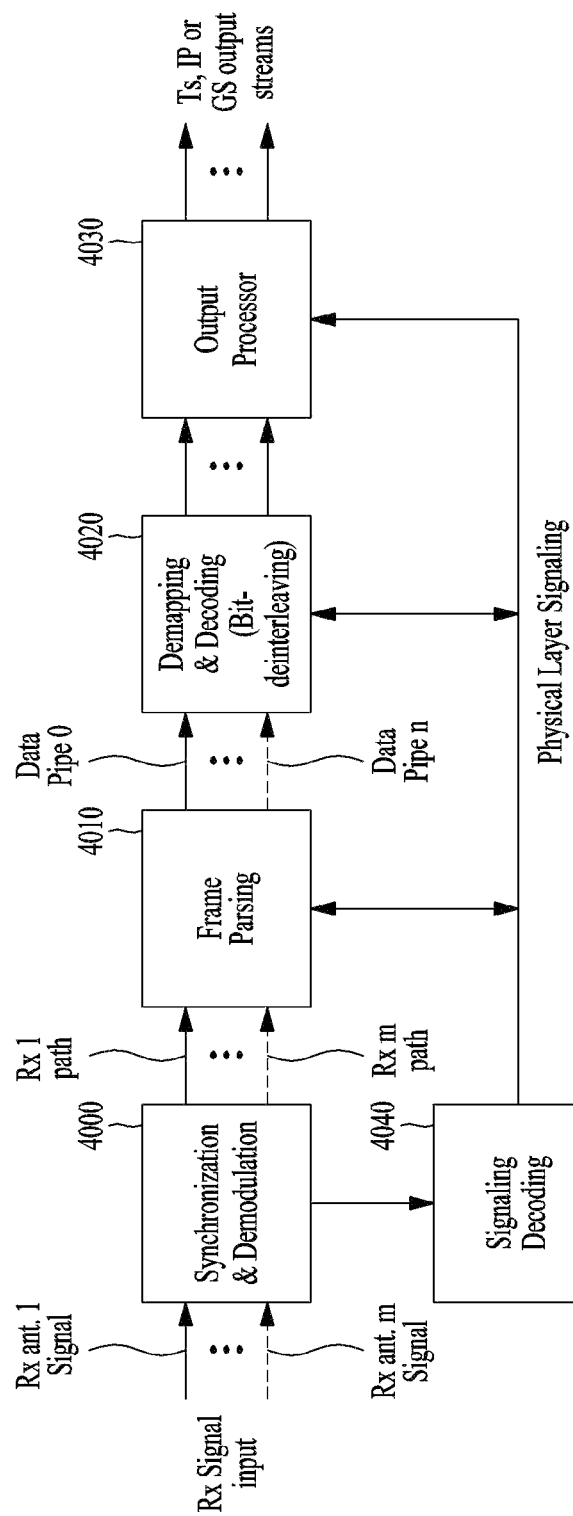
FIG. 25 is a schematic block view illustrating one example of a broadcast reception apparatus of a physical layer according to the present disclosure.

FIG. 25 is a block diagram illustrating one embodiment of the physical layer processor D55030. That is, FIG. 25 illustrates a structure of a broadcast signal reception device for a next generation broadcast service in a physical layer according to one embodiment of the present disclosure.

The broadcast signal reception device for a next generation broadcast service according to one embodiment of the present disclosure may correspond to the broadcast signal transmission device for a next generation broadcast service of FIG. 23.

The broadcast signal reception device for a next generation broadcast service according to one embodiment of the present disclosure may include a synchronization & demodulation module 4000, a frame parsing module 4010, a demapping & decoding module 4020, an output processor 4030, and a signaling decoding module 4040.

In one embodiment, the synchronization & demodulation module 4000 performs synchronization for the broadcast signal received and processed by the tuner D55020 and performs OFDM demodulation in a reverse procedure of the broadcast signal transmission device. That is, the synchronization and demodulation module 4000 may perform bootstrap information detection, Fast Fourier Transform (FFT), and pilot detection.

The frame parsing module 4010 may include a frequency deinterleaver, a frame parser, and a time deinterleaver. In the broadcast signal transmission device of the present disclosure, frequency interleaving is essential for preamble symbols of the demodulated broadcast signal, and is optional for data symbols included in subframe(s) of the demodulated broadcast signal. Therefore, the frequency deinterleaver performs frequency deinterleaving for the preamble symbols, and selectively performs frequency deinterleaving for the data symbols in accordance with L1D_frequency_interleaver field of the L1-Detail signaling data. The frequency deinterleaved preamble symbols are output to the signaling decoding module 4040, and the signal frame including the data symbols of the subframe(s) for which frequency deinterleaving is selectively performed is output to the frame parser and then parsed in the frame parser.

The data pipes (that is, PLPs) included in the subframe(s) parsed by the frame parser are output to the time deinterleaver per data pipe and time deinterleaved in a reverse procedure of the broadcast signal transmission device. The frame parsing and time deinterleaving are performed based on the L1 signaling data.

The signaling decoding module 4040 decodes the L1 signaling data included in the preamble and provides information include in the L1 signaling data to necessary blocks. To this end, the signaling decoding module 4040 includes a constellation demapper, a bit deinterleaver, and an FEC decoder, and performs decoding for the L1 signaling data in a reverse procedure of the broadcast signal transmission device.

The demapping and decoding module 4020 includes a demapper, a bit deinterleaver and a decoder and performs symbol demapping for data of the corresponding data pipe in a reverse procedure of the broadcast signal transmission device based on the L1 signaling data, perform bit deinterleaving and then performs error correction decoding. The output of the demapping and decoding module 4020 is at least one baseband packet.

The output processor 4030 may perform reverse procedures of various compression/signal processing procedures applied by the broadcast signal transmission device for input baseband packets to improve transmission efficiency. In this case, the output processor 4030 may acquire necessary control information from the data output from the signaling decoding module 4040.

Decapsulation, adaptation, and decompression processing for the link layer packets included in the payload of the baseband packet may be performed by the physical layer, or may be performed by the link layer. If decapsulation, adaptation, and decompression processing for the ALP packets are performed by the physical layer, a decapsulation module, an adaptation module, and a decompression module may be included in the output processor 4030. In this case, in one embodiment, the output processor 4030 detects the ALP packets by processing the baseband packets in the reverse procedure of the broadcast signal transmission device and performs decapsulation, adaptation, and decompression processing for the detected ALP packets. If decapsulation, adaptation, and decompression processing for the link layer packets are performed by the link layer, the outputs of the output processor 4030 may be link layer streams that include the link layer packets.

In one embodiment of the present disclosure, decapsulation, adaptation, and decompression processing are performed by the link layer.

In this case, the physical layer processor D55030 of FIG. 24 outputs at least one ALP stream including link layer packets to the link layer processor D55040.

The link layer processor D55040 performs link layer processing such as decapsulation for at least one ALP stream. When IP packets are header compressed, link layer processing such as decapsulation, adaptation, and decompression is performed and recovered into original IP packets and a detailed operation will be described later.

If input packets included in link layer packets of a specific ALP stream are IP packets, the outputs of the link layer processor D55040 become one or more IP packets. In the present disclosure, IP packets are used to refer to the same meaning as IP datagrams.

The IP/UDP packet processor D55050 may filter a specific one of one or more received IP packets. That is, the IP/UDP packet processor D55050 filters IP packet selected by the DTV control engine D55060 from one or more IP packets output from the link layer processor D55040, and outputs the IP packet in the form of application layer transport protocol packet such as ALC/LCT+.

The DTV control engine D55060 may be in charge of interface between modules included in each hybrid broadcast receiver. Also, the DTV control engine D55060 may deliver parameters required for each module to each module and control an operation of each module through the parameters. In the present disclosure, the DTV control engine D55060 may deliver Media Presentation Description (MPD) and/or MPD URL to the DASH client D55100. Also, in the present disclosure, the DTV control engine D55060 may deliver a delivery mode and/or a Transport Session Identifier (TSI) to the ALC/LCT+ client D55070. In this case, the TSI may indicate an identifier of a session for transmitting a transport packet including signaling message such as MPD or MPD URL related signaling, for example, ALC/LCT+ session or FLUTE session which is the application layer transport protocol. Also, the transport session identifier may correspond to Asset id of MMT.

The ALC/LCT+ client D55070 may generate one or more ISO Base Media File Format (ISOBMFF) objects by processing the application layer transport protocol such as ALC/LCT+ and collecting and processing a plurality of packets. ALC/LCT packet, ALC/LCT+ packet, ROUTE packet, and/or MMTP packet may be included in the application layer transport protocol packet.

The timing controller D55080 may process packets including system time information and therefore control a system clock.

The signaling parser D55090 may acquire and parse DTV broadcast service related signaling (e.g., LLS, SLS) and generate and manage a channel map based on the parsed signaling. In the present disclosure, the signaling parser may parse MPD or MPD related information extended from the signaling information.

The DASH client D55100 may perform computation related to Real-time Streaming or Adaptive Streaming. The DASH client D55100 may receive DASH contents from the HTTP server through the HTTP access client D55110. The DASH client D55100 may output ISO Base Media File Format objects by processing the received DASH segments. In the present disclosure, the DASH client D55100 may deliver fully qualified representation ID or segment URL to the DTV control engine D55060. In this case, the fully qualified representation ID, for example, may mean ID obtained by combination of MPD URL, period@id and representation@id. Also, the DASH client D55100 may receive MPD or MPD URL from the DTV control engine D55060. The DASH client D55010 may receive a desired media stream or DASH segment from the HTTP server by using the received MPD or MPD URL. In this specification, the DASH client D55100 may be referred to as a processor.

The HTTP access client D55110 may request specific information for the HTTP service, and may process a response to the request by receiving the response from the HTTP server. In this case, the HTTP server may process the request received from the HTTP access client and provide a response to the request.

The ISO BMFF parser D55120 may extract data of audio/video from the ISO Base Media File Format objects.

The media decoder D55130 may decode the received audio and/or video data and perform processing for presentation of the decoded audio/video data.

Meanwhile, if it is assumed that LLS, LMT and RDT are transmitted to the same PLP, the physical layer controller D55010 may quickly identify the PLP, which includes LLS, LMT and RDT, by using the L1B_lls_flag field of the L1 basic signaling data and the L1D_plp_lls_flag field of the L1 detail signaling data. Therefore, the link layer processor D55040 may acquire link layer signaling information in at least one link layer packet received through the PLP earlier than the RoHC stream.

In another embodiment of the present disclosure, if a catalog RDT, which includes two or more RDTs, is transmitted by a concatenation method, the catalog RDT may be acquired based on the packet type in the base header of the corresponding link layer packet, additional header for concatenation, and additional header for signaling information.

The link layer processor D55040 includes a decapsulation module, an adaptation module, and an RoHC module as shown in FIG. 7.

In the present disclosure, the adaptation module and the RoHC module will be referred to as IP header decompression. The RoHC module of the receiver will be referred to as a header decompressor.

In one embodiment of the present disclosure, the case that a PLP for transmitting RDT is different from a PLP for transmitting RoHC streams related to the RDT will be described. For convenience of description, the PLP for transmitting RDT will be referred to as a signaling PLP, and the PLP for transmitting RoHC streams will be referred to as a data PLP. Alternatively, the PLP for transmitting RDT may be referred to as a first PLP, and the PLP for transmitting RoHC streams may be referred to as a second PLP. On the contrary, the PLP for transmitting RoHC streams may be referred to as a first PLP, and the PLP for transmitting RDT may be referred to as a second PLP.

The decapsulation module acquires link layer signaling information by decapsulating at least one link layer packet received through the PLP. The decapsulation module may acquire the RoHC streams by decapsulating link layer packets of at least one ALP packet received through data PLPs by using LMT and RDT included in the link layer signaling information.

In the present disclosure, for convenience of description, one RoHC stream will be described. The RoHC packets included in one RoHC stream are configured differently depending on the adaptation mode. For example, in case of the adaptation mode 1, the RoHC stream includes IR packet, IR-DYN packet and compressed packets. In case of the adaptation mode 2, the RoHC stream includes IR-DYN packets and compressed packets. In case of the adaptation mode 3, the RoHC stream includes compressed packets.

In case of the adaptation mode 1, there is no procedure of extracting context information from the RDT and restoring a packet by using context information. That is, the RoHC stream acquired from at least one link layer packet received through the data PLP is output to the RoHC module (that is, header decompressor) of the IP header decompressor by bypassing the adaptation module of the IP header decompressor. The RoHC module performs header decompression for the RoHC packets in the RoHC stream by using header compression information included in the RDT and then restores IP packets prior to header compression.

In case of the adaptation mode 2, the adaptation module of the IP header decompressor extracts context information (that is, static chain information) included in the RDT and restores the IR packet by using the extracted context information and the corresponding IR-DYN packet in the RoHC stream. The RoHC stream that includes the restored IR packet is output to the RoHC module of the IP header decompressor. The RoHC module restores the IP packets prior to header compression by performing header decompression for the RoHC packets in the RoHC stream by using the header compression information acquired from the RDT.

In case of the adaptation mode 3, the adaptation module of the IP header decompressor extracts context information included in the RDT. The context information includes static chain information and dynamic chain information extracted from the IR packet and dynamic chain information extracted from the IR-DYN packet. The adaptation module restores the IR packet and the IR-DYN packet by using the extracted context information and the corresponding compressed packets in the RoHC stream. That is, the adaptation module restores the IR packet by using the static chain information and the dynamic chain information and the corresponding compressed packet, and restores the IR-DYN packet by using the dynamic chain information and the corresponding compressed packet. The RoHC stream that includes the restored IR packet and IR-DYN packet is output to the RoHC module of the IP header decompressor. The RoHC module restores the IP packets prior to header compression by performing header decompression for the RoHC packets in the RoHC stream by using the header compression information acquired from the RDT.

The IP packets restored from the RoHC module are transmitted to the IP/UDP layer.

Next, when the RDT that includes context information and the RoHC stream related with the RDT are received through different PLPs, the procedure of synchronizing the context information included in the RDT with the ROHC packet included in the RoHC stream to start decompression for the RoHC packets included in the RoHC stream will be described.

FIG. 26 illustrates that IP streams including uncompressed IP/UDP header in a hexadecimal type. In FIG. 26, SN field of 16 bits is located next to a checksum field of the UDP header, and displays a sequence number. The SN field is a dynamic part of the UDP header. The sequence number is increased as much as 1 for each packet to indicate the order of packets in the stream.

FIG. 26 illustrates an example that a sequence number starts by being allocated from '760' (0x02F8). This is one embodiment, and another number may be a start number.

Meanwhile, if header compression is performed for the IP packets by the IP header compressor of the transmitting side, RoHC packets corresponding to the input IP packets are generated, and each of the RoHC packets includes a sequence number. For example, the header of the IR packet of the RoHC packets and the header of the IR-DYN packet include the same sequence number as the SN field value of the corresponding IP packet header. That is, each header includes a sequence number having a full-length of 16 bits. Lower 4 bits (LSB-4) of the SN field value of the corresponding IP packet header are allocated to a header of the compressed packet of the RoHC packets, for example, a header of UO-0 packet as a sequence number. That is, the compressed packet includes an encoded (that is, compressed) sequence number of 4 bits.

If the IR packet and the IR-DYN packet are converted to the compressed packets in accordance with the adaptation mode in the IP header compressor of the transmitting side, a length of a sequence number included in the context information extracted from the IR packet and the IR-DYN packet is 16 bits, and a length of a sequence number included in the header of the converted compressed packet is 4 bits. That is, the sequence number included in the context information transmitted to the RDT is 16 bits, and the sequence number included in the compressed packet corresponding to the context information is 4 bits.

In other words, since the RDT generated by the IP header compressor of the transmitting side includes the context information of the IR packet or the IR-DYN packet, if the dynamic chain information is included in the RDT, a full-length sequence number is included in the RDT.

At this time, the RDT and the RoHC stream related with the RDT may be transmitted through the same PLP or different PLPs. That is, the PLP for transmitting RDT may be the same as or different from the PLP for transmitting the RoHC stream related with the RDT. For example, in the catalog RDT, a PLP for transmitting context information is different from a PLP for transmitting RoHC stream that includes RoHC packet related with the context information. In the discrete RDT, the PLP for transmitting context information is the same as the PLP for transmitting RoHC stream that includes RoHC packet related with the context information.

If the RDT that includes context information and the RoHC stream that includes RoHC packet related with the context information are transmitted through different PLPs, synchronization between the context information included in the RDT and the corresponding RoHC packet included in the RoHC stream is required.

In one embodiment of the present disclosure, synchronization is performed in the RoHC module or the adaptation module of the IP header decompressor of the receiver.

In one embodiment of the present disclosure, synchronization is not performed in the adaptation mode 1. This is because that the context information is not transmitted through the RDT in the adaptation mode 1.

FIG. 27 illustrates one example of RoHC stream received when an adaptation mode is 2, wherein IR-DYN packet is received from a first packet and a 30th packet and compressed packets (e.g., UO-0 packets) are received from the other packets. That is, FIG. 27 illustrates values of respective fields in a header of the IR-DYN packet in the first packet and the 30th packet and values of respective fields in a header of the compressed packets in the other packets. In FIG. 27, small CID is allocated as CID, and has a value of 0. That is, there is no octet (that is, byte) related with CID.

In FIG. 27, a sequence number '0x02F8' is allocated to the IR-DYN packet which is a first packet of RoHC stream and '9' corresponding to lower 4 bits of '0x02F9' is allocated to the compressed packet which is a second packet, as a sequence number.

FIG. 28 illustrates one example of static chain information for RDT. That is, FIG. 28 illustrates an example of static chain information corresponding to each IR-DYN packet of RoHC stream the same as that of FIG. 27. In other words, static chain information is extracted from each of the first IR packet and the 30th IR packet as shown in FIG. 28, and each IR packet from which the static chain information is extracted is converted to IR-DYN packet of a format (that is, CID=0) the same as that of FIG. 20(*b*). The converted IR-DYN packets are transmitted by being included in the RoHC stream as shown in FIG. 27, and the extracted static chain information is transmitted by being included in the RDT. That is, the RDT is generated in packet 1 and packet 30 and then transmitted.

When the PLP for transmitting RoHC stream of FIG. 27 is different from the PLP for transmitting RDT that includes static chain information of FIG. 28, the IP header decompressor of the receiver should perform a synchronization procedure to start the decompression procedure.

Figure 29:
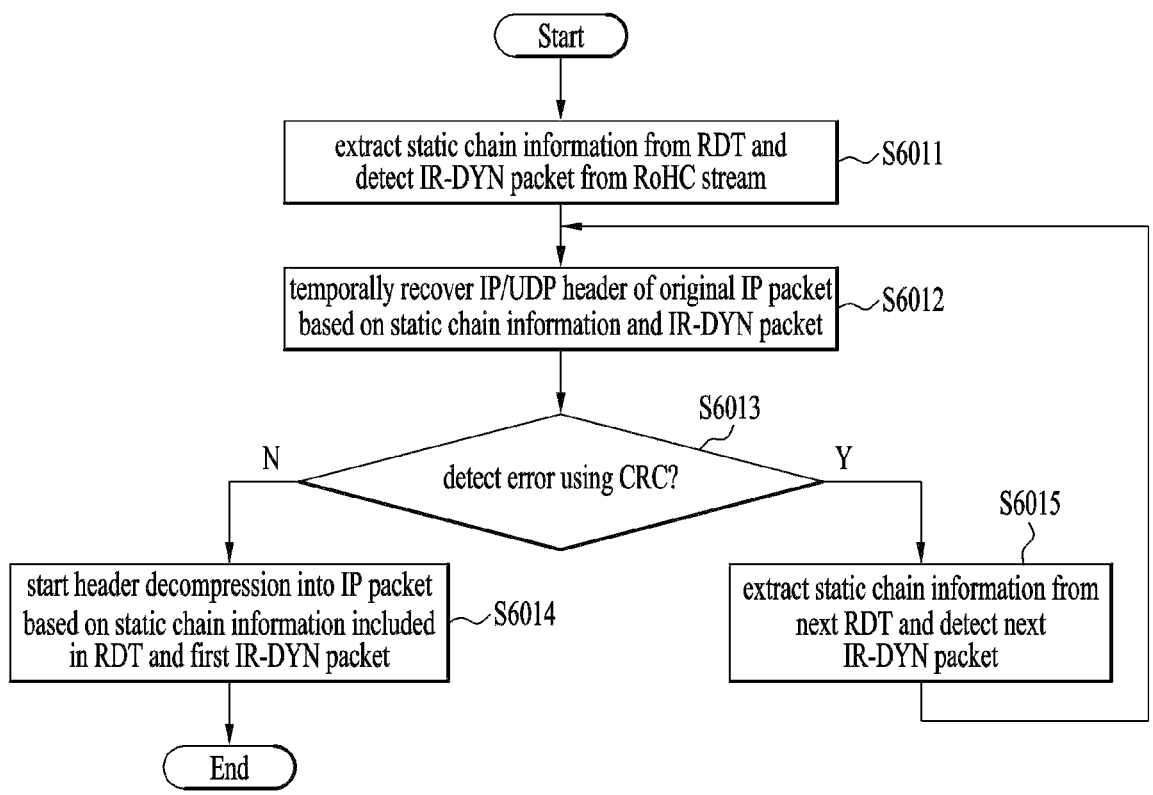
FIG. 29 is a flow chart illustrating one example of a synchronization procedure of an adaptation mode 2 performed in an IP header decompressor according to the present disclosure.

FIG. 29 is a flow chart illustrating one example of a synchronization procedure of an adaptation mode 2 performed in an IP header decompressor according to the present disclosure. In the present disclosure, it is assumed that the RDT is received through a first PLP (e.g., signaling PLP) and RoHC stream is received through a second PLP (e.g., data PLP) different from the first PLP.

That is, after link layer packets that include link layer signaling and link layer packets that include RoHC stream are received through different PLPs and physical-layer processed by the physical layer processor D55030, the link layer packets are input to the link layer processor D55040.

The decapsulation module of the link layer processor D55040 outputs RDT and RoHC stream included in the link layer packets to the IP header decompressor by performing a decapsulation procedure based on header information of each of the link layer packets. At this time, IR-DYN packets and compressed packets included in the RoHC stream are sequentially input to the IP header decompressor in the same packet order as that of FIG. 27.

The IP header decompressor extracts static chain information from the RDT, and detects IR-DYN packet from the RoHC stream. In one embodiment, the IP header decompressor detects 'packet 1' as the IR-DYN packet (S6011). At this time, in one embodiment, the IR-DYN packet is a format (that is, CID=0) the same as that of FIG. 20(*b*), and the IR-DYN packet is detected from the RoHC stream based on identification information of the IR-DYN packet.

Subsequently, the IP/UDP header of the IP packet is temporally recovered using the extracted static chain information and the detected IR-DYN packet (S6012).

In the step S6012, IR packet may be restored using the static chain information and the IR-DYN packet, and the IP/UDP header of the IP packet may be recovered based on the restored IR packet. Alternatively, the procedure of restoring the IR packet may be omitted and the IP/UDP header of the IP packet may immediately be recovered using the static chain information and the IR-DYN packet.

Validation is performed based on CRC included in the header of the detected IR-DYN packet (S6013).

If validation based on CRC passes, that is, if an error is not detected, it is considered that synchronization has been successfully performed. Therefore, the IP/UDP header of the original IP packet starts to be recovered using the extracted static chain information and the IR-DYN packet detected from 'packet 1' of the RoHC stream in the step S6011 (S6014). That is, decompression starting from 'packet 1' in the RoHC stream is performed.

If validation based on CRC is failed, that is, if 'packet 1' is missed due to a reception error, it is on standby until next RDT is received. If next RDT is received, static chain information is extracted from next RDT which is received and next IR-DYN packet, that is, 'packet 30' is detected as IR-DYN packet. Then, the current step returns to the step S6012 and then the aforementioned steps are repeated (S6015). In this case, the RoHC packets in the RoHC stream received prior to 'packet 30' are discarded without being decompressed.

In the adaptation mode 2, a sequence number is not used for synchronization. That is, in the adaptation mode 2 of the transmitting side, static chain information (that is, context information) is extracted from the header of the IR packet and then transmitted through the RDT, and the IR packet from which the static chain information is extracted is converted to the IR-DYN packet and then transmitted by being included in the RoHC stream. At this time, since a sequence number is included in the dynamic chain information, there is no sequence number in the context information transmitted to the RDT. Therefore, a synchronization procedure based on the sequence number is not performed even in case of the adaption mode 2.

Meanwhile, in the adaptation mode 3, since static chain information and dynamic chain information of the IR packet and dynamic chain information of the IR-DYN packet are transmitted through the RDT, a sequence number is used for synchronization between the RDT and the compressed packets in one embodiment.

FIG. 30 illustrates one example of RoHC stream received when an adaptation mode is 3. Compressed packets (e.g., UO-0 packets) are only included in the RoHC stream. In FIG. 30, small CID is allocated as CID, and has a value of 0. That is, there is no octet (that is, byte) related with CID. Also, in FIG. 30, '8' corresponding to lower 4 bits of '0x02F8' is allocated to the first compressed packet of the RoHC stream as a sequence number, and '9' corresponding to lower 4 bits of '0x02F9' is allocated to the second compressed packet as a sequence number.

FIG. 31 illustrates one example of static chain information and dynamic chain information for RDT. That is, FIG. 31 illustrates an example of static chain information and dynamic chain information corresponding to the first compressed packet of the RoHC stream the same as that of FIG. 30. In other words, context information (that is, static chain information and dynamic chain information) is extracted from the header (or header of the original IP packet) of the first IR packet, and the IR packet from which the context information is extracted is converted to the compressed packet of a format (that is, CID=0) the same as that of FIG. 20(*c*). The converted compressed packet is transmitted by being included in the RoHC stream as shown in FIG. 30, and the extracted static chain information and dynamic chain information are transmitted by being included in the RDT. A sequence number is included in the dynamic chain information transmitted to the RDT, and '0x02F8' is allocated as the sequence number as shown in FIG. 31.

When the PLP for transmitting RoHC stream of FIG. 30 is different from the PLP for transmitting RDT that includes static chain information and dynamic chain information of FIG. 31, the IP header decompressor of the receiver should perform a synchronization procedure to start the decompression procedure.

Figure 35:
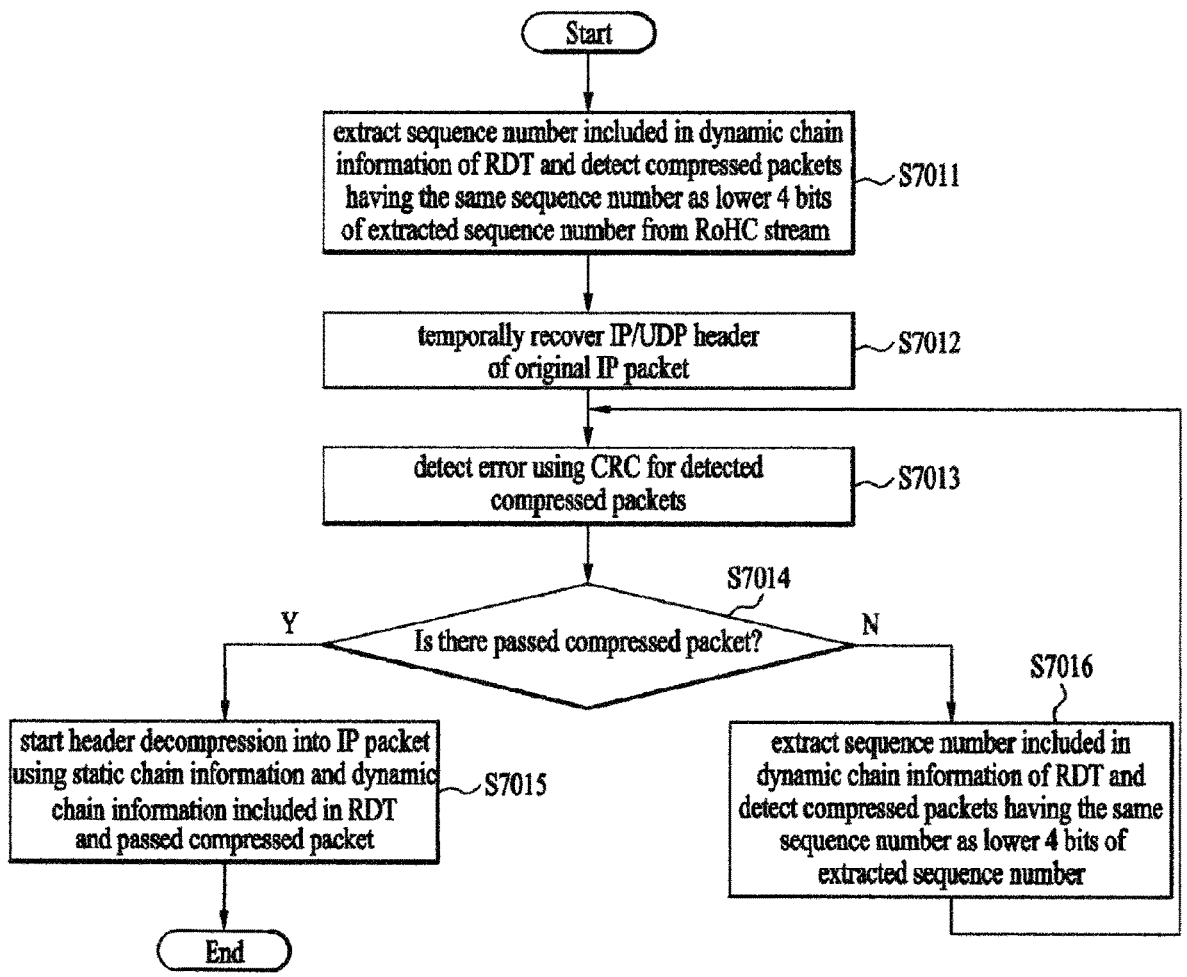
FIG. 35 is a flow chart illustrating one example of a synchronization procedure of an adaptation mode 3 performed in an IP header decompressor according to the present disclosure.

FIG. 35 is a flow chart illustrating one example of a synchronization procedure of an adaptation mode 3 performed in an IP header decompressor according to the present disclosure. In the present disclosure, it is assumed that the RDT is received through a first PLP (e.g., signaling PLP) and RoHC stream is received through a second PLP (e.g., data PLP) different from the first PLP.

That is, after link layer packets that include link layer signaling and link layer packets that include RoHC stream are received through different PLPs and physical-layer processed by the physical layer processor D55030, the link layer packets are input to the link layer processor D55040.

The decapsulation module of the link layer processor D55040 outputs the RDT and RoHC stream included in the link layer packets to the IP header decompressor by performing a decapsulation procedure based on header information of each of the link layer packets. At this time, compressed packets included in the RoHC stream are sequentially input to the IP header decompressor in the same packet order as that of FIG. 30.

The IP header decompressor extracts static chain information and dynamic chain information from the RDT, and extracts a sequence number from the dynamic chain information. The compressed packets having the same sequence number as lower 4 bits of the extracted sequence number are detected from the RoHC stream (S7011). As shown in FIGS. 30 and 31, since the sequence number included in the dynamic chain information of the RDT generated based on IR packet of 'packet 1' is '0x02F8', the IP header decompressor in the step S7011 detects compressed packets, of which sequence number is '8', from the RoHC stream. In the example of FIG. 30, the compressed packet of which sequence number is '8' is detected from the 1st, 17th, 33th and 49th packets.

Subsequently, the header of the IR packet is restored using the extracted static chain information and dynamic chain information and the detected random compressed packet, and the IP/UDP header of the IP packet prior to compression is temporally recovered based on header information of the restored IR packet (S7012).

If the transmitter performs header compression of IP packets by applying the IP header compressor as shown in FIG. 22, the procedure of restoring the IR packet may be omitted, and the IP/UDP packet of the IP packet may temporally be recovered based on the static chain information and dynamic chain information extracted from the RDT and the random compressed packet detected from the RoHC stream.

Validation based on CRC is performed for four compressed packets based on a sequence number of a full length extracted from the dynamic chain information of the RDT (S7013), and it is checked whether there is a compressed packet that has passed validation based on CRC (S7014). That is, it is checked whether there is a compressed packet from which an error is not detected.

If there are no compressed packets which are missed due to a reception error, as shown in FIG. 32, as a result of validation based on CRC, the first compressed packet only passes and the other 17th, 33th and 49th compressed packets are failed. Decompression of the IP/UDP header of the IP packet starts using the static chain information and dynamic chain information extracted from the step S7011 and the passed compressed packet of 'packet 1' (S7015). At this time, after the IR packet is restored using the static chain information and dynamic chain information and the passed compressed packet, the IP/UDP header of the original IP packet may be recovered based on the header of the restored IR packet, and the procedure of restoring the IR packet may be omitted and then the header of the IP/UDP packet of the IP packet may be recovered using the static chain information and dynamic chain information and the passed compressed packet.

If a miss occurs in the compressed packet of 'packet 1' in the RoHC stream due to a reception error, that is, if the first compressed packet is not received, all of the 1st, 17th, 33th and 49th compressed packets are failed as a result of validation based on CRC. Then, it is on standby until next RDT is received. If next RDT is received, static chain information and dynamic chain information are extracted from next RDT which is received and a sequence number is extracted from the extracted dynamic chain information. After the compressed packets having the same sequence number as lower 4 bits of the extracted sequence number are detected from the RoHC stream, the current step returns to the step S7013 and then the aforementioned steps are repeated (S7016). In this case, the received RoHC packets are discarded without being decompressed until next RDT is received in the step S7016.

Figure 36:
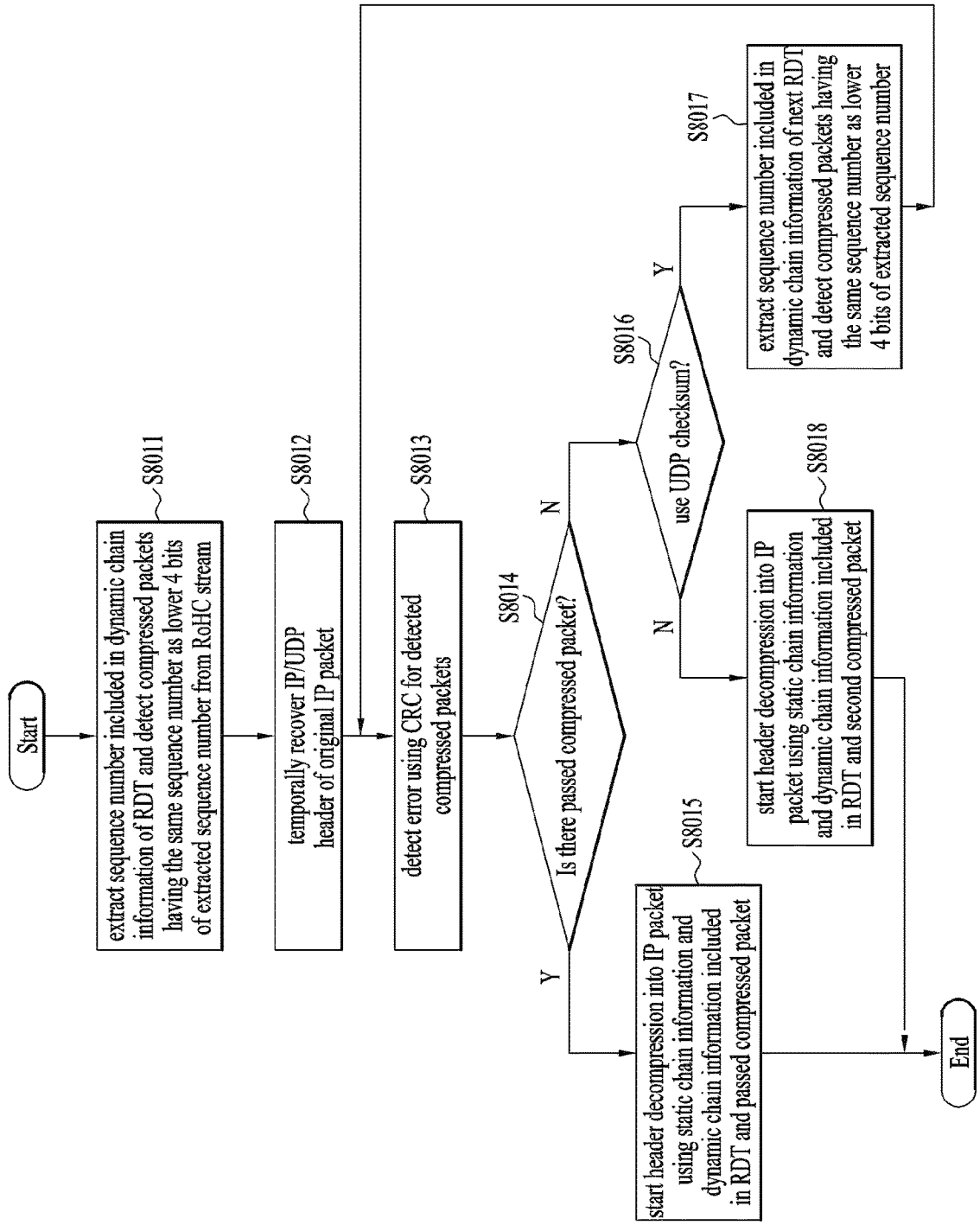
FIG. 36 is a flow chart illustrating one example of a synchronization procedure of an adaptation mode 3 performed in an IP header decompressor according to the present disclosure.

FIG. 36 is a flow chart illustrating one example of a synchronization procedure of an adaptation mode 3 performed in an IP header decompressor according to the present disclosure.

When a PLP for transmitting RDT that includes static chain information and dynamic chain information is different from a PLP for transmitting RoHC stream that includes a compressed packet related with the RDT, it is intended to synchronize the RDT with the compressed packet in FIG. 36.

If there is no error in the received RoHC stream, steps S8011, S8012, S8013, S8014 and S8015 which are synchronization and decompression operations are the same as the steps S7011, S7012, S7013, S7014 and S7015 of FIG. 35. That is, static chain information and dynamic chain information are extracted from the RDT, and a sequence number of a full length is extracted from the dynamic chain information. The compressed packets having the same sequence number the same as lower 4 bits of the extracted sequence number are detected from the RoHC stream (S8011).

Subsequently, the header of the IR packet is restored using the extracted static chain information and dynamic chain information and the detected random compressed packet, and the IP/UDP header of the IP packet prior to compression is temporally recovered based on header information of the restored IR packet (S8012).

If the transmitter performs header compression of IP packets by applying the IP header compressor as shown in FIG. 22, the procedure of restoring the IR packet may be omitted, and the IP/UDP packet of the IP packet may temporally be recovered based on the static chain information and dynamic chain information extracted from the RDT and the random compressed packet detected from the RoHC stream.

Validation based on CRC is performed for the detected compressed packets based on a sequence number of a full length extracted from the dynamic chain information of the RDT (S8013), and it is checked whether there is a compressed packet that has passed validation based on CRC (S8014). That is, it is checked whether there is a compressed packet from which an error is not detected. That is, validation based on CRC is performed for the detected compressed packets based on the sequence number of the full length to check whether there is a compressed packet that has passed validation based on CRC. At this time, since it is assumed that there is no error in the RoHC stream, as a result of validation based on CRC, the first compressed packet only passes and the other 17th, 33th and 49th compressed packets are failed. Decompression of the IP/UDP header of the IP packet starts using the static chain information and dynamic chain information extracted from the step S8011 and the passed compressed packet of 'packet 1' (S8015).

Meanwhile, when an error is detected form the received RoHC stream, especially when the first compressed packet of the RoHC stream is not received by being missed due to a reception error, decompression starts in another way depending on whether UDP checksum is used.

In the present disclosure, use of UDP checksum is optional. If UDP checksum is not required in the present disclosure, the transmitting side transmits UDP checksum field values in the UDP header as 0x00. If the UDP checksum field values are 0x00, the receiving side does not perform error detection based on UPD checksum. If UDP checksum is not used, all values f fields in the IP/UDP header in the IP stream are equal to one another except a total length field of the IP header, a length field of the UDP header, and a sequence number (SN).

FIG. 33 illustrates an example of 50 IP packets included in IP stream when UDP checksum is not used, wherein values of all fields (that is, including a total length field and a length field) except a sequence number in the IP/UDP header of the IP packets of the IP stream are equal to one another.

Also, the value of CRC in an RoHC packet depends on the total length field of the IP header, the length field of the UDP header and SN. In accordance with the RoHC operation, the total length field and the length field are not transmitted from the IP header compressor of the transmitting side to the IP header decompressor of the receiving side. Also, the sequence number (SN) is allocated from the IP header compressor of the transmitting side. That is, if UDP checksum is not used, the RDT may be applied to the random compressed packet. That is, if UDP checksum is not used, since the static chain information and dynamic chain information included in the RDT are the same for all the compressed packets of FIG. 33 except the sequence number, the IR packet may be restored using the static chain information and dynamic chain information included in the RDT and any one of the compressed packets of FIG. 33. In this case, the IP header decompressor may discard the compressed packet failed in validation based on CRC to start fast decompression, and a decompression procedure may start at any position of the compressed packet.

FIG. 34 illustrates one example of static chain information and dynamic chain information extracted from the IP header and the UDP header by using 'packet 1' of IP stream the same as that of FIG. 33. That is, FIG. 34 illustrates an example of static chain information and dynamic chain information included in RDT. It is noted from dynamic chain information of FIG. 34 that a UDP checksum value is 0000. This means that error detection based on UDP checksum is not performed.

On the contrary, it is noted from dynamic chain information of FIG. 31 that a UDP checksum value is 54F0. This means that error detection is performed using UDP checksum.

As described above, in the adaptation mode 3 according to the present disclosure, it may be checked whether UDP checksum is used, based on the dynamic chain information extracted from the RDT.

Therefore, if a miss occurs in the compressed packet of 'packet 1' in the RoHC stream due to a reception error and thus the first compressed packet is not received, it is determined in the step S8014 that there is no passed compressed packet.

If it is determined in the step S8014 that there is no passed compressed packet, it is checked whether UDP checksum has been used, based on the dynamic chain information extracted from the RDT (S8016).

If a UDP checksum value of the dynamic chain information is not 0000 as shown in FIG. 31, it is determined that UDP checksum has been used. If a UDP checksum value of the dynamic chain information is 0000 as shown in FIG. 34, it is determined that UDP checksum has not been used.

If it is determined from the step S8016 that UDP checksum has been used, it is on standby until next RDT is received. Then, if next RDT is received, a synchronization procedure between the received RDT and the compressed packets is performed. That is, if next RDT is received, static chain information and dynamic chain information are extracted from the received RDT, and a sequence number is extracted from the extracted dynamic chain information. After the compressed packets having the same sequence number as lower 4 bits of the extracted sequence number are detected from the RoHC stream, the current step returns to the step S8013 and then the aforementioned steps are repeated (S8017). In this case, the previous compressed packets received before next RDT is received are discarded without being decompressed.

If it is determined from the step S8016 that UDP checksum has not been used, un-synchronized decompression is performed using the static chain information and dynamic chain information extracted in the step S8011 and the compressed packet of 'packet 2' without standby to receive next RDT (S8018).

For example, when it is assumed that the compressed packet '1' has not been received by miss, it is noted that a sequence number extracted from dynamic chain information of the RDT related with the compressed packet '1' is 0x02F8', whereas a sequence number allocated to the compressed packet of 'packet 2' which is next packet of 'packet 1' is '9' corresponding to lower 4 bits of '0x02F9'.

At this time, if validation based on CRC is performed for the compressed packet of 'packet 2' to which the sequence number '9' is allocated, based on a sequence number '0x02F8' of a full length included in the dynamic chain information of the RDT, validation based on CRC is failed.

Therefore, in the present disclosure, validation based on CRC is performed for the compressed packet of 'packet 2' to which the sequence number '9' is allocated, based on '0x02F9' which is a full length sequence number of the sequence number '9' allocated to the compressed packet of 'packet 2' instead of the sequence number '0x02F8' included in the dynamic chain information of the RDT. Then, the compressed packet of 'packet 2' passes validation based on CRC. That is, the sequence number included in the RDT is '0x02F8' but is assumed as 0x02F9' and then validation based on CRC is performed for the compressed packet of 'packet 2'. Since it is assumed that UDP checksum is not used in the present disclosure, the sequence number included in the RDT is '0x02F8' but is assumed as '0x02F9' and the compressed packet of 'packet 2' to which the sequence number '9' is allocated may pass validation based on CRC.

Therefore, in the step S8018, decompression of the IP/UDP header of the IP packet starts using the static chain information and dynamic chain information extracted from the RDT of the step S8011 and the compressed packet of 'packet 2'.

Therefore, if UDP checksum is not used, even though the first compressed packet of the RoHC stream is missed, next compressed packet is used for decompression without being discarded. Therefore, it is not required to wait for next RDT to start decompression, whereby a decompression time is shortened.

The internal components of the apparatus may be processors that execute consecutive processes stored in a memory or other hardware components. These may be located inside/outside the apparatus.

In some embodiments, the above-described modules may be omitted, or may be replaced by other modules that perform the same or similar operations.

The above-described parts, modules, or units may be processors or hardware parts that execute consecutive processes stored in a memory (or a storage unit). The steps described in the above-described embodiments can be performed by processors or hardware parts. The modules/blocks/units described in the above-described embodiments can operate as hardware/processors. In addition, the methods proposed by the present disclosure can be executed as code. Such code can be written on a processor-readable storage medium and thus can be read by a processor provided by an apparatus.

While the present disclosure has been described with reference to separate drawings for the convenience of description, new embodiments may be implemented by combining embodiments illustrated in the respective drawings. As needed by those skilled in the art, designing a computer-readable recording medium, in which a program for implementing the above-described embodiments is recorded, falls within the scope of the present disclosure.

The apparatus and method according to the present disclosure is not limitedly applied to the constructions and methods of the embodiments as previously described; rather, all or some of the embodiments may be selectively combined to achieve various modifications.

Meanwhile, the method according to the present specification may be implemented as code that can be written on a processor-readable recording medium and thus read by a processor provided in a network device. The processor-readable recording medium may be any type of recording device in which data are stored in a processor-readable manner. The processor-readable recording medium may include, for example, read only memory (ROM), random access memory (RAM), compact disc read only memory (CD-ROM), magnetic tape, a floppy disk, and an optical data storage device, and may be implemented in the form of a carrier wave transmitted over the Internet. In addition, the processor-readable recording medium may be distributed over a plurality of computer systems connected to a network such that processor-readable code is written thereto and executed therefrom in a decentralized manner.

In addition, it will be apparent that, although the preferred embodiments have been shown and described above, the present specification is not limited to the above-described specific embodiments, and various modifications and variations can be made by those skilled in the art to which the present invention pertains without departing from the gist of the appended claims. Thus, it is intended that the modifications and variations should not be understood independently of the technical spirit or prospect of the present specification.

Those skilled in the art will appreciate that the present invention may be carried out in other specific ways than those set forth herein without departing from the spirit and essential characteristics of the present invention. Therefore, the scope of the invention should be determined by the appended claims and their legal equivalents, rather than by the above description, and all changes that fall within the meaning and equivalency range of the appended claims are intended to be embraced therein.

In addition, the present specification describes both a product invention and a method invention, and descriptions of the two inventions may be complementarily applied as needed.

What is claimed is:

1. A method of transmitting a broadcast signal by an apparatus, the method comprising:
   generating a Robust Header Compression (RoHC) stream by performing header compression on Internet Protocol/User datagram Protocol (IP/UDP) packets in an IP/UDP stream, which include broadcast data, wherein the RoHC stream includes RoHC packets;
   generating an RoHC-U Description Table (RDT) including information related to the header compression;
   encapsulating the RoHC packets in the RoHC stream into link layer packets and outputting an ATSC link layer protocol (ALP) stream including the link layer packets; and
   physical layer processing the link layer packets in the ALP stream,
   wherein the RDT further includes context information based on an adaptation mode,
   wherein the RDT is categorized into a catalog RDT and a discrete RDT in accordance with a delivery type,
   wherein the catalog RDT includes context information for multiple ALP streams, and
   wherein the discrete RDT is carried exclusively within the ALP stream.

2. The method of claim 1, wherein the catalog RDT includes multiple RDTs, and wherein the multiple RDTs are continuously included in a link layer packet.

3. The method of claim 1,
   wherein the ALP stream is delivered to a Physical Layer Pipe (PLP), and
   wherein identification information of the PLP is mapped to a channel number of an RoHC channel including the RoHC stream.

4. The method of claim 3,
   wherein a value of a context identifier (CID) of the RoHC stream is 0, and
   wherein the RoHC stream corresponds to most common IP/UDP stream of IP/UDP streams.

5. The method of claim 1,
   wherein the RDT further includes adaptation mode information for indicating the adaptation mode,
   wherein, when the RoHC packets include an Initialization and Refresh (IR) packet, an IR-Dynamic (IR-DYN) packet and compressed packets, the adaptation mode information indicates an adaptation mode 1,
   wherein, when the RoHC packets include an IR-DYN packet and compressed packets, the adaptation mode information indicates an adaptation mode 2, and
   wherein, when the RoHC packets include only compressed packets, the adaptation mode information indicates an adaptation mode 3.

6. The method of claim 5,
   wherein the context information in the RDT includes static chain information of a first IP/UDP packet of the IP/UDP stream when the adaptation mode information indicates the adaptation mode 2, and
   wherein the context information in the RDT includes static chain information and dynamic chain information of a first IP/UDP packet of the IP/UDP stream when the adaptation mode information indicates the adaptation mode 3.

7. An apparatus for transmitting a broadcast signal, the apparatus comprising:

a header compressor to generate a Robust Header Compression (RoHC) stream by performing header compression on Internet Protocol/User datagram Protocol (IP/UDP) packets in an IP/UDP stream, which include broadcast data, and to generate an RoHC-U Description Table (RDT) including information related to the header compression, wherein the RoHC stream includes RoHC packets;

an encapsulation module to encapsulate the RoHC packets in the RoHC stream into link layer packets and to output an ATSC link layer protocol (ALP) stream including the link layer packets; and a physical layer processor to physical layer process the link layer packets in the ALP stream, wherein the RDT further includes context information based on an adaptation mode, wherein the RDT is categorized into a catalog RDT and a discrete RDT in accordance with a delivery type, wherein the catalog RDT includes context information for multiple ALP streams, and wherein the discrete RDT is carried exclusively within the ALP stream.

8. The apparatus of claim 7, wherein the catalog RDT includes multiple RDTs, and wherein the catalog RDT includes context information for multiple ALP streams.

wherein, when the catalog RDT includes multiple RDTs, the multiple RDTs are continuously included in a link layer packet.

9. The apparatus of claim 8, wherein the ALP stream is delivered to a Physical Layer Pipe (PLP), and wherein identification information of the PLP is mapped to a channel number of an RoHC channel including the RoHC stream.

10. The apparatus of claim 9, wherein a value of a context identifier (CID) of the RoHC stream is 0, and wherein the RoHC stream corresponds to the most common IP/UDP stream of IP/UDP streams.

11. The apparatus of claim 7, wherein the RDT further includes adaptation mode information for indicating the adaptation mode, wherein, when the RoHC packets include an Initialization and Refresh (IR) packet, an IR-Dynamic (IR-DYN) packet and compressed packets, the adaptation mode information indicates an adaptation mode 1, wherein, when the RoHC packets include an IR-DYN packet and compressed packets, the adaptation mode information indicates anadaptation mode 2, and wherein, when the RoHC packets include only compressed packets, the adaptation mode information indicates anadaptation mode 3.

12. The apparatus of claim 11, wherein the context information in the RDT includes static chain information of a first IP/UDP packet of the IP/UDP stream when the adaptation mode information indicates the adaptation mode 2, and wherein the context information in the RDT includes static chain information and dynamic chain information of a first IP/UDP packet of the IP/UDP stream when the adaptation mode information indicates the adaptation mode 3.

13. A method of receiving a broadcast signal by an apparatus, the method comprising:

receiving the broadcast signal,
wherein the broadcast signal includes an ATSC link layer protocol (ALP) stream that includes link layer packets,
wherein the link layer packets include a Robust Header Compression (RoHC) stream,
wherein the RoHC stream includes RoHC packets,
wherein the broadcast signal further includes an RoHC-U Description Table (RDT) that includes information related to header compression,
wherein the RDT further includes context information based on an adaptation mode,
wherein the RDT is categorized into a catalog RDT and a discrete RDT in accordance with a delivery type,
wherein the catalog RDT includes context information for multiple ALP streams, and
wherein the discrete RDT is carried exclusively within the ALP stream;

physical layer processing the broadcast signal; and link layer processing the physical layer processed broadcast signal;

wherein the link layer processing comprises:
extracting the RoHC stream from the link layer packets, and
performing decompression into an IP/UDP stream including IP/UDP packets, which include broadcast data, based on the RoHC stream and the RDT.

14. The method of claim 13, wherein, the catalog RDT includes multiple RDTs, and wherein the multiple RDTs are continuously included in a link layer packet.

15. The method of claim 13, wherein the ALP stream is delivered to a Physical Layer Pipe (PLP), and wherein identification information of the PLP is mapped to a channel number of an RoHC channel including the RoHC stream.

16. The method of claim 15, wherein a value of a context identifier (CID) of the RoHC stream is 0, and wherein the RoHC stream corresponds to most common IP/UDP stream of IP/UDP streams.

17. The method of claim 15, wherein the RDT further includes adaptation mode information for indicating the adaptation mode, wherein, when the RoHC packets include an Initialization and Refresh (IR) packet, an IR-Dynamic (IR-DYN) packet and compressed packets, the adaptation mode information indicates an adaptation mode 1, wherein, when the RoHC packets include an IR-DYN packet and compressed packets, the adaptation mode information indicates an adaptation mode 2, and wherein, when the RoHC packets include only compressed packets, the adaptation mode information indicates an adaptation mode 3.

18. The method of claim 17, wherein the context information in the RDT includes static chain information of a first IP/UDP packet of the IP/UDP stream when the adaptation mode information indicates the adaptation mode 2, and wherein the context information in the RDT includes static chain information and dynamic chain information of a first IP/UDP packet of the IP/UDP stream when the adaptation mode information indicates the adaptation mode 3.

19. An apparatus for receiving a broadcast signal, the apparatus comprising:
a receiving unit for receiving the broadcast signal,
wherein the broadcast signal includes an ATSC link layer protocol (ALP) stream that includes link layer packets,
wherein the link layer packets include a Robust Header Compression (RoHC) RoHC stream,
wherein the RoHC stream includes RoHC packets,
wherein the broadcast signal further includes an RoHC-U Description Table (RDT) including information related to header compression,
wherein the RDT further includes context information dependingbased on an adaptation mode wherein the RDT is categorized into a catalog RDT and a discrete RDT in accordance with a delivery type,
wherein the catalog RDT includes context information for multiple ALP streams, and
wherein the discrete RDT is carried exclusively within the ALP stream;
a physical layer processor for physical layer processing the broadcast signal; and
a link layer processor for link layer processing the physical layer processed broadcast signal;
wherein the link layer processor is configured to:
extract the RoHC stream from the link layer packets, and
perform decompression into an IP/UDP stream including IP/UDP packets, which include broadcast data, based on the RoHC stream and the RDT.

20. The apparatus of claim 19,
wherein the catalog RDT includes multiple RDTs, the multiple RDTs are continuously included in a link layer packet.

21. The apparatus of claim 19,
wherein the ALP stream is delivered to a Physical Layer Pipe (PLP), and
wherein identification information of the PLP is mapped to a channel number of an RoHC channel including the RoHC stream.

22. The apparatus of claim 21,
wherein a value of a context identifier (CID) of the RoHC stream is 0, and
wherein the RoHC stream corresponds to the most common IP/UDP stream of IP/UDP streams.

23. The apparatus of claim 19,
wherein the RDT further includes adaptation mode information for indicating the adaptation mode,
wherein, when the RoHC packets include an Initialization and Refresh (IR) packet, an IR-Dynamic (IR-DYN) packet and compressed packets, the adaptation mode information indicates an adaptation mode 1,
wherein, when the RoHC packets include an IR-DYN packet and compressed packets, the adaptation mode information indicates an adaptation mode 2, and
wherein, when the RoHC packets include only compressed packets, the adaptation mode information indicates an adaptation mode 3.

24. The apparatus of claim 23,
wherein the context information in the RDT includes static chain information of a first IP/UDP packet of the IP/UDP stream when the adaptation mode information indicates the adaptation mode 2, and
wherein the context information in the RDT includes static chain information and dynamic chain information of a first IP/UDP packet of the IP/UDP stream when the adaptation mode information indicates the adaptation mode 3.

* * * * *